(12) United States Patent
Olsson et al.

(10) Patent No.: US 11,137,513 B1
(45) Date of Patent: *Oct. 5, 2021

(54) INDUCTIVE CLAMP DEVICES, SYSTEMS, AND METHODS

(71) Applicant: SeeScan, Inc., San Diego, CA (US)

(72) Inventors: Mark S. Olsson, La Jolla, CA (US);
Hunter Brown, La Jolla, CA (US);
Stephanie M. Bench, Carlsbad, CA (US); Justin W. Taylor, Bend, OR (US); Jan Soukup, San Diego, CA (US)

(73) Assignee: SeeScan, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/140,378

(22) Filed: Sep. 24, 2018

Related U.S. Application Data

(63) Continuation of application No. 15/485,125, filed on Apr. 11, 2017, now Pat. No. 10,088,592, which is a continuation of application No. 14/446,279, filed on Jul. 29, 2014, now Pat. No. 9,632,199.

(60) Provisional application No. 62/030,562, filed on Jul. 29, 2014, provisional application No. 61/859,718, filed on Jul. 29, 2013.

(51) Int. Cl.
| | |
|---|---|
| *G01V 3/10* | (2006.01) |
| *G01V 3/08* | (2006.01) |
| *G01V 3/15* | (2006.01) |
| *G01V 3/165* | (2006.01) |
| *G01S 19/13* | (2010.01) |

(52) U.S. Cl.
CPC ............. *G01V 3/104* (2013.01); *G01S 19/13* (2013.01); *G01V 3/081* (2013.01); *G01V 3/15* (2013.01); *G01V 3/165* (2013.01)

(58) Field of Classification Search
CPC .......... G01V 3/02; G01V 3/081; G01V 3/165; G01V 3/105; G01V 3/15; G01S 19/13
USPC ......................................................... 324/326
See application file for complete search history.

(56) References Cited

U.S. PATENT DOCUMENTS

| 3,768,011 | A | * | 10/1973 | Swain | ................ | G01R 33/04 |
| | | | | | | 324/117 R |
| 6,091,237 | A | * | 7/2000 | Chen | ................... | G01R 15/125 |
| | | | | | | 324/126 |
| 7,619,516 | B2 | * | 11/2009 | Olsson | ................... | G01S 7/03 |
| | | | | | | 324/329 |
| 8,264,226 | B1 | * | 9/2012 | Olsson | ................... | G01V 3/15 |
| | | | | | | 324/329 |
| 9,435,907 | B2 | * | 9/2016 | Olsson | ................... | G01V 3/081 |
| 9,927,545 | B2 | * | 3/2018 | Olsson | ................... | G01V 3/10 |
| 2004/0070535 | A1 | | 4/2004 | Olsson et al. | | |
| 2007/0017301 | A1 | | 1/2007 | Prsha et al. | | |
| 2011/0012589 | A1 | * | 1/2011 | Greenberg | ............ | G01R 15/12 |
| | | | | | | 324/127 |

(Continued)

OTHER PUBLICATIONS

FLIR, User's manual FLIR CM83, Jul. 18, 2013 (Year: 2013).*

(Continued)

*Primary Examiner* — Patrick Assouad
*Assistant Examiner* — Demetrius R Pretlow
(74) *Attorney, Agent, or Firm* — Steven C. Tietsworth, Esq.; Michael J. Pennington, Esq.

(57) ABSTRACT

Inductive clamps for use in utility locate operations for inductively coupling current signals from a transmitter to a hidden or buried conductor are disclosed.

18 Claims, 42 Drawing Sheets

(56) References Cited

U.S. PATENT DOCUMENTS

| | | | | |
|---|---|---|---|---|
| 2012/0001768 | A1* | 1/2012 | Radosavljevic | H04Q 9/00 340/870.03 |
| 2013/0200901 | A1* | 8/2013 | Olsson | G01V 3/081 324/326 |
| 2014/0312903 | A1* | 10/2014 | Olsson | G01V 3/102 324/326 |

OTHER PUBLICATIONS

International Searching Authority, "Written Opinion of the International Searching Authority" for PCT Patent Application No. PCT/US14/48751, dated Feb. 5, 2015 European Patent Office Munich.

* cited by examiner

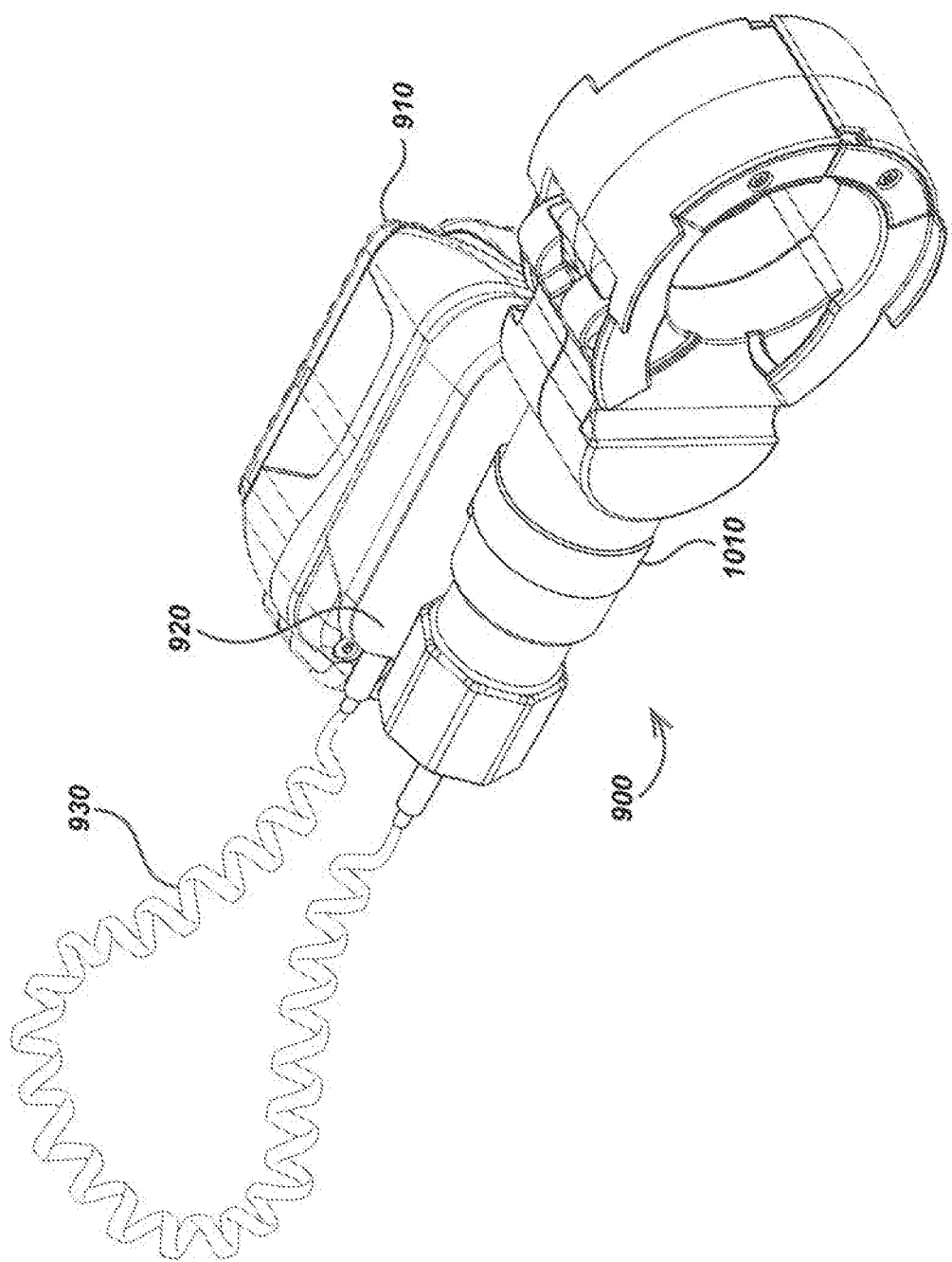

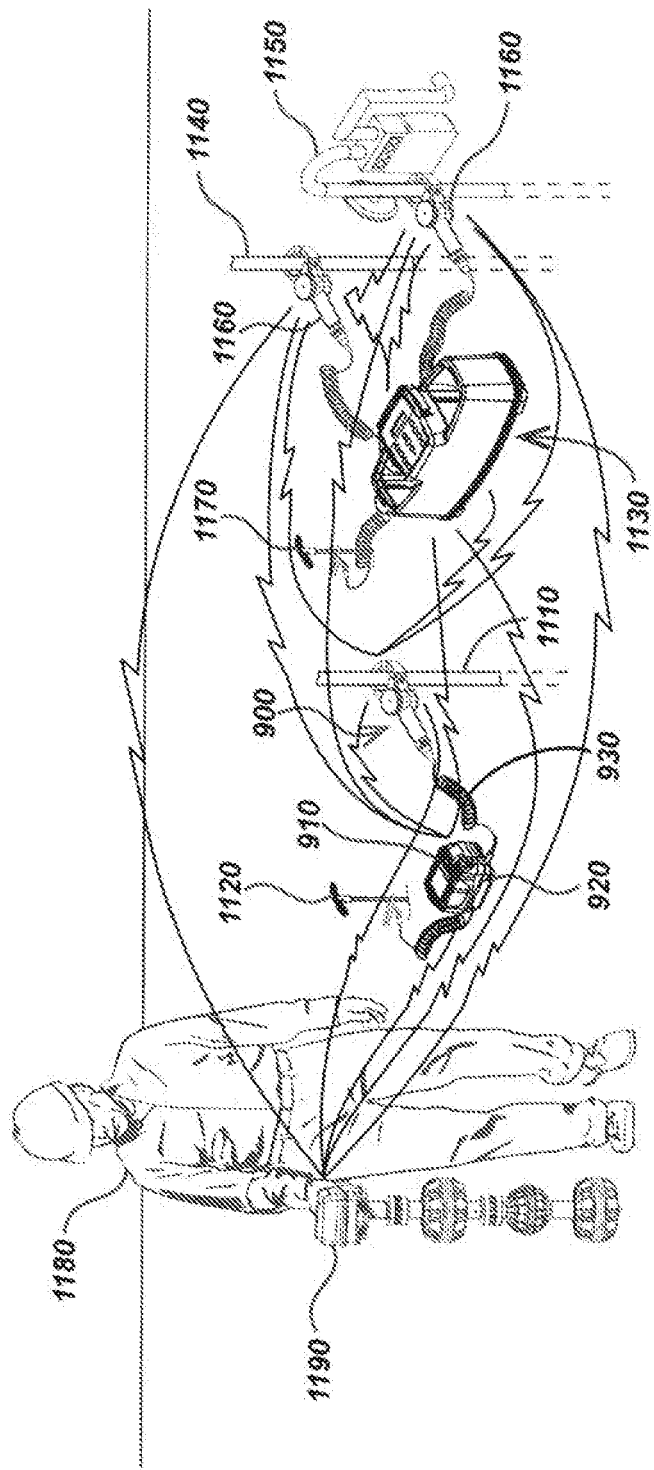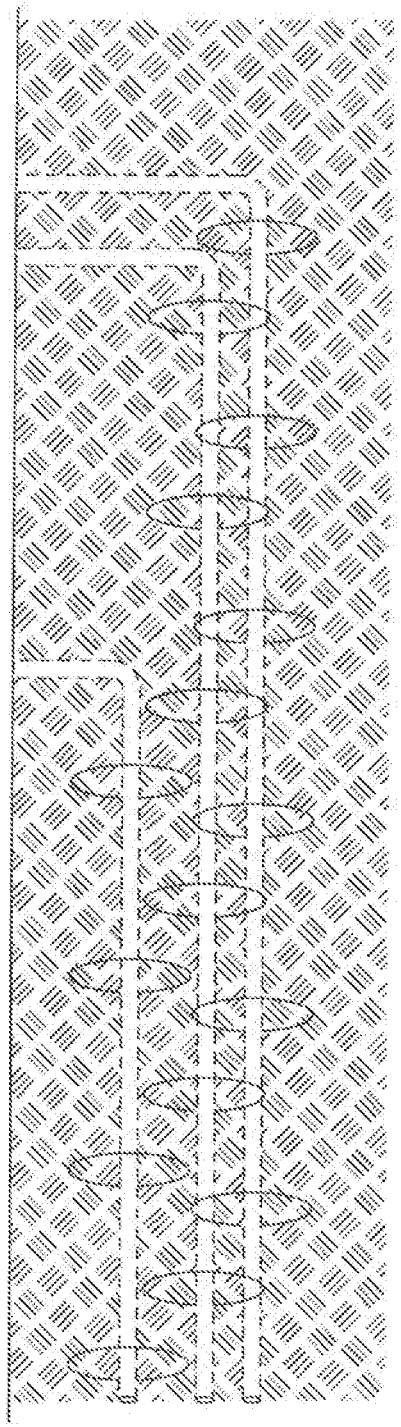
FIG. 11A

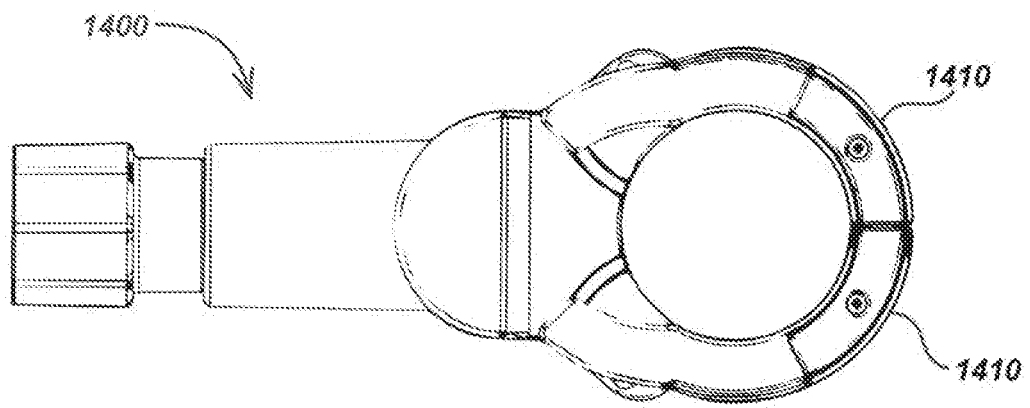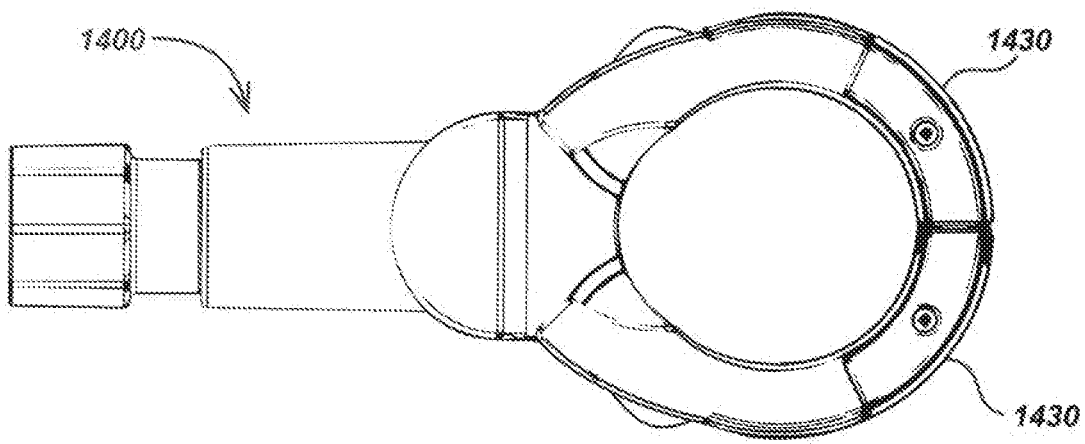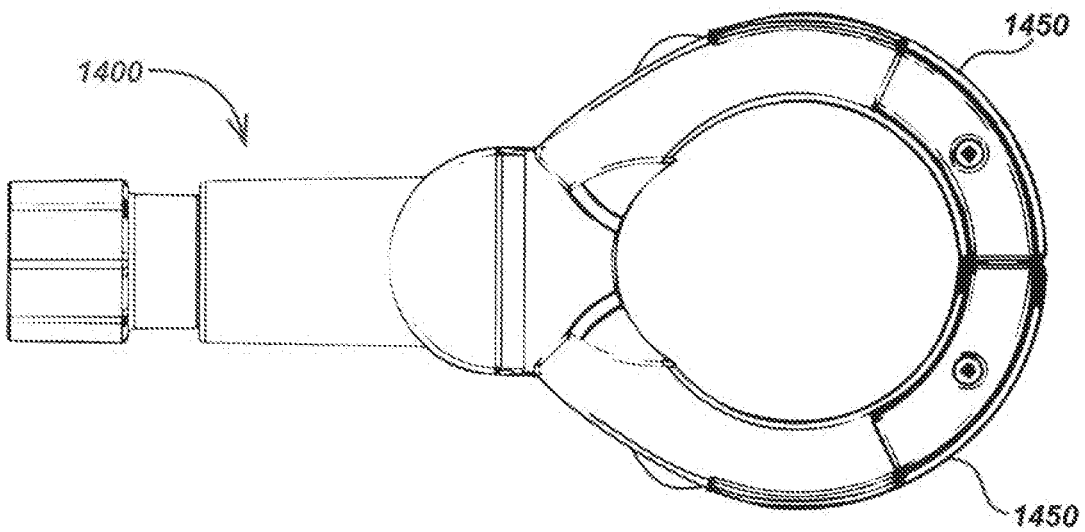
FIG. 14C

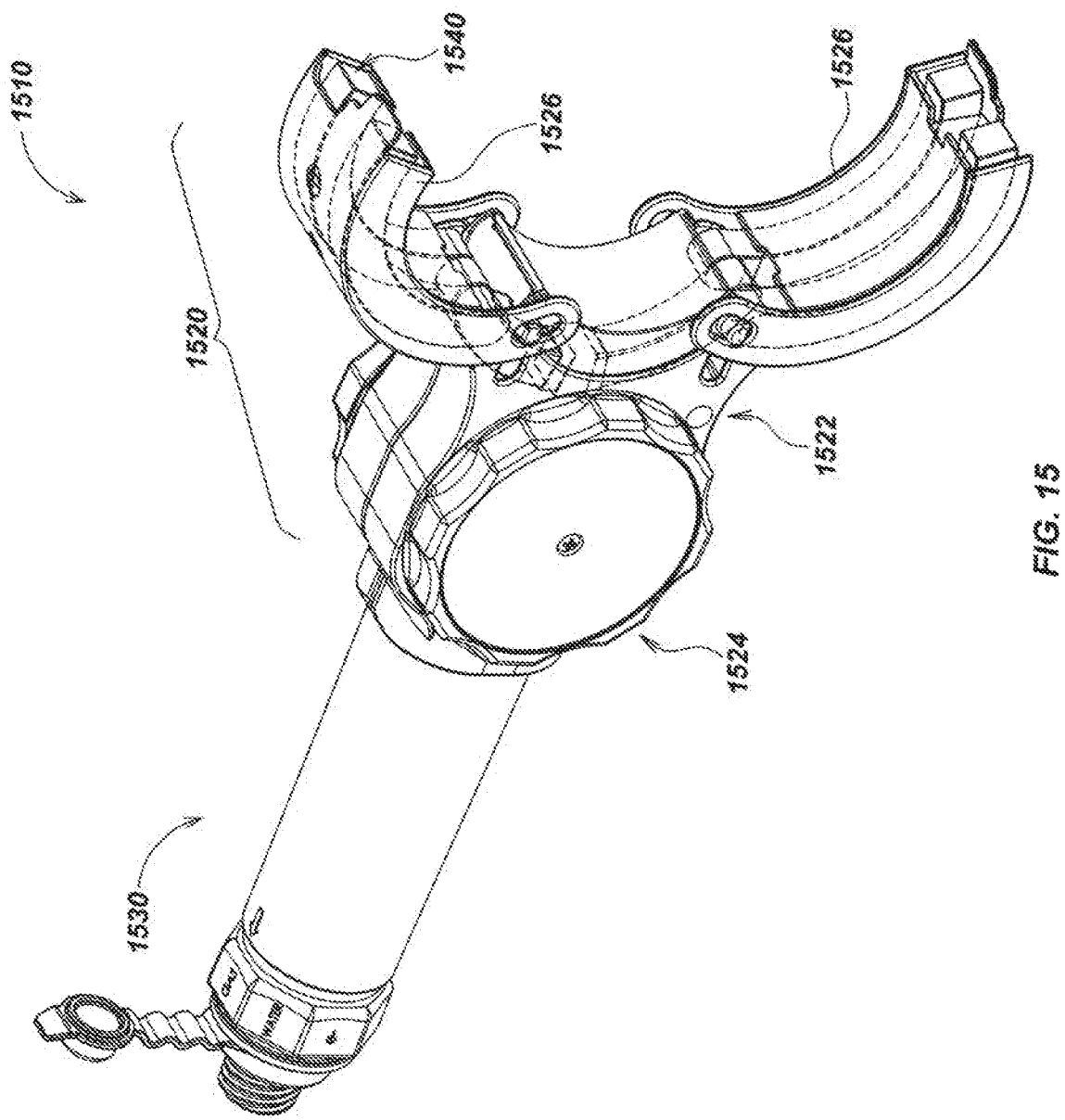

Passive Parallel Crossover

Example Embodiment of Multi-frequency
Output Signal Waveform Generation

INDUCTIVE CLAMP DEVICES, SYSTEMS, AND METHODS

CROSS REFERENCE TO RELATED APPLICATIONS

This application is a continuation of and claims priority to co-pending U.S. Utility patent application Ser. No. 15/485,125, entitled INDUCTIVE CLAMP DEVICES, SYSTEMS, AND METHODS, filed Apr. 11, 2017, which is a continuation of and claims priority to U.S. Utility patent application Ser. No. 14/446,279, now U.S. Pat. No. 9,632,199, entitled INDUCTIVE CLAMP DEVICES, SYSTEMS, AND METHODS, filed Jul. 29, 2014, which claims priority under 35 U.S.C. § 119(e) to U.S. Provisional Patent Application Ser. No. 61/859,718, entitled INDUCTIVE CLAMP DEVICES, SYSTEMS, AND METHODS, filed Jul. 29, 2013, and to U.S. Provisional patent Application Ser. No. 62/030,562, entitled INDUCTIVE CLAMP DEVICES, SYSTEMS, AND METHODS, filed Jul. 29, 2014. The content of each of these applications is hereby incorporated by reference herein in its entirety for all purposes.

FIELD

This disclosure relates generally to clamp devices used to induce signal onto utility lines or other conductors. More specifically, but not exclusively, this disclosure relates to inductive clamp devices, systems, and methods as used in utility locating operations.

BACKGROUND

Buried utility locators (also denoted herein for brevity as "locators") are devices for sensing magnetic fields emitted from hidden or buried conductors (e.g., underground utilities such as pipes, conduits, or cables), and processing the received signals to determine information about the conductors and the associated underground environment.

While some buried utilities are electrically energized (e.g., underground power cables) or carry currents coupled from radio signals or other electromagnetic radiation, in some buried utility location operations (also denoted herein as a "locate" for brevity) currents are generated and coupled, either directly, inductively, or capacitively, from a buried utility transmitter (also denoted herein as a "transmitter" for brevity). These transmitters generate output current signals for coupling either directly or inductively or capacitively to a targeted utility. This may be done with clamps that provide direct physical connections, as well as clamps that provide inductive or capacitive coupling to induce the current signals onto the utility.

Clamp devices known in the art fail to effectively reduce unnecessary eddy current losses and may be lacking in configurability to specific use. Furthermore, existing clamp devices lack the ability to detect and/or communicate utility data and/or other pertinent locate information to other system devices. Further, existing clamp devices may further require the use of a connected transmitter device to function.

Accordingly, there is a need in the art to address the above-described as well as other problems.

SUMMARY

This disclosure relates generally to clamp devices used to induce current signals onto utility lines or other conductors. More specifically, but not exclusively, this disclosure relates to inductive clamp devices, systems, and methods for use in utility locating operations (also denoted as "utility locates").

For example, in one aspect the disclosure relates to an inductive clamp for use in utility locate operations. The clamp may include, for example, a head assembly including a base element and a plurality of arm elements coupled to the base element and a handle assembly including a utility selector element coupled to the head assembly. The clamp may further include a magnetic core subassembly for generating a magnetic field for coupling to a targeted utility. The magnetic core subassembly may include a plurality of ferrite elements and a wire winding wrapped about one or more of the ferrite elements.

In another aspect, the disclosure relates to methods for implementing the above-described functionality, in whole or in part In another aspect, the disclosure relates to non-transitory processor readable media for implementing the above-described functionality, in whole or in part.

Various additional aspects, features, and functions are described below in conjunction with FIGS. 1 through 32 of the appended Drawings.

BRIEF DESCRIPTION OF THE DRAWINGS

The present application may be more fully appreciated in connection with the following detailed description taken in conjunction with the accompanying drawings, wherein:

FIG. 10 is an isometric view of the inductive clamp device embodiment of FIG. 9 with a battery attached to the inductive clamp device handle.

FIG. 11A is an illustration of a utility locating system embodiment utilizing multiple different inductive clamp device embodiments.

FIG. 14C illustrates an inductive clamp device embodiment fitted with a variety of differently sized arms.

FIG. 15 is a detailed isometric view of an alternative inductive clamp device embodiment.

DETAILED DESCRIPTION OF EMBODIMENTS

Overview

Figure 1:
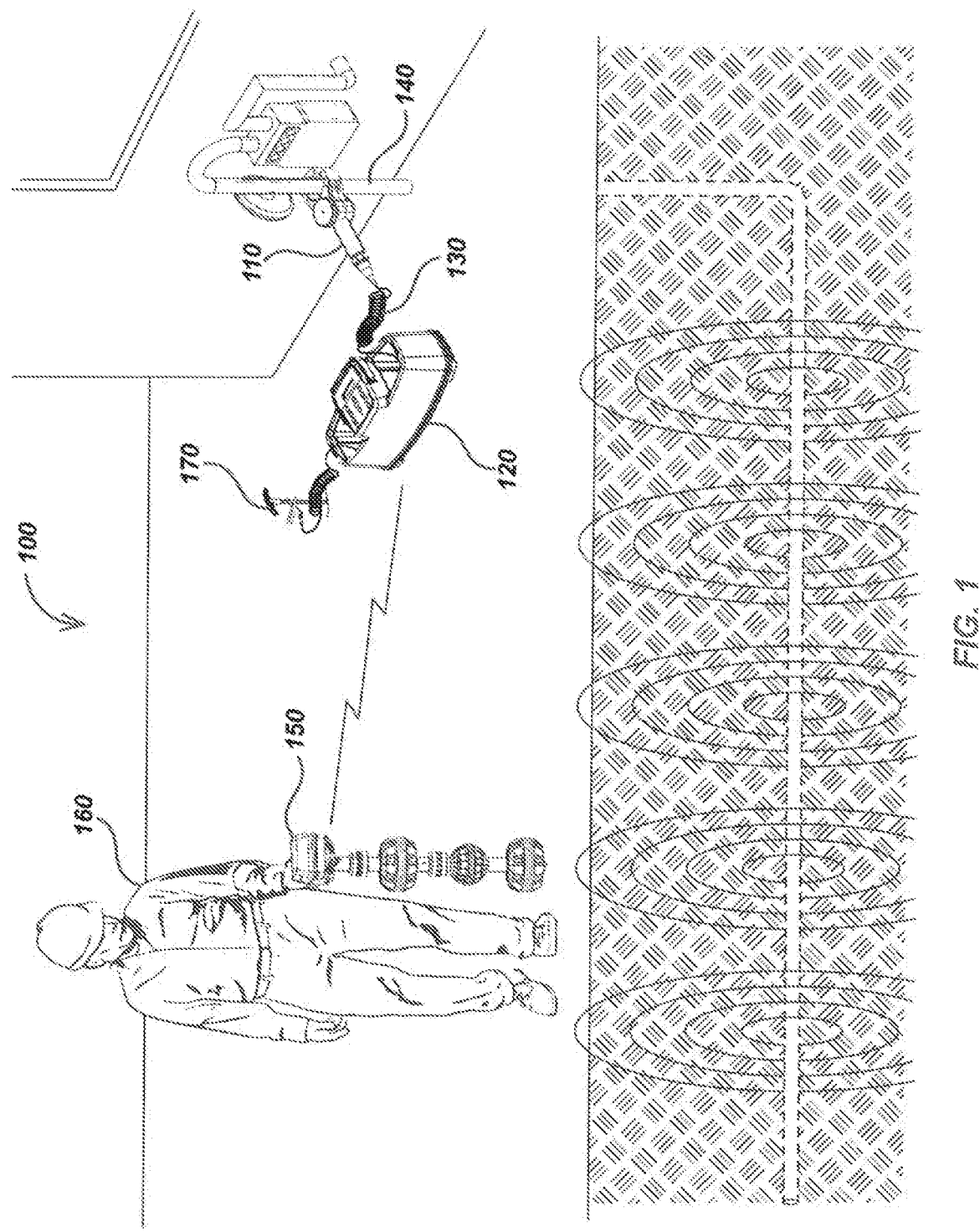
FIG. 1 is an illustration of a utility locating system embodiment utilizing an inductive clamp device.

This disclosure relates generally to clamp devices used to induce current signals onto utility lines or other conductors. More specifically, but not exclusively, this disclosure relates to inductive clamp devices, systems, and methods for use in utility locating operations (also denoted as "utility locates").

For example, in one aspect, inductive clamp device embodiments may include a base element and one or more arm elements configured to be opened and further closed about a conductor such as a utility line. The clamp may include magnets or other attachment mechanisms to retain the arm(s) in an open or closed position. A magnetic core subassembly, which may comprise ferrite or other magnetically permeable materials as magnetic core elements, may encircle a targeted utility/conductor when the arm elements are closed about the conductor, such as around a stub off a pipe or other conductor. One or more wire windings, which may be Litz wire or other conductive wires or materials, may be wound about the magnetic core elements of the magnetic core subassembly to generate magnetic fields for inducing electromagnetic signal(s) onto the conductor. The inductive clamp devices may further include a utility selector element for allowing a user to select a particular type of utility, along with sensors and electronics to sense the selected utility type and provide a corresponding output signal. The output signal may be stored in a memory of the inductive clamp and/or may be transmitted via a wired or wireless communication module to other devices or systems used in the locate operation.

In another aspect, inductive clamp device embodiments may be configured to induce signals onto a utility line or other conductor while the arm elements are in an open position (also referred to herein as "open induction mode"), partially closed about a utility, or fully closed about a utility (also referred to herein as "closed induction mode"). The induction mode may be sensed and data corresponding with the sensed induction mode may be stored in a memory of the clamp and/or transmitted to another device or system used in the locate operation. Data corresponding with the induction mode may further be associated, stored, and/or transmitted with other data, such as data corresponding to a selected utility type or other selected utility information.

In another aspect, embodiments of the magnetic core subassembly of the inductive clamp may comprise multiple magnetic core components or pieces. Such magnetic core components or pieces may be configured in a geometric configuration to reduce gaps between other magnetic core pieces, in some embodiments to the greatest extent possible for a given geometry. As one example, a stacked geometry of magnetic core pieces may, as illustrated and described subsequently herein, substantially eliminate gapping between other magnetic core pieces based on shaping of the magnetic core components. The particular geometry may be selected to further prevent gapping between magnetic core pieces when the inductive clamp device is used in open induction mode and/or in arm positions in between fully open and fully closed.

In another aspect, locating system embodiments may include multiple inductive clamp devices operating simultaneously. The inductive clamp devices in such a system may be configured to run at different frequencies and/or multiplexed to allow a locator to separately identify each utility, and may be of different types (e.g., one clamp may include an integrated transmitter module and another may be coupled to a separate transmitter or transmitters). In some embodiments a single induction clamp may be configured to operate at different frequencies and/or provide multiplexed output signs in a similar fashion.

In another aspect, inductive clamp device embodiments may incorporate two or more separate windings that may be comprised of different types, sizes, and/or number of turns on the same magnetic core or on multiple magnetic cores of the magnetic core subassembly. In embodiments with multiple windings, electronic circuitry may be included to generate and drive output signals at two or more frequencies simultaneously. Such circuitry may include, but is not limited to, electronic circuits including a divider or passive parallel crossover network, or a circuit that uses separate inductors to produce one or more high Q resonant circuits, or other circuitry configured to produce resonance at one or more frequencies. In some embodiments, additional resonant circuits including windings about the magnetic core components of each arm may be used. The different frequency outputs may in some embodiments be phase locked or synchronized, whereas in other embodiments they may not be phase locked or synchronized.

In another aspect, embodiments of inductive clamp devices may include a tensioning element for securely holding the device arm elements in a selected position, such as an open position, a closed position, or a position somewhere in between. Such a tensioning element may allow the inductive clamp device to be self-supporting in the various arm elements positions and hold to a utility when in use. Exemplary tensioning elements may include mechanical gears, springs, motorized gears, and the like, which may further be configured for single-handed use, remotely controlled, and/or controlled through push-button controls on the inductive clamp device. Position sensors and/or magnets and magnetic sensors and associated electronic circuitry may be included within an inductive clamp device for detecting the relative position of the arm elements in relation to the body of the inductive clamp device and generating data corresponding to the arm position. The data corresponding to the arm position may be stored in a memory of the clamp and/or may be transmitted to another device or element of the locate system and/or to a remote electronic computing device or system.

In another aspect, inductive clamp device embodiments may include a utility selector element to allow a user to designate the type of utility, frequency selection, operating mode, and/or select other system parameters or modes. The utility selector element may include an off switch to power off the inductive clamp device, as well as additional selector elements. A separate on/off switch or button may be used in further inductive clamp device embodiments. The utility selector element may include mechanical elements and/or electronic circuitry to determine a user-selected utility type or other parameters and generate data corresponding to the determined type or other parameters. The determined data may be stored in a memory of the clamp and/or transmitted to other device or elements of the locate system, and/or to remove electronic computing devices or system. The data may be communicated via a wired or wireless communications module disposed in or coupled to the inductive clamp. One or more processing elements in the inductive clamp may be used to receive, process, and/or send the determined data and/or control operation of the inductive clamp device. In some embodiments, an inductive clamp device embodiment may be powered on and off remotely through, for example, a remote control connection implemented with electronic circuitry and actuated by, for example, a signal from a locator or other locate system device.

In another aspect, some inductive clamp device embodiments may operate in conjunction with a coupled external transmitter, whereas other embodiments may include an integral transmitter module (also denoted herein as an "integrated inductive clamp" or "integrated clamp" to denote integration of the transmitter into the clamp). An inductive clamp device may, for example, physically connect to a transmitter device for signal generation and communication link purposes. Other inductive clamp device embodiments may be configured with an integrated transmitter module and circuitry, electronics, and/or other components to function as a stand-alone signal generation and coupling device, thereby eliminating the need for a separate coupled transmitter device. In such embodiments, a separate power source, such as rechargeable batteries, may be used to power the inductive clamp device. In embodiments configured to operate as a stand-alone signal generation and coupling device or integrated coupling device, the battery may connect to a separate battery connector. A ground stake, capacitive footing, and/or other grounding methods may be used to ground such integrated clamp embodiments. Such grounding may only be used when the device is used in a direct connect mode and not in an inductive connection mode.

Such integrated clamps may include combinations of sensors and/or other elements, modules, and/or components for providing the various functions as described subsequently herein. In embodiments with a separate transmitter, a cord or cable connecting the transmitter device and inductive clamp device may also be used to provide a data communication link, in conjunction with communication modules in each device, between two or more devices. Inductive clamp device embodiments may be configured to accommodate various cord or cable types. Examples of these types may include coiled or straight cords, standard stereo jack cords or other standard jacks, cords with straight or right-angle connectors, and/or cables containing two or more conductors which may be twisted conductors to reduce radiated signals. The various cords and cables may contain threads or other securing features designed to mate with locking mechanisms on the inductive clamp device.

In another aspect, inductive clamp device embodiments may contain one or more ports or jacks for connecting other clamps of various types, grounding stakes, and/or other accessory devices. Such a port or jack may provide the ability to induce current onto multiple conductors simultaneously and sequentially which may include multiplexing of signals in time and/or frequency.

In another aspect, an inductive clamp device may include magnetic shielding partially or fully through the device handle to further minimize influence of external fields from cables and wires. In some embodiments containing various sensors, other devices, and technologies as described subsequently herein, may be included as may be disposed outside of any magnetic shielding.

In another aspect, inductive clamp device embodiments may include features or structures to receive various cords or cables and/or locking mechanisms for securing the cords or cables in place.

In another aspect, inductive clamp device embodiments may be configured to communicate via one or more wired or wireless communication modules with other locate system devices such as, but not limited to, locator devices, transmitter devices, base stations, other inductive clamp devices, smart phones, laptops, tablet or notebook computers, or other local or remote electronic computing devices or systems, such as remote server systems or other remote computers. The communication links between the inductive clamp or clamps and other devices may include the use of wired and/or wireless communication modules such as wireless local area network (WLAN) modules such as WiFi, Bluetooth modules, industrial, scientific and medical (ISM)

radio modules, Ethernet, serial, or parallel wired communication modules, sondes, and/or other communication modules.

In another aspect, inductive clamp device embodiments may include a variety of additional sensors and other components. These may include, but are not limited to, global navigation systems (GNS) modules such as global position system (GPS) receiver modules, accelerometers, compass sensors, gyroscopic sensors, other inertial/position sensors, geophones, magnetic sensors, gas sensors, sondes, temperature sensors, environmental condition sensors, camera modules, microphone modules, infrared (IR) cameras or sensors, other visual or imaging sensors or modules, acoustic sensors, and the like. Gas sensors may be used for detecting potentially hazardous gas leaks and subsequently alert a user if such a leak is detected. Acoustic sensors may, for instance, be for acoustic leak detection or detecting vibration. The camera and/or other imaging sensors may be used to document how an inductive clamp device is connected to a utility line. The microphone may be used for detecting voice commands from a user and subsequently controlling various aspects of the inductive clamp device. Magnetic sensor(s) may, for instance, be utilized to measure the magnetic output field produced by the inductive clamp device in use. The measured output of the clamp may further be used to feedback the specific output power of the inductive clamp device and/or determine if the clamp is fully closed or not. Embodiments of inductive clamp devices may be time synchronized with other system devices. This time synchronization may use the internal GPS sensor to provide precise time to the inductive clamp device. In other embodiments, the time synchronization may be communicated to the inductive clamp device either wirelessly or by devices physically connected to the inductive clamp device.

In another aspect, inductive clamp device embodiments may include electronic circuitry or modules for time synchronization of the clamp device and associated generated signals or data with other locate system devices.

In another aspect, inductive clamp device embodiments may include processing elements, memory, electronic circuitry, and other components for data logging. Such data logging may be done with an externally accessible and/or removable storage device such as a USB thumbstick and/or with internal memory devices, modules, or systems. In some embodiments, data may be transmitted to other system devices for data logging purposes, such as via one or more wired or wireless communication modules.

In another aspect, inductive clamp device embodiments may include one or more indicators to communicate device information to a user, which may include one or more audible, visual, and/or haptic feedback elements or modules. Inductive clamp device embodiments may include a separate dipole transmitter configured to produce a signal that may be sensed by a locator device, such as to determine a relative position of the inductive clamp device. This signal may be provided from the inductive clamp device so as to be separate and distinct from other signals as sensed by the locator device and may be used to sense or determine the relative position of the inductive clamp device or for other signaling or data processing functions. Example indicators may include, but are not limited to, audible indicators such as speakers and/or visual indicators such as liquid crystal displays (LCDs) and/or other graphic displays and/or light emitting diodes (LEDs) such as daylight readable LEDs to indicate proper closure of the inductive clamp device arms about a utility. In embodiments where magnetic speakers are to be used, the magnetic speaker may be used to generate electromagnetic signals that may be sensed by a locating device. A vibration motor(s) and/or other motion or haptic feedback element may be included in an inductive clamp device embodiment to provide tactile or haptic feedback to the user, such as providing feedback corresponding to the various settings, data, and parameters described herein.

In another aspect, the arms and/or ferrites within the arms and clamp body embodiments may be configured so as to be readily user replaceable. In some such embodiments, the arms may be designed to break away, mechanically disconnect, or come apart when overstressed. In further embodiments, the arms and/or clamp head may be configured to be readily user replaceable such that differently sized and/or configured arms and/or clamp heads may be used. For example, a user may be able to replace the arms or entire head of an inductive clamp device or separate the arms or head to allow the device to fully close about an unusually wide or otherwise difficult to access conduit or utility line. In embodiments with replaceable arms and/or heads, an inductive clamp device embodiment may sense the size of the arms or clamp head installed or may sense the opening size or other arm orientation information and store the information in a memory of the clamp and/or send the information via a wired or wireless connection to another locate system device.

In another aspect, inductive clamp device embodiments may be sealed and be fully or partially submersible or water or other fluid impermeable or resistant.

In another aspect, an active signal transmitted by an inductive clamp device embodiment may include encoded data. This data may be encoded through use of phase-shift keying (PSK) or binary phase-shift keying (BPSK) or through the use of other encoding methods and may include data corresponding to the various information and parameters associated with the inductive clamp device as described herein. Such an inductive clamp device may be configured to read, log, and/or retransmit data generated or received at the inductive clamp device or data corresponding to signals sent from the inductive device.

In another aspect, inductive clamp device embodiments may be configured to be used as a sensing element (in place of or in addition to a signal generation element) in ether a closed or open state. The inductive clamp device may passively measure, record, and/or analyze the signature of a signal on a utility, such as a signal already present in the utility line and/or signal actively produced with other system devices such as other transmitters or other inductive clamp devices. Such sensed data may be communicated to various other system devices via wired or wireless communication modules incorporated in or coupled to the inductive clamp device. This data may include raw, unprocessed measured signal, processed signals, sensed signals, or other data or information associated with inductive clamp devices as described herein.

In another aspect, inductive clamp device embodiments may be configured to secure to a hot stick or other extension arm allowing a user to deploy an inductive clamp device into areas which may otherwise be difficult or unsafe to access, such as submerged utilities or around high voltage lines or into other dangerous or difficult areas. In such embodiments, the inductive clamp device may be configured with electronic circuitry and/or mechanical elements to open and close as well as control other device features remotely. Such remote control configurations may include the use of wireless communication modules, mechanical actuation elements such as a cable or rope and pulley system, optical elements, and/or other elements for remotely controlling the inductive clamp device.

In another aspect, the disclosure relates to an inductive clamp for use in utility locate operations. The clamp may include, for example, a head assembly including a base element and a plurality of arm elements coupled to the base element and a handle assembly including a utility selector element coupled to the head assembly. The clamp may further include a magnetic core subassembly for generating a magnetic field for coupling to a targeted utility. The magnetic core subassembly may include a plurality of ferrite elements and a wire winding wrapped about one or more of the ferrite elements.

The arm elements may, for example, be configured to be movably opened and closed. The arm elements may be movably closable in response to contact with a utility line. The arm elements may be retained in an open or closed configuration by a plurality of magnets disposed in an orientation to provide an attractive force. The plurality of magnets may include one or more of back arm magnets, base element magnets, and front arm magnets. The clamp may further include a tensioning element for holding the arm elements in a selected position.

The clamp may further include, for example, one or more sensor elements or other circuit elements or modules. The one or more circuit elements or modules may include an integrated GPS receiver module or electronically coupled GPS receiver or module. The one or more sensor elements or modules may include an integrated or coupled camera module. The one or more sensor elements or modules may include environmental or physical parameters sensors or modules.

The utility selector element may, for example, include a sensor assembly and electronics to sense a position or orientation of the utility selector element and provide an output signal corresponding to the selected position or orientation. The selector element may include or be coupled to one or more communications modules. An output signal corresponding to a selected position or orientation of the utility selector element may be provided as a wired or wireless output signal from the communications module. The selected position or orientation may correspond to a utility type, frequency, or other output signal or clamp parameter. The position or orientation of the utility selector element may be stored in a non-transitory memory in the inductive clamp. The utility selector element may include text or an icon or a color or a symbol to represent a selected utility type or other parameter.

The clamp may, for example, include an integrated utility locator transmitter module. The integrated transmitter module may be configured to generate an output current signal at one or more selected frequencies. The output current signal may be generated as a multiplexed signal. The output current may be generated as multiple output current signals. The output current signal may be time and/or frequency multiplexed. The plurality of frequencies of the output current signal may be time multiplexed on a single current output signal or on multiple current output signals. The output current signal may comprise a plurality of separate output current signals. Ones of the plurality of frequencies may be provided on different ones of the separate output current signals.

The clamp may, for example, comprise an intelligent battery coupled to the inductive clamp or integral with the inductive clamp. The clamp may include one or more ports for coupling other clamps or accessories. The one or more ports may include a USB port. The clamp may include one or more data communications modules disposed in or coupled to the inductive clamp. The data communications module may be a wireless data communications module. The data communications module may be a wired data communications module.

The clamp may, for example, include an LCD display for providing an indication of a utility selector element state or for providing other data or information associated with the clamp operation, such as frequency, output power, and/or other data or information. The clamp may further comprise a microphone or other audio or vibrational input element. The clamp may comprise a speaker, buzzer, or other audio output element.

In another aspect, the disclosure relates to methods for implementing the above-described functionality, in whole or in part.

In another aspect, the disclosure relates to non-transitory processor readable media for implementing the above-described functionality, in whole or in part.

Various additional aspects, features, and functions are described below in conjunction with FIGS. 1 through 32 of the appended Drawings.

The disclosures herein may be combined in various embodiments with the disclosures in co-assigned patents and patent applications, including transmitter and locator devices and associated apparatus, systems, and methods, as are described in U.S. Pat. No. 7,009,399, entitled OMNI-DIRECTIONAL SONDE AND LINE LOCATOR, issued Mar. 7, 2006, U.S. Pat. No. 7,443,154, entitled MULTI-SENSOR MAPPING OMNIDIRECTIONAL SONDE AND LINE LOCATOR, issued Oct. 28, 2008, U.S. Pat. No. 7,518,374, entitled RECONFIGURABLE PORTABLE LOCATOR EMPLOYING MULTIPLE SENSOR ARRAY HAVING FLEXIBLE NESTED ORTHOGONAL ANTENNAS, issued Apr. 14, 2009, U.S. Pat. No. 7,288,929, entitled INDUCTIVE CLAMP FOR APPLYING SIGNAL TO BURIED UTILITIES, issued Oct. 30, 2007, U.S. Pat. No. 7,276,910, entitled A COMPACT SELF-TUNED ELECTRICAL RESONATOR FOR BURIED OBJECT LOCATOR APPLICATIONS, issued Oct. 2, 2007, U.S. Pat. No. 7,990,151, entitled TRI POD BURIED LOCATOR SYSTEM, issued Aug. 2, 2011, U.S. Pat. No. 7,825,647, entitled COMPACT LINE ILLUMINATOR FOR LOCATING BURIED PIPES AND CABLES, issued Nov. 2, 2010, U.S. Pat. Nos. 8,264,226, 7,619,516, entitled SINGLE AND MULTI-TRACE OMNIDIRECTIONAL SONDE AND LINE LOCATORS AND TRANSMITTERS USED THEREWITH, issued Nov. 17, 2009, U.S. Pat. No. 8,264,226, entitled SYSTEM AND METHOD FOR LOCATING BURIED PIPES AND CABLES WITH A MAN PORTABLE LOCATOR AND A TRANSMITTER IN A MESH NETWORK, issued Sep. 11, 2012, United States Patent entitled OMNIDIRECTIONAL SONDE AND LINE LOCATOR, issued Mar. 7, 2006, U.S. Pat. No. 8,248,056, entitled A BURIED OBJECT LOCATOR SYSTEM EMPLOYING AUTOMATED VIRTUAL DEPTH EVENT DETECTION AND SIGNALING, issued Aug. 21, 2012, U.S. Provisional Patent Application Ser. No. 61/618,746, entitled DUAL ANTENNA SYSTEMS WITH VARIABLE POLARIZATION, filed Mar. 31, 2012, U.S. patent application Ser. No. 13/570,211, entitled PHASE-SYNCHRONIZED BURIED OBJECT LOCATOR APPARATUS, SYSTEM, AND METHODS, filed Aug. 8, 2012, U.S. patent application Ser. No. 13/469,024, entitled BURIED OBJECT LOCATOR APPARATUS AND SYSTEMS, filed May 10, 2012, U.S. patent application Ser. No. 13/676,989, entitled QUAD-GRADIENT COILS FOR USE IN A LOCATING SYSTEM, filed Nov. 11, 2012, U.S. Provisional Patent Application Ser. No. 61/485,078, entitled LOCATOR ANTENNA CONFIGURATION, filed on May 11, 2011, and U.S. Provisional patent application Ser. No. 14/332,268 entitled UTILITY LOCATOR TRANSMITTER DEVICES, SYSTEMS, AND METHODS WITH DOCKABLE APPARATUS, filed on Jul. 15, 2014, and U.S. Provisional Patent Application Ser. No. 61/859,708, entitled UTILITY LOCATING SYSTEM WITH MOBILE BASE STATION, filed Jul. 29, 2013. The content of each of these applications is incorporated by reference herein in its entirety (These applications may be collectively denoted herein as the "incorporated applications.").

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

It is noted that as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Inductive Clamp Devices Embodiments for Use in Utility Locating Systems

Turning to FIG. 1, an exemplary embodiment of a locating system 100 utilizing an example inductive clamp device embodiment 110, in accordance with aspects of the present disclosure, connected to a utility transmitter device 120 via cable 130 and coupled to utility line 140. Inductive clamp device embodiment 110 may correspond with any of the inductive clamp embodiments described subsequently herein (In some embodiments as described subsequently herein, the transmitter may be incorporated within the inductive clamp to form an integrated inductive clamp.).

The locating system 100 may further include a locator device such as the locator device 150 carried by a user 160. A ground stake 170 may connect to the transmitter module 120 and provide grounding. Grounding is only typically used when the transmitter module 120 is used in a direct connect mode, wherein a direct physical conductive connection is made to the utility or a coupled conductive element. In inductive applications, current is coupled without the need for direct physical conductive contact via magnetic fields or, in some implementations, capacitively. The transmitter device 120 generates current signals to be provided to hidden or buried utilities to induce electromagnetic signals onto a conductor(s), such as the utility line 140, which is typically buried underground or otherwise at least partially hidden from direct access.

As illustrated in FIG. 1, these electromagnetic signals may be induced onto the utility line 140 through the coupled inductive clamp device 110. The user 160, holding the locator 150 as shown, which is configured to sense the emitted magnetic field signal(s) associated with current flow in the utility line 140, may then determine information associated with the buried utility line 140, such as depth, position, location, orientation, conductor current, soil condition, presence of other utilities, and the like. Details of various locator and transmitter embodiments as may be used in the system of FIG. 1 are described in the incorporated applications. For example, the locator 150 may be a locator such as described in U.S. patent application Ser. No. 13/570,211, entitled PHASE-SYNCHRONIZED BURIED OBJECT LOCATOR APPARATUS, SYSTEM, AND METHODS, filed Aug. 8, 2012, and the transmitter device 120 may be a transmitter described in U.S. patent application Ser. No. 14/332,268, entitled UTILITY LOCATOR TRANSMITTER DEVICES, SYSTEMS, AND METHODS WITH DOCKABLE APPARATUS, filed on Jul. 15, 2014, or the locator and transmitter may be other devices as described in the incorporated application or as are known or developed in the art.

A data communications link may be established between the inductive clamp device 110 and/or transmitter module 120 and/or the locator 150 and/or other locate system elements, such as a remote server or computer system or other electronic computing device or system. The link may be wireless and be established using a wireless data communications module in the clamp, or may be via a wired datalink incorporated in or coupled to the inductive clamp device 110 and/or the transmitter module 120 to receive data and information from the locator 150 and/or send data and information to the locator 150, such as data received from a corresponding locator or other electronic computing device, or data sent to a corresponding locator or other electronic computing device. An associated locator, such as locator 150 as shown, may include a corresponding wireless data communications module.

In some embodiments, as described subsequently herein, an inductive clamp device embodiment in accordance with aspects of the disclosure may include an incorporated transmitter module or components and function as a stand-alone signal generation and coupling device when connected to a power source such as a battery pack or other power source. The term "stand-alone signal generation and coupling device" as used herein refers to an inductive clamp device configured to generate current signals to be provided to hidden or buried utilities to induce electromagnetic signals onto a conductor(s) which may typically be buried underground or otherwise at least partially hidden from direct access, without the use of a conventional standalone transmitter device, such as the transmitter module 120 of FIG. 1. This inductive clamp device may be denoted herein as an "integrated inductive clamp" or just an "integrated clamp" for brevity.

Data communicated between the various locate system devices, such as an inductive clamp device embodiment, locators, transmitters, and/or other electronic computing devices or systems may, for example, be information related to inductive clamp device or transmitter or locator operation, such as signal(s) being sent by the inductive clamp device, phase or timing information of signals generated by or received at the inductive clamp device, the transmitter, locator, or all of these, output signal power levels, received signal information provided from the locator, control signals from the locator to control inductive clamp device or transmitter operation, or vice-versa, other operational information from the inductive clamp device(s) or the transmitter(s) or locator(s), and the like. This data may be processed in one or more processing elements of the inductive clamp device and/or stored in a memory of the inductive clamp device and/or sent or received by the inductive clamp device via wired or wireless communication module(s).

For example, in some embodiments, the locator device 150 may include a processing module with one or more processing elements to control, at least in part, one or more inductive clamp devices such as the inductive clamp device 110 directly or through controlling the transmitter module 120, or both. A wireless link, wired connection, or a combination of the two may be configured to provide communication links and/or device control functions between the various locate system devices. The inductive clamp device 110 may include or be coupled to a corresponding processor module to effect control functions and/or send or receive associated data. For example, powering on/off, attached device control, and frequency selection controls for the inductive clamp device 110 may be provided, via the wireless link, through the interface on the locator device 150. The wireless data communications module may, for example, be a Bluetooth, Wi-Fi, Zigbee, cellular, ISM, or other wireless data communications module or system as known or developed in the art.

The inductive clamp device 110 and/or transmitter module 120 and/or locator device 150 may be equipped with global navigation system (GNS) modules or sensors, such as global positioning system (GPS) receiver modules, GLONASS system modules, Galileo system modules, as well as time synchronization receivers or modules, cellular or data communications modules, and/or other sensors or modules, such as inertial sensors, environmental condition sensors, or other data sensing or acquisition sensors or modules. Data from these navigation systems and/or inertial sensors, as well as other sensors and/or devices, may be communicated via wired and/or wireless link between the inductive clamp device 110, the transmitter module 120, locator device 150, and/or other system devices. GNS system modules may be used to generate precise time synchronization signaling to be used among the various locate system devices as described in, for example, incorporated U.S. patent application Ser. No. 13/570,211, entitled PHASE-SYNCHRONIZED BURIED OBJECT LOCATOR APPARATUS, SYSTEM, AND METHODS, filed Aug. 8, 2012.

In some embodiments, a wireless link may also be established between other devices within the utility locating system. For instance, the inductive clamp device 110 may also be configured with a communications module to communicate data or information with a smart paint stick device, laptop computer, tablet computer, wireless local area network (WLAN) or wide area network (WAN) module, smart phone or other cellular device or system, and/or other electronic computing systems or devices incorporating processing elements. Examples of modules that may be used to establish such a wireless link may include, but are not limited to, Bluetooth wireless devices, industrial, scientific and medical (ISM) radio devices, and/or wireless area network (WAN) technologies such as Wi-Fi (WLAN) and Wi-Max networks as well as cellular or other data networks.

Figure 2:
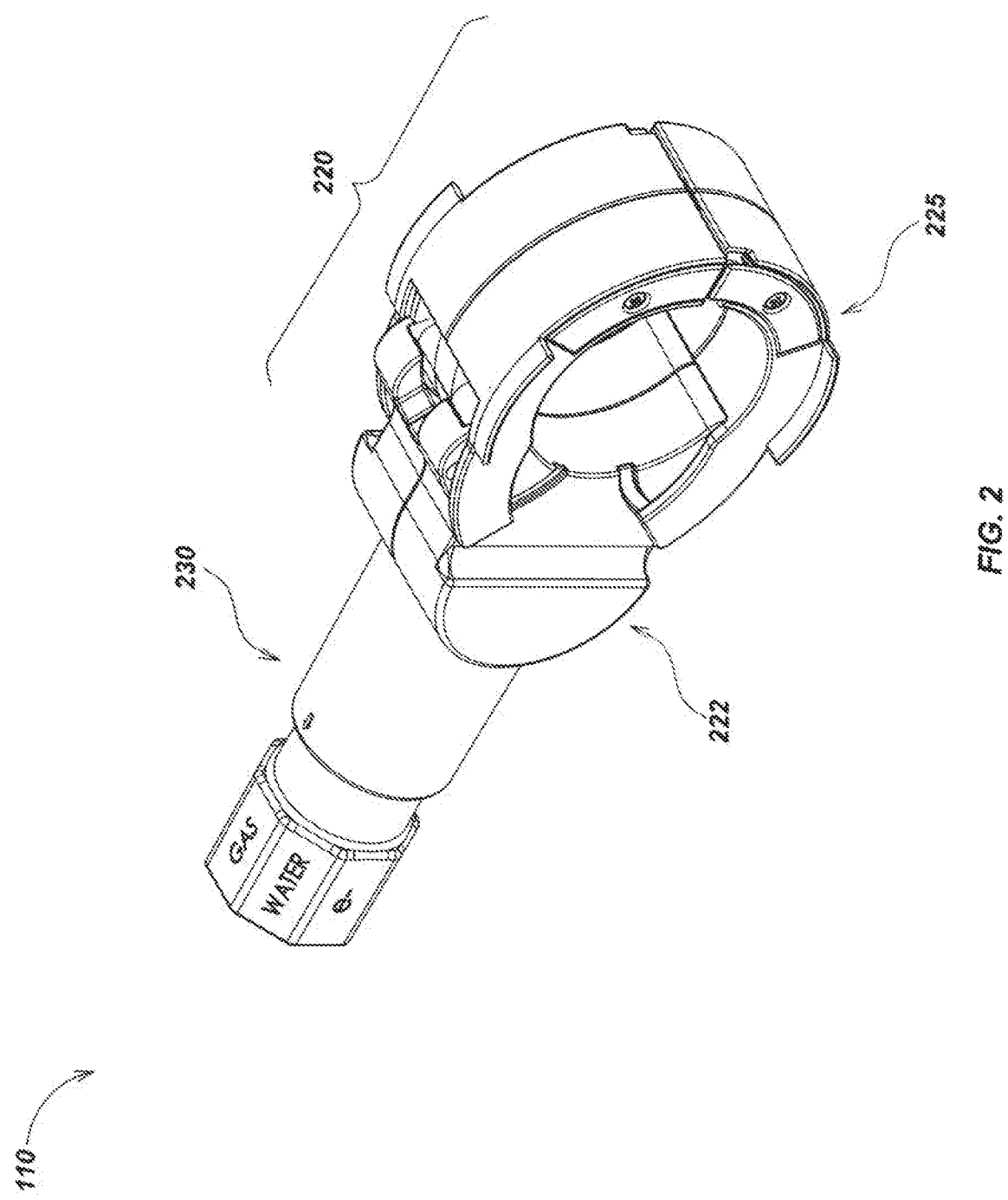
FIG. 2 is a detailed isometric view of the inductive clamp device embodiment of FIG. 1.
Figure 3:
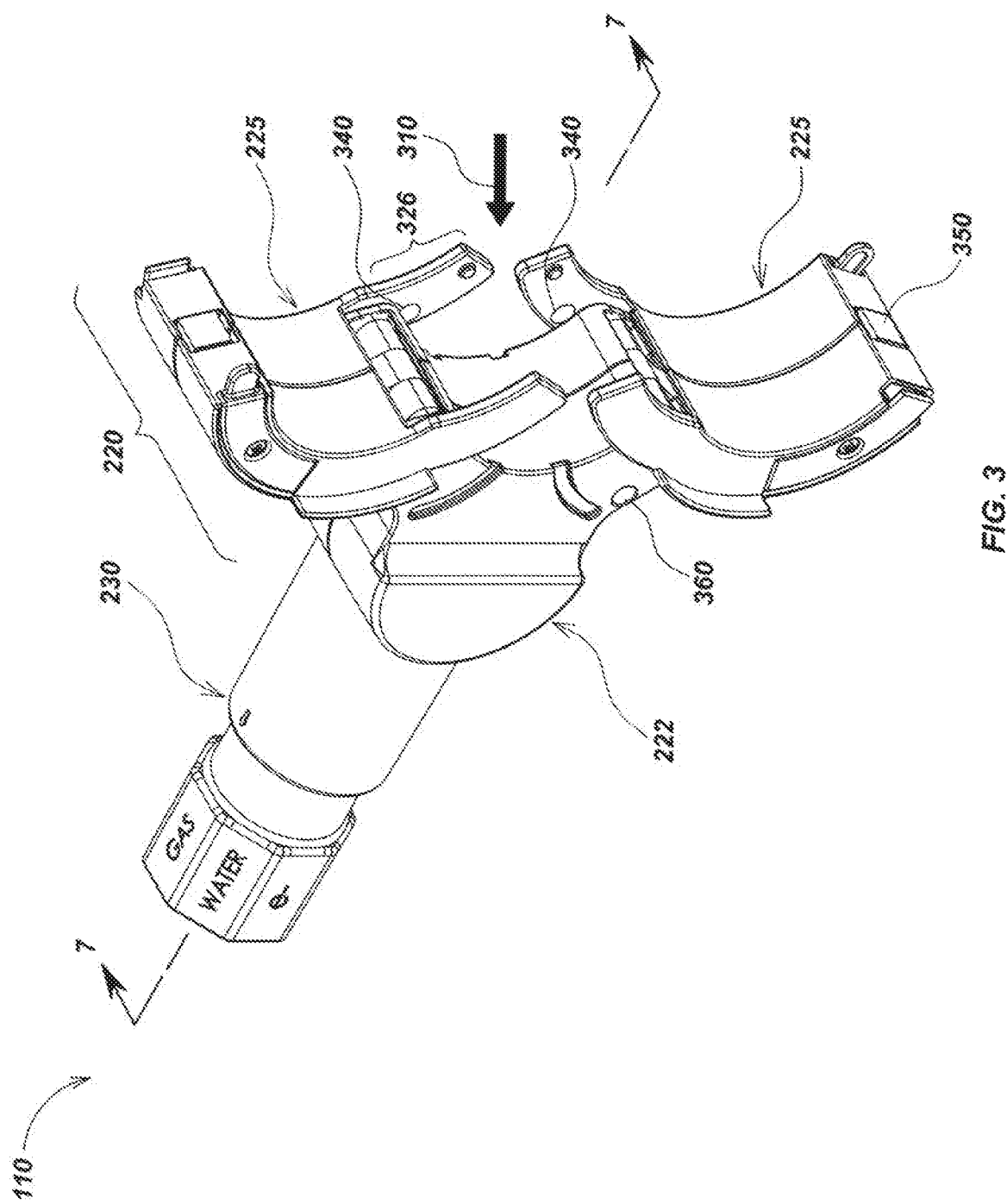
FIG. 3 is a detailed isometric view of the inductive clamp device embodiment of FIG. 1 with arm elements open.

Turning to FIGS. 2 and 3, the inductive clamp device embodiment 110 may be include a head assembly 220 embodiment secured about one end of a handle assembly embodiment 230. The head assembly 220 may further contain a base element embodiment 222 and arm elements embodiment 225. The arm elements 225 may be configured to open and close, such as to allow a user to attach the clamp around a utility or a stub coupled to the utility. For example, the arm elements 225 may be opened as shown in FIG. 3 and may then snap shut upon contact or actuation. In particular, when an inductive clamp device, such as the inductive clamp device 110 illustrated in FIG. 3 with arm elements 225 positioned in an open state, is made to contact a utility line, a force 310 may be enacted onto an arm lever section 326 in the arm elements 225 causing the arm elements 225 to close about the utility line.

Arm positions may be secured through mechanical, magnetic, or other position-securing mechanisms. For example, in an exemplary embodiment one or more magnets, such as the back arm magnets 340 (some of which are obscured in FIG. 3), front arm magnets 450 (illustrated in FIG. 4), and base element magnets 360 (some of which are obscured in FIG. 3) may be used to provide a force aiding in holding the arm elements open or closed. For instance, when the arm elements 225 are fully open, the orientation of the base element magnets 360 and the orientation of the back arm magnets 340 closest in proximity thereto may be oriented so that the polarities of each provide an attracting force to one another and aid in holding the arm elements 225 open. When the arm elements 225 are in a closed position, the orientation of the base element magnets 360 and the orientation of the back arm magnets 340 closest in proximity thereto may be such that the polarities of each provide an attracting force to one another and aid in holding the arm elements 225 closed.

Furthermore, each front arm magnet 450 (FIG. 4) may be oriented such that its polarities may provide an attracting force to the other front arm magnet 450 (FIG. 4) and aid in holding the arm elements closed when in a closed position. In other embodiments, additional magnets and/or other mechanisms, such as mechanical switches, latches, springs, and the like may be used to hold arm elements open, closed, and/or positioned in states somewhere in between fully opened and fully closed.

Figure 4:
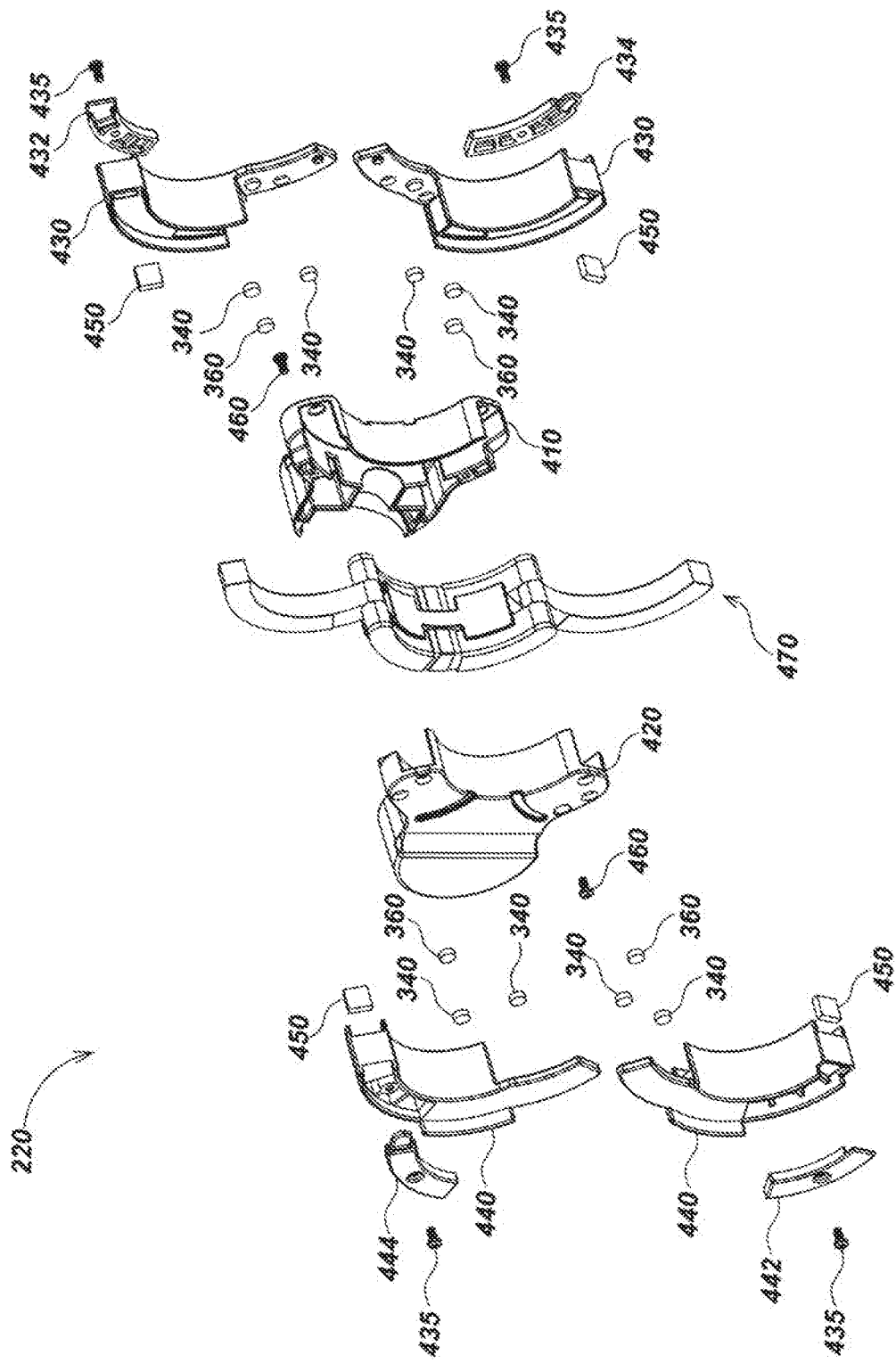
FIG. 4 is an exploded view of the head assembly embodiment of the inductive clamp device embodiment of FIG. 1.

Turning to FIG. 4, additional details of an embodiment of an inductive clamp device are illustrated. For example, the outer shell components of the head assembly 220 may include a top base shell half 410, a bottom base shell half 420, a top arm element shell half 430, and a bottom arm element shell half 440. A female top arm element plate 432 may secure by a screw 435 to an outer portion of one of the top arm element shell halves 430 and a male top arm element plate 434 may secure by a screw 435 to the other one of the top arm element shell halves 430. A female bottom arm element plate 442 may secure by a screw 435 to an outer portion of one of the bottom arm element shell halves 440 and a male bottom arm element plate 444 may secure by a screw 435 to the other one of the bottom arm element shell halves 440.

In assembly, the male top arm plate 434 and female top arm plate 432 as well as the male bottom arm plate 444 and the female bottom arm plate 442 may be mated and aid in securing the inductive clamp device 110 (FIG. 1) in a closed position. A front arm magnet 450 may be seated within the front on each arm half. The back arm magnets 340 may be seated within pockets formed towards the back of each arm half, and the base element magnets 360 may be seated within pockets formed within the top base shell halves 410 and bottom base shell halves 420. The various magnets may be held in place, for instance, using adhesives, solvents, or other mounting materials and methods.

In assembly, the top base shell half 410 and bottom base shell half 420 may be secured together through the use of screws 460. The top arm shell half 430 along each side of the head assembly 220 may secure to one of the bottom arm shell halves 430 along its corresponding side through the use of solvent welding, other welding techniques, potting, snaps, screws, adhesives, or other methods. For example, the top arm shell half 430 located along the right side of the head assembly 220 may secure to the bottom arm shell half 440 also located on the right side of the head assembly 220. Similarly, the top arm shell half 430 located along the left side of the head assembly 220 may secure to the bottom arm shell half 440 also located on the left side of the head assembly 220. In other embodiments snaps, screws, or other securing materials and methods may be used. In assembly, nubbins formed on an inner section and toward the rear of each of the top arm shell half 430 and the bottom arm shell half 440 may snap into respective divots formed on top base shell half 410 and bottom base shell half 420 and secure each arm in place. A magnetic core subassembly embodiment 470 may secure within the outer shell components so as to provide magnetic fields for inductive signal coupling to the targeted utility.

Figure 5:
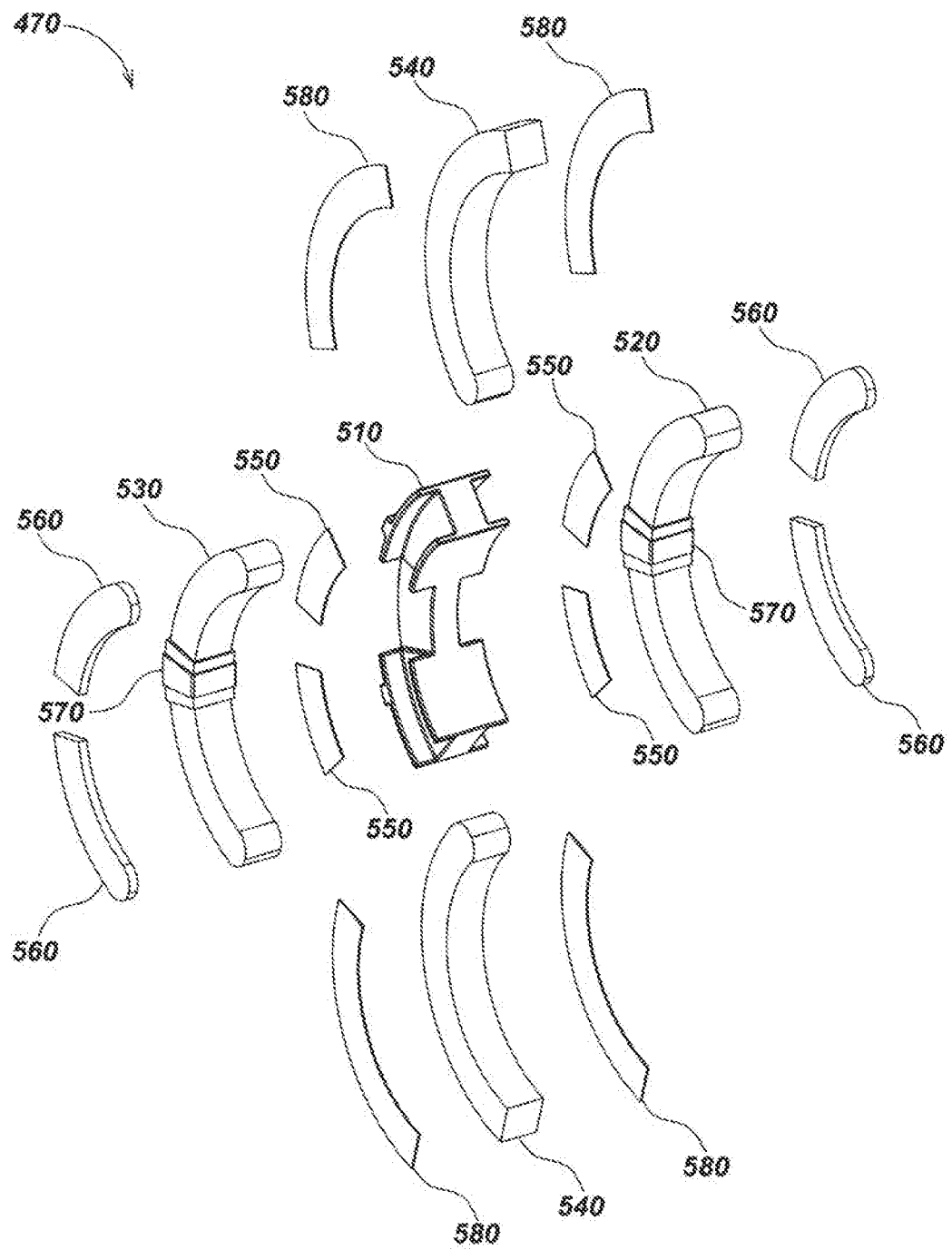
FIG. 5 is an exploded view of the magnetic core subassembly embodiment in FIG. 4.

Turning to FIG. 5, details of a magnetic core subassembly embodiment 470 are illustrated. The magnetic core subassembly may include a central support piece/component 510, a top central ferrite component 520, a bottom central ferrite component 530, and two arm ferrite components 540. The top central ferrite component 520 and bottom central ferrite component 530 may be seated onto the central support component 510 and secured thereto by adhesives or tape such as the double-sided high strength boding tape 550. Foam tape 560 may secure about the outward facing sections of the top central ferrite piece 520 and bottom central ferrite component 530 to provide cushioning to their respective ferrite pieces/components and aid in securing the central portion of the magnetic core subassembly 470 within the base element (as shown in FIG. 2) of the head assembly. Wire windings 570 may be located about the top central ferrite component 520 and bottom central ferrite component 530 and may be Litz wire to reduce high frequency losses in use or other wire types or alternate conductors. The ferrite arm components 540 may also secure within respective arm elements 225 (FIG. 2) and be held in place through the aid of adhesives or tape such as the double-sided high strength boding tape 580.

Figure 6:
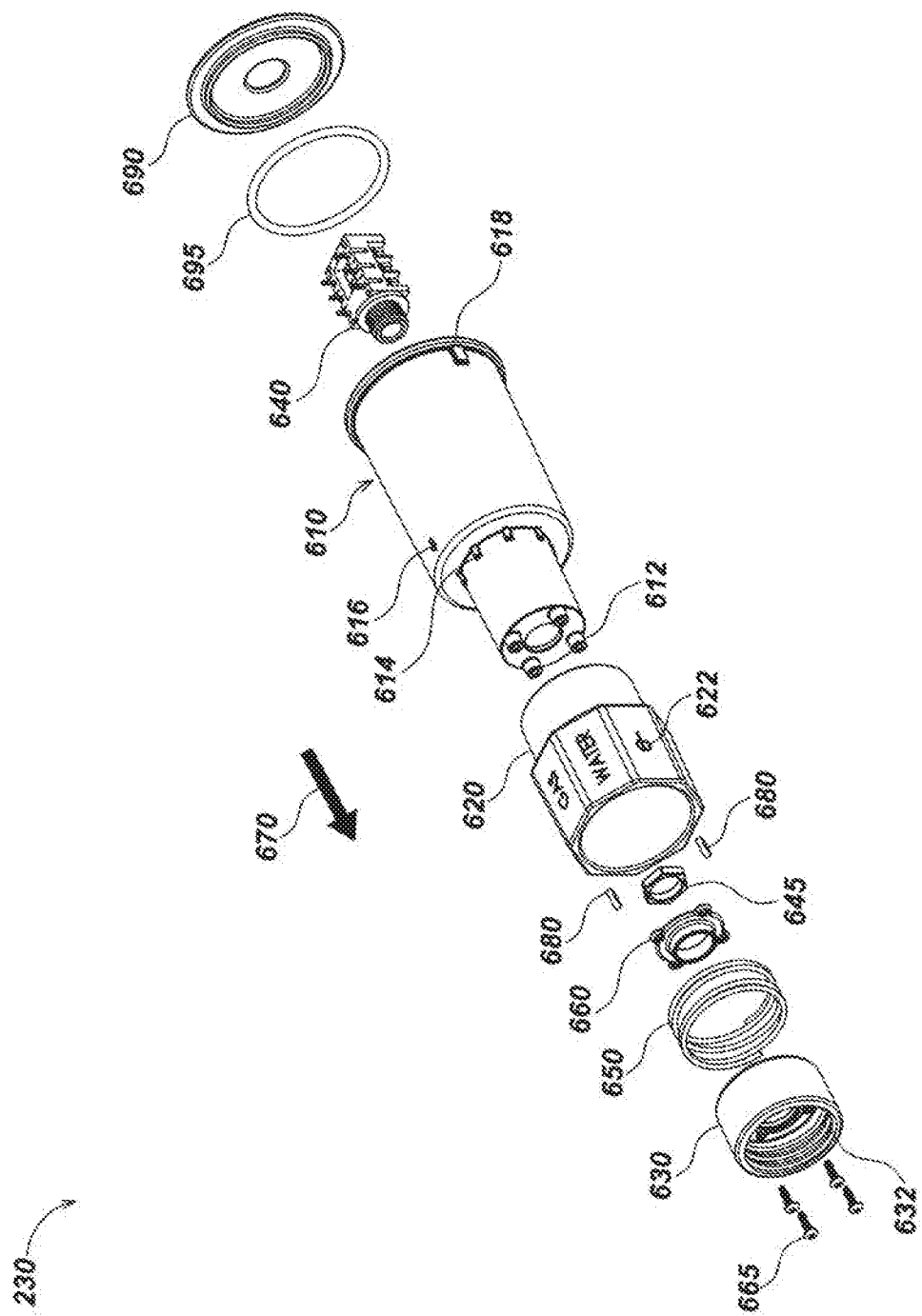
FIG. 6 is an exploded view of the handle assembly embodiment of the inductive clamp device embodiment of FIG. 1.

Turning to FIG. 6, details of an embodiment 230 of a handle assembly are illustrated. Handle assembly embodiment 230 may include a core handle component 610, which may be largely cylindrical, a utility selector element 620, and a locking sleeve 630. A cable jack 640 may be seated within a narrow back section of the core handle component 610 and secured thereto by nut 645 attached on the rear-facing side of the core handle component 610. A spring 650 and the locking sleeve 630 may be seated and may mount snugly within the utility selector piece 620 as well as a locking sleeve gasket 660. A series of screws 665 may secure the locking sleeve 630 and locking sleeve gasket 660 to screw mounting posts 612 formed on the core handle piece 610 so as to trap the spring 650 between the utility selector element 620 and the locking sleeve 630.

A series of core handle piece keying features 614 formed on the core handle component 610 may key to grooves (not illustrated) within the inner forward-facing section of the utility selector element 620 in assembly so as to prevent unwanted rotations of the utility selector element 620 and to retain it in a selected position once that position is selected by a user. In assembly, tension may be provided to the utility selector element 620 by the spring 650 so as to hold the utility selector element 620 to the core handle component 610. Wanted rotations of the utility selector element 620 may occur when a force along the backwards direction 670 is applied to the utility selector element 620 sufficient to overcome tension provided by the spring 650 and allow the utility selector element 620 to clear the core handle piece keying features 614 formed on the core handle component 610.

In operation, the utility selector element is actuated by a user to a desired setting, which may be a utility type (e.g., gas, water, electric, sewer, etc.) or other parameter. When rotations of the utility selector element 620 occur upon user actuation, one or more magnets, such as the magnets 680 secured within the utility selector piece 620 may rotate. Magnetic sensors (not illustrated) within the handle assembly 230 may be used to detect the position and subsequent change of position due to rotations of the utility selector piece 620 and attached magnets 680. The detected position of the magnets 680 may be used to select a utility type, device mode, or other selection and generate a corresponding output signal or provide a corresponding state indication or data. In handle assembly 230, a utility type 622 may be indicated upon the utility selector element 620 such as through use of text, color, symbols, etc. An arrow indicator 616 on the core handle component 610 may align utility types 622 to allow a user to designate utility, frequency selection, and/or selection or other system modes or parameters. Electronic circuitry may be included in the inductive clamp device to sense and generate a signal or data corresponding to a user selected utility type or other parameter. This information may be stored in a memory, transmitter, and/or associated with other data as generated within or received by the inductive clamp device.

In some embodiments, colors and iconography commonly used in the industry used to notate the various utility types may be used on the inductive clamp. In some embodiments, an off mode may be selected through the utility selector to power on or off the inductive clamp device. An end piece 690 and O-ring 695 may seat on the forward-facing end of the handle assembly 230. The end piece 690 may be formed with a central opening so as to allow wiring 710 (illustrated in FIG. 7) to pass through and connect the cable jack 640 and/or internal PCBs (not illustrated) and/or other sensors/circuitry (not illustrated) to the wire windings 570 illustrated in FIG. 5.

In some embodiments, magnetic shielding may partially or fully be incorporated into the core handle piece 610. A keyed lip feature 618 formed on the core handle piece 610 nearest the end piece 690 and O-ring 695 may function, in assembly, to key and hold in place the handle assembly 230 to the head assembly 220 (FIG. 2). The locking sleeve 630 may contain internal threads 632 designed to mate with threads on any connecting cable and secure said cable thereto.

Figure 7:
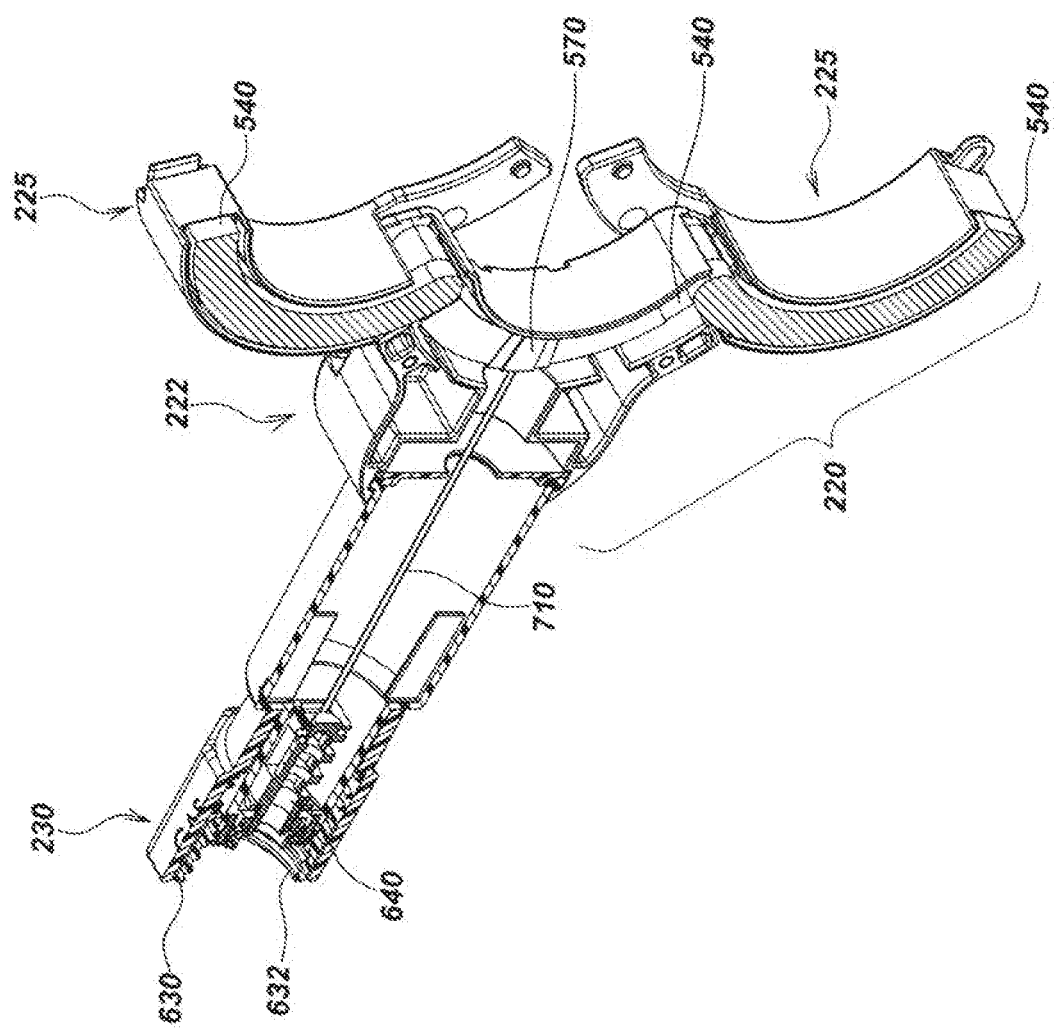
FIG. 7 is a sectional view of the embodiment of FIG. 3 along line 7-7.

Turning to FIG. 7, details of wiring 710 is shown connecting the cable jack 640 to the wire windings 570 for providing current to the windings to generate magnetic fields for coupling to a utility. In some embodiments, a PCB or other circuitry may be included between the cable jack 640 and the wire windings 570. This circuitry may include various sensors and other electronic components. These sensors and/or other component may include, but are not limited to, global navigation systems (GNS) sensors/modules such as global position system (GPS) receiver modules, accelerometers, compass sensors, gyroscopic sensors, other inertial/position sensors, geophones, magnetic sensors, gas sensors, temperature sensors, environmental condition sensors, sondes and/or other sensors or input devices. For example, other sensors and/or input devices may include cameras, IR sensors, and/or other visual sensors, IR sensors, ultraviolet sensors, and/or acoustic sensors such as a microphone or other sound or vibrational sensors.

In operation, incorporated or coupled GNS or GPS sensors and/or other inertial sensors and/or sondes may be used, for example, to determine inductive clamp device position and orientation in relation to a locator and/or other locate system devices and/or to provide absolute coordinate information or for generation of time synchronization signals or phase synchronization signals. Gas sensors may, for example, be used for detecting potentially hazardous gas leaks and subsequently alert a user if such a leak is detected. Acoustic sensors may, for example, be used for acoustic leak detection or detecting vibration.

Camera and/or other imaging or light sensors may be used to capture video or images of how an inductive clamp device is connected to a utility line, such as through a captured image that is stored in a memory of the inductive clamp for later retrieval. The captured image may be associated with particular transmitter or clamp output parameters or other data or information associated with locate system operation. A microphone may be used for detecting voice commands from a user and subsequently controlling various aspects of the inductive clamp device, such as through automatic frequency or utility type selection, or for recording user information associated with the locate operation.

Magnetic sensor(s) may, for example, be used to measure the magnetic output field produced by the inductive clamp device in use and store corresponding data in memory or send it to other locate system devices. The measured output of the clamp may further be used to feedback data regarding output power of the inductive clamp device to other devices or systems or to store the data in memory and/or to determine if the clamp is fully closed or not. In some embodiments, a series of additional O-rings and/or other seals may be included to allow various embodiments of an inductive clamp device to be fully or partially submersible without damaging internal components that may otherwise be damaged by moisture or fluid ingress.

Figure 8:
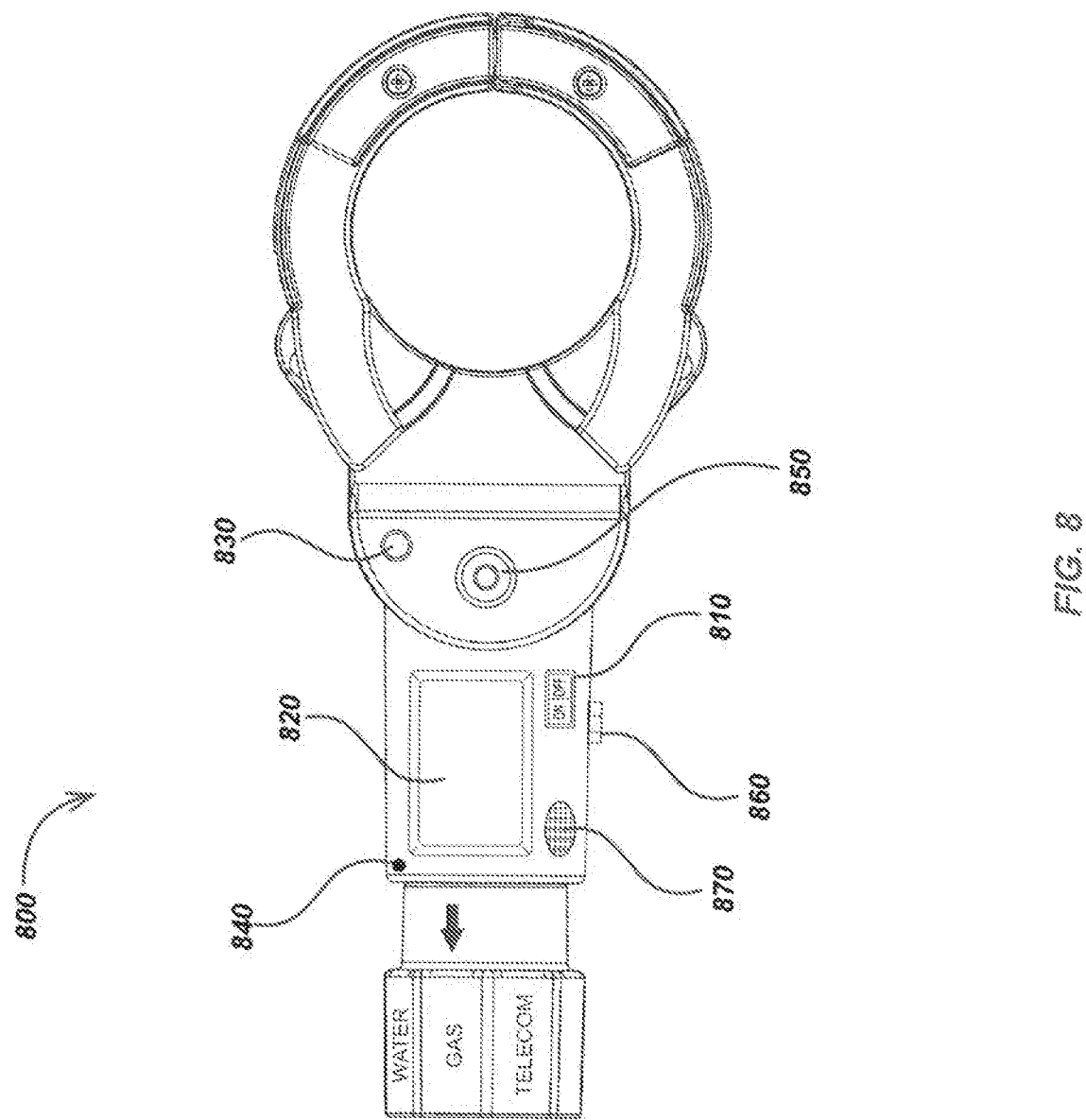
FIG. 8 is a side view of another embodiment of an inductive clamp device.

Turning to FIG. 8, additional details of an inductive clamp device embodiment are shown. For example, some inductive clamp device embodiments in accordance with aspects of the disclosure may include a variety of indicators, controls, and/or other features. The inductive clamp device 800 may, for example, include an on/off button 810, a graphical display 820, an LED indicator 830, a microphone 840, a camera 850, an accessory port 860, and/or an audio output element such as a speaker/buzzer 870 or other audio output element.

The on/off button 810 may be used for powering the inductive clamp device 800 on and/or off. The graphical display 820 and/or LED indicator 830 may provide a display to notify the user of pertinent system and/or locate and/or other information or data, such as, for example, a state of the utility selector element or other data or information. The graphical display 820 may be an LCD display or other visual display element as known or developed in the art. When coupled with controls (not illustrated), a graphical display, such as the graphical display 820, may be used for inductive clamp device control and may include touch-screen functionality to allow direct display contact for control.

The LED indicator 830 may be a daylight readable LED and may be used, for example, to provide a user with a visual indicator that the inductive clamp device arms are properly closed about a utility or utility stub or coupled conductor. The microphone 840 may be configured, for example, to sense acoustic leak detection and/or detecting vibration and/or receive voice commands, with the inductive clamp processing these commands or inputs in one or more processing elements. The camera 850 may be used to document how the inductive clamp device 800 has been connected to a utility line and/or other visual data/information by capturing and storing images or video. The camera 850 may be a visual light camera, an IR camera, a UV camera, or other camera type, and may be configured with a variety of different lenses and filters.

The accessory port 860 may be used for connecting other clamps, clips, and/or other devices. Further details and illustrations of additional clamps and clips being connected through an inductive clamp device embodiment with a similar accessory port are shown and described in conjunction with FIG. 13 subsequently herein. In some embodiments, an inductive clamp device embodiment may include multiple ports. Other port types may be used besides what is illustrated herein. For example, an accessory port may be configured for data connections and may be a mini, micro, or standard USB port or other ports designed for data and/or power management. In some embodiments with USB ports, such an inductive clamp device may be configured for communicating data to connect a USB thumbstick or external hard drive for purposes of data logging or data transfer.

The speaker/buzzer 870 may be configured to provide a user with audible indicators. Such audible indicators may include, but are not limited to, alerts designed to indicate incorrect clamp position, detection of a possible gas leak when the inductive clamp device is configured with gas sensors, or to communicate other system/device information/data to the user. Some inductive clamp device embodiments may be configured with a mechanical coupling or extension connection to secure to a hot stick (not illustrated) or other extension arm allowing a user to reach such an inductive clamp device into areas which may otherwise be difficult or unsafe to access such as submerged utilities or high voltage lines. In such embodiments, the inductive clamp device may be configured to open and close as well as control other device features remotely, such as through a wired or wireless remote control device or module, or via a cellular phone, WiFi device, or other wired or wireless connection. Such remote control configurations may include the use of wireless communication technologies, a cable or rope and pulley system (not illustrated), and/or other technologies for remotely controlling such an inductive clamp device.

Turning to FIGS. 9-11A, another inductive clamp device embodiment 900, in accordance with aspects of the present disclosure, is illustrated. Inductive clamp embodiment 900, which may be configured to operate without a connected transmitter device, is also referred to hereafter as a "stand-alone signal generating and coupling device" or "integrated inductive clamp" or just "integrated clamp" for brevity. This may be implemented by incorporating a transmitter module within the inductive clamp or closely coupling a transmitter module, in whole or in part, to the inductive clamp element.

The inductive clamp device embodiment 900 may be powered by an external power source such as a battery 910 coupled to a battery terminal 920 and connected to the inductive clamp device 900 via cord 930, or via other powering methods such as an integrated high density battery or other power supply. A ground stake 940 may secure to the battery terminal housing to be used in embodiments wherein direct coupling to the utility is done. In other embodiments, grounding may be provided by capacitive footing and/or other grounding methods connected directly or indirectly to the inductive clamp device.

The inductive clamp device 900 and/or battery terminal 920 may be configured with transmitter modules or components to generate signals for inducing onto a utility line or other conductor. Transmitter components may be the same as or similar to the various transmitter components as described in the incorporated applications, or may be the same as or similar to other transmitter components as known or developed in the art. In an exemplary embodiment, the battery 910 may be an intelligent battery configured the same as or similarly to those disclosed in U.S. patent application Ser. No. 13/532,721 entitled MODULAR BATTERY PACK APPARATUS, SYSTEMS, AND METHODS filed Jun. 25, 2012, the content of which is incorporated by reference herein.

Figure 9:
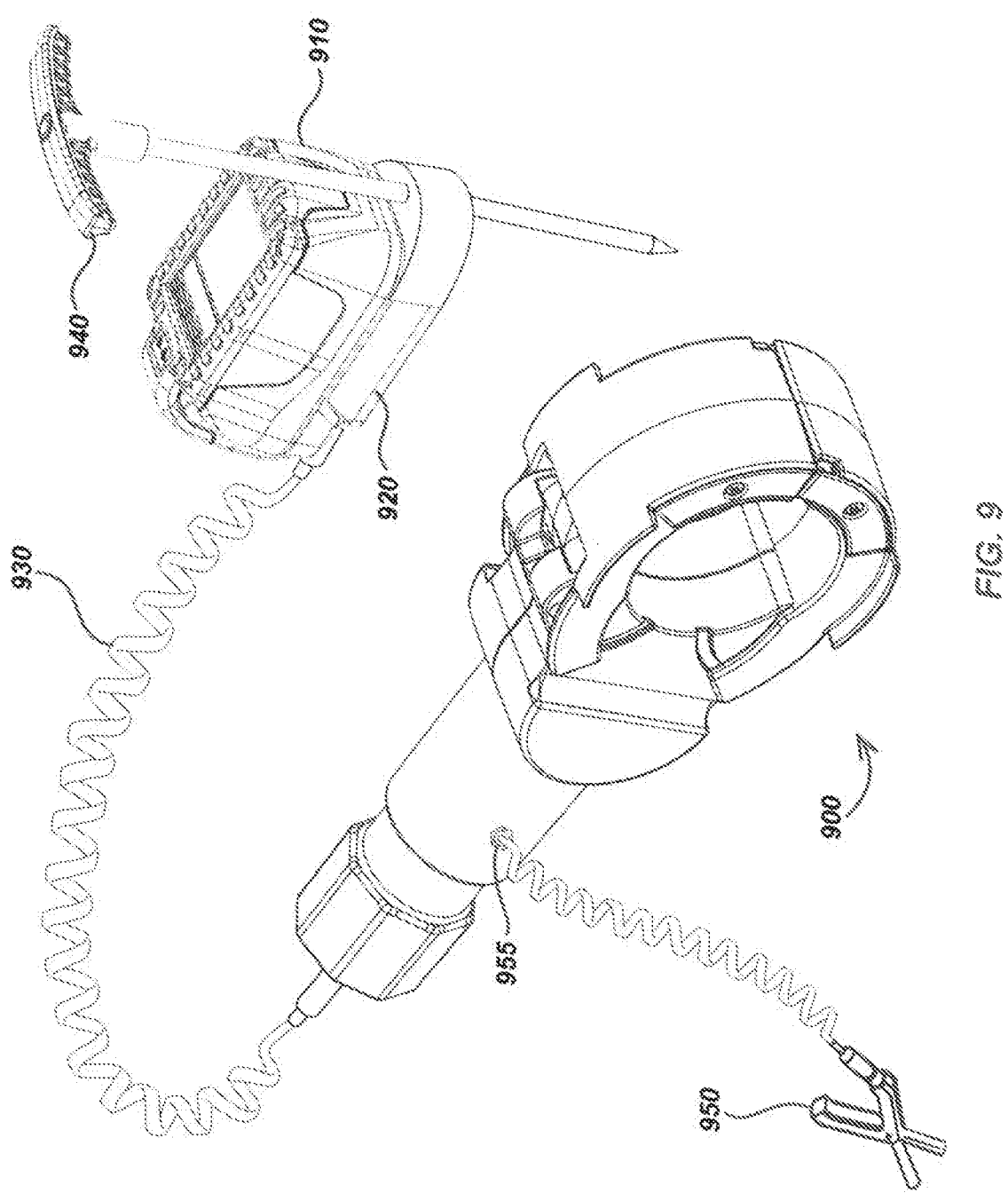
FIG. 9 is an isometric view of an inductive clamp device embodiment configured as a stand-alone signal generation and coupling device or integrated inductive clamp.

A direct connect clip 950 may connect via an accessory port 955 in the embodiment illustrated in FIG. 9. Other clamps/clips, accessories, and/or grounding apparatuses may be connected and configured to function through the accessory port 955. As best illustrated in FIG. 10, the battery terminal 920 may be made to secure, via connector 1010, which may be a strap or clip or other connector, to the inductive clamp device 900 for storage and/or during use of the inductive clamp device 900. The battery terminal 920 may be configured with one or more of the sensors and/or indicators and/or other technology discussed previously herein in connection with FIGS. 7 and 8. For instance, the battery terminal 920 may be configured with one or more GNS or GPS sensors and/or other inertial sensors and/or daylight readable LEDs. When in use, the inductive clamp device 900 may couple to a utility, such as the utility line 1110 in FIG. 11A. Further illustrated in FIG. 11A, a ground stake, such as the ground stake 1120, may connect to the battery terminal 920 to provide grounding to the device. Such grounding may only be necessary when the device is used in a direct connect mode. In other embodiments, a capacitive footing and/or other grounding methods may be used to ground to the device. Such grounding may also be connected to an inductive clamp device rather than, or in addition to, such a battery terminal.

As illustrated in FIG. 11A, a locating system embodiment in accordance with aspects of the disclosure may include one or more inductive clamp devices configured as stand-alone signal generation and coupling devices and/or one or more inductive clamp devices configured to function with the use of a transmitter device, such as the transmitter device 1130. The transmitter device 1130 may be coupled to utility lines 1140 and 1150 through the inductive clamp devices 1160. The transmitter device 1130 may further be connected to a ground stake 1170. Signal may be generated by the inductive clamp device 900 configured as stand-alone signal generation and coupling device and the transmitter device 1130 and induced onto their respectively coupled utility lines 1110, 1140, and 1150.

These signals may be all the same frequency or different on each utility line. The one or more frequencies may be multiplexed in time and/or frequency which may allow a user 1180 equipped with a locator device 1190 to effectively locate and identify each utility line 1110, 1140, and 1150. Example multiplexing schemes as may be used in various embodiments are described subsequently herein as well as in co-assigned U.S. patent application Ser. No. 13/570,211, entitled PHASE-SYNCHRONIZED BURIED OBJECT LOCATOR APPARATUS, SYSTEM, AND METHODS, filed Aug. 8, 2012, which is incorporated by reference herein.

Figure 11B:
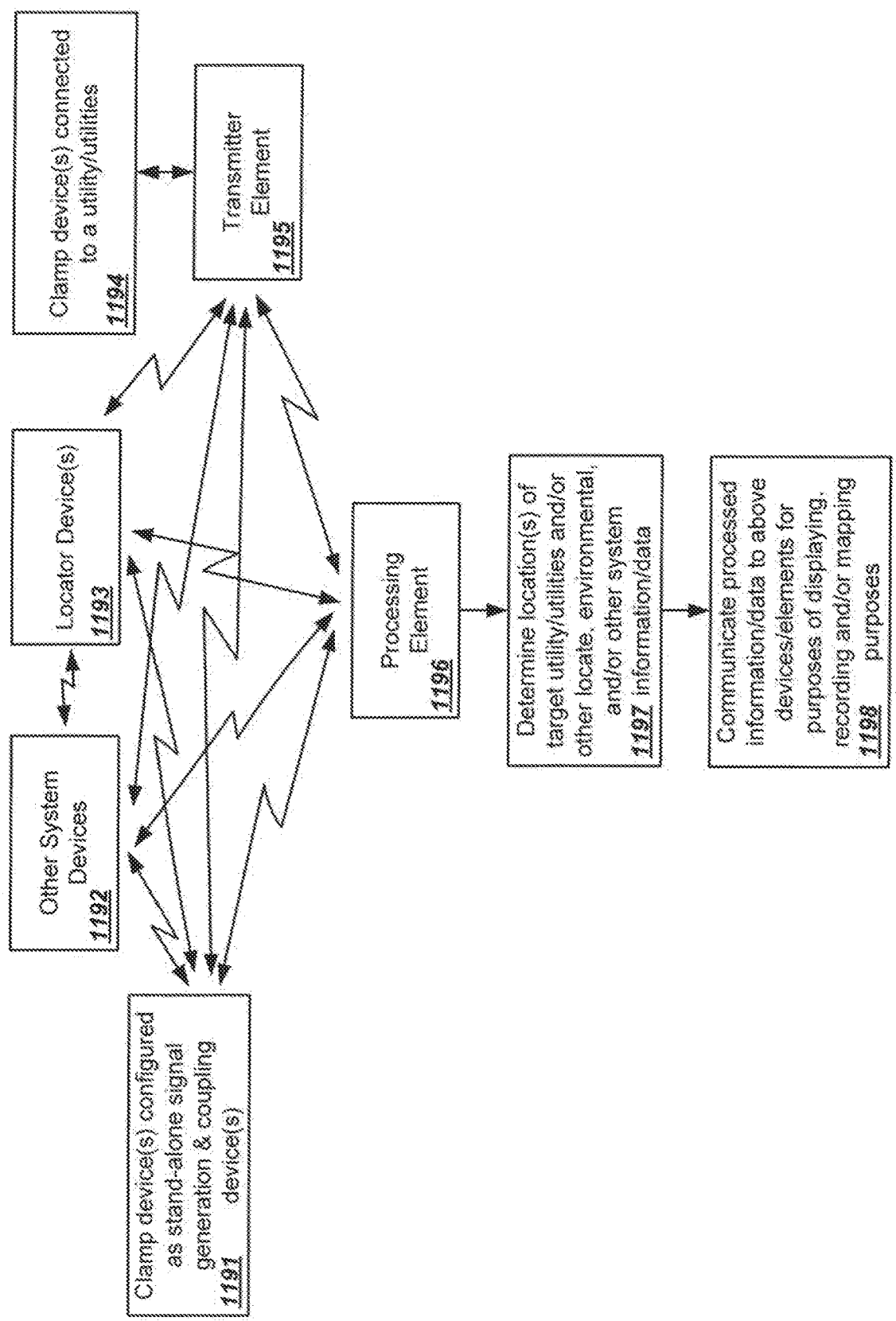
FIG. 11B is a diagram illustrating an embodiment of a method by which data/information may be exchanged, processed, and/or communicated to users within a locating system embodiment utilizing multiple different inductive clamp device embodiments.

Turning to FIG. 11B, details of an embodiment of a process by which data/information may be exchanged, processed, and or communicated to users within a locating system such as the locating system presented in FIG. 11A are illustrated. The various inspection system devices including, but not limited to, one or more inductive clamp device(s) configured as stand-alone signal generation and coupling device(s) 1191, other system devices 1192 (base stations, laptop computers, smart phones, etc.), one or more locator devices 1193, and one or more inductive clamp device(s) connected to a utility or utilities 1194 and connected to a transmitter element 1195 via cord, cable, and/or other physical tethering used for data exchange, may communicate pertinent locate, environmental, and/or other systems information/data to a processing element 1196.

This communication may be done by modules implementing various wireless technologies as described herein, such as WiFi, Bluetooth, cellular, ISM, etc. The processing element 1196 may, in some embodiments, reside within a locator device such as the locator device 1193. In other embodiments, processing may be shared through any or all of the various aforementioned system devices and elements (i.e. devices/elements 1191-1195) configured for processing data. The processing element 1197 may determine refined location(s) of target utility/utilities and/or other locate, environmental, and/or system information/data, and this data may be stored, transmitted, etc. This processed/updated information/data may further be communicated back to one or more system devices/elements, such as the system devices/elements 1191-1195, for purposes which may include displaying, recording, and/or utility mapping purposes 1198.

Figure 12:
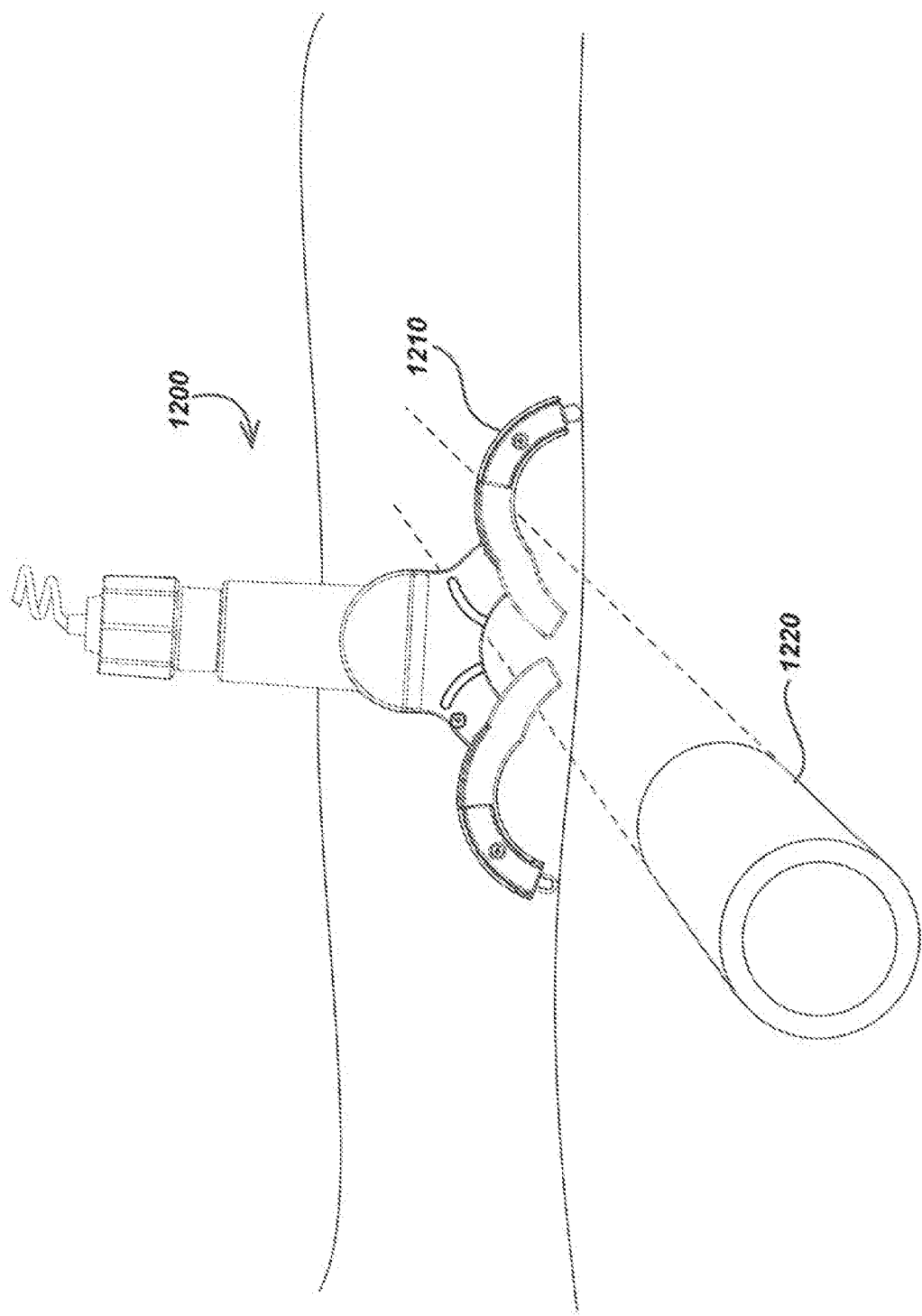
FIG. 12 is an illustration of an inductive clamp device embodiment in open induction mode.

Turning to FIG. 12, another inductive clamp device embodiment 1200 in accordance with aspects of the present disclosure is illustrated. Embodiment 1200 may be used to induce signal onto a utility line or other conductor when the arms of the inductive clamp device are open and the device is rested on or near the utility, referred to hereafter as "open induction mode." The inductive clamp device 1200 with arms 1210 positioned in open induction mode above utility 1220 induces signal onto the utility 1220. The inductive clamp device 1200 may be connected to a transmitter device (not illustrated) and/or may be configured to function as a stand-alone signal generation and coupling device. Furthermore, grounding (not illustrated) may be provided to the inductive clamp device 1200 through a connected transmitter (not illustrated) or ground stake (not illustrated) and/or other grounding method.

Figure 13:
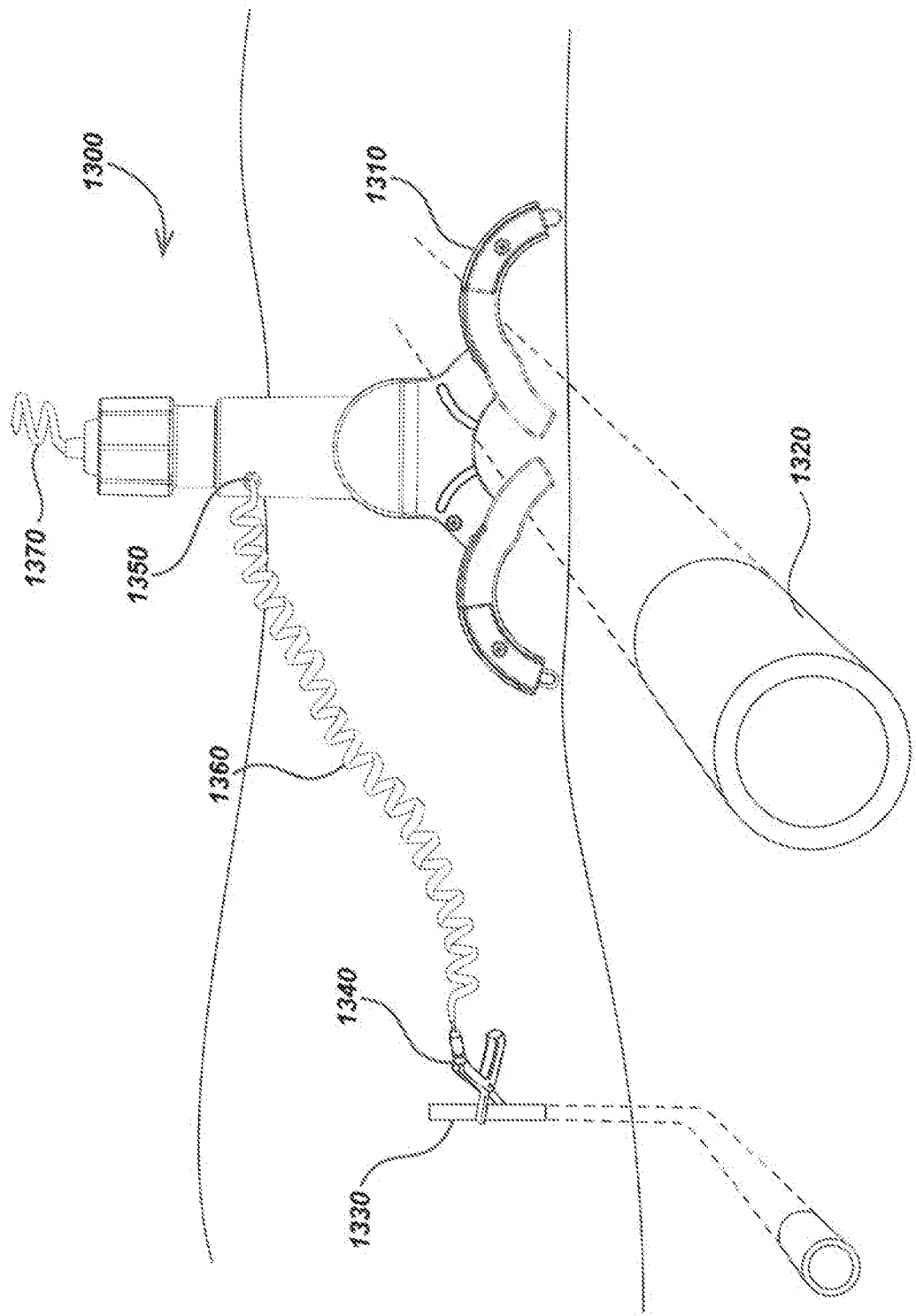
FIG. 13 is an illustration of an alternative inductive clamp device embodiment in open induction mode with connected direct connect clip.

Turning to FIG. 13, some inductive clamp device embodiments, such as the inductive clamp device embodiment 1300 with arms 1310 positioned in open induction mode above utility 1320 or optionally closed (not illustrated) to induce signal onto the utility 1320, may further be configured to attach other accessory devices. For example, coupled to a separate utility line 1330, a direct connect clip 1340 may be connected to the inductive clamp device 1300 through accessory port 1350 via cord 1360. In such uses, the inductive clamp device 1300 and direct connect clip 1340 may be configured to induce frequency onto their respective coupled utility lines 1320 and 1330. The signals may all be the same frequency or be different frequencies on each utility line. These may be multiplexed in time and/or frequency as discussed in subsequent sections herein. A grounding connection may be established in such use as that illustrated in FIG. 13. The grounding connection may, for instance, be established through cord 1370.

Figure 14A:
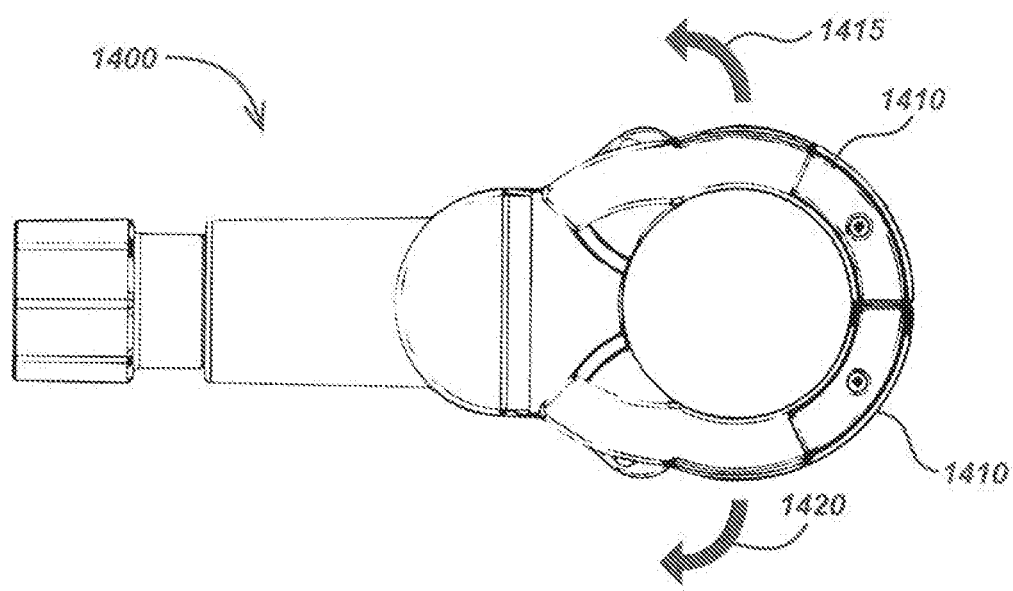
FIG. 14A is a side view of an inductive clamp device embodiment illustrating interchangeability of arm elements.
Figure 14B:
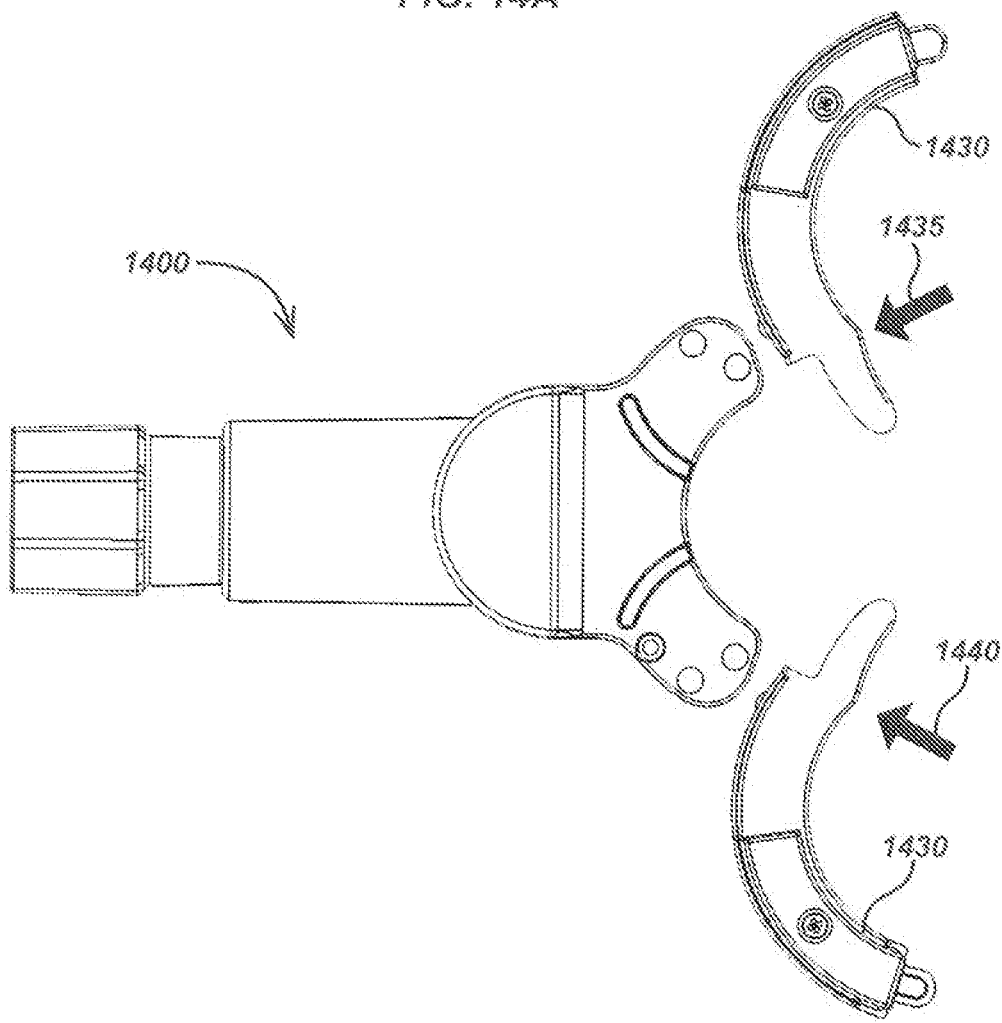
FIG. 14B is a side view of an inductive clamp device embodiment further illustrating the interchangeability of arm elements.

Turning to FIGS. 14A-14C, an inductive clamp device embodiment 1400 in accordance with aspects of the present disclosure may be configured for use with multiple interchangeable arms and/or clamping heads and/or replaceable magnetic core pieces/components. The inductive clamp device 1400, for example, may include a set of small arms 1410. The small arms 1410 may be configured to dislodge from the body of the inductive clamp device 1400 when overstressed or when a force, such as a force along direction lines 1415 and/or 1420 is applied by a user. Arms of different sizes, shapes, materials, and/or containing different geometries of magnetic core pieces may replace the small arms 1410. For example, large arms 1430 may be snapped into place by a user by applying force to the large arms 1430 along directions 1435 and 1440 respectively.

In some embodiments, the magnetic core pieces/components within the arms and/or body of an inductive clamp device may also be replaceable by a user. As best illustrated in the side by side comparison of FIG. 14C, a variety of different interchangeable arms may be used. In FIG. 14C, the same inductive clamp device 1400 is fitted with three different sized arms, small arms 1410, large arms 1430, and extra large arms 1450. Other sized arms configured in other and/or using other geometries may also be used.

Turning to FIG. 15, an inductive clamp device embodiment 1510 may comprise a head assembly embodiment 1520 secured about one end of a handle assembly embodiment 1530. The head assembly 1520 may further include a base element 1522 with a knob mechanism 1524 configured to open and close the arm elements 1526. The knob mechanism 1524 may provide tension to the arm elements 1526, allowing the inductive clamp device 1510 to remain in place when attached to a utility or positioned in open induction mode or in some position in between the two. In other embodiments, additional magnets and/or other attachment/retention mechanisms may be used to hold arm elements open, closed, and/or positioned in states somewhere in between fully opened and fully closed.

A magnetic core subassembly 1540, which is partially obscured in FIG. 15, may slightly protrude from within the ends of the arm elements 1526 such that when the inductive clamp device 1510 is closed, gapping between components of the magnetic core assembly 1540 may be substantially eliminated or reduced to the smallest extent possible. Details of the magnetic core subassembly embodiment are shown in further detail in connection with FIG. 17 and described subsequently herein Turning to FIG. 16, the outer shell components of the head assembly 1520 may be comprised of a top base shell half 1610, a bottom base shell half 1620, a series of back arm shell halves 1630, a series of front arm shell halves 1640, a central base piece 1650, a top knob piece 1660, and a bottom knob piece 1670. The shell outer components may conceal, at least in part, the magnetic core subassembly 1540. In assembly, the central base piece 1650 may be seated between the top base shell half 1610 and bottom base shell half 1620 such that a series of rear prong features 1652 (one of which is obscured in FIG. 16) are formed towards a rear section on the central base piece 1650 which may respectively extend through a top base gap 1612 formed through the top base shell half 1610 and a bottom base gap 1622 formed through the bottom base shell half 1620.

A central portion of the magnetic core subassembly 1540 may be seated within and secured to the central base piece 1650 in assembly. A series of screws 1680 may secure the top base shell half 1610 and bottom base shell half 1620 together. The rear prong features 1652 of the central base piece 1650 extending through the top base gap 1612 and bottom base gap 1622 may further extend and seat within a spiral guide feature 1662 formed on the inner surface of the top knob piece 1660 as well as a similar spiral guide feature (not shown) formed on the inner surface of the bottom knob piece 1670. The top knob piece 1660 and bottom knob piece 1670 may key together via a central axis piece 1690 such that when the top knob piece 1660 is made to rotate the bottom knob piece 1670 may also rotate and vice versa. The central axis piece 1690 may fit through a top central hole feature 1614 through the top base shell half 1610 and a bottom central hole feature 1624 formed through the bottom base shell half 1620 prior to keying centrally to the top knob piece 1660 and bottom knob piece 1670 respectively.

A set of screws 1692 may secure the top knob piece 1660 and bottom knob piece 1670 to the central axis piece 1690. When the top knob piece 1660 and/or bottom knob piece 1670 is rotated, the rear prong features 1652 may be made to move back and forth along the top base gap 1612 and bottom base gap 1622 due to the spiral guide feature 1662 formed on the inner surface of the top knob piece 1660 as well as a similar spiral guide feature (not shown) formed on the inner surface of the bottom knob piece 1670, thus causing the central base piece 1650 to move back and forth.

A series of arm prong features 1632 formed on the back arm shell halves 1630 may snap into a series of top shell front prong retainer features 1616 and bottom shell front prong retainer features 1626 formed onto the top base shell half 1610 and a bottom base shell half 1620 respectively. A set of arm sliding grooves 1634 formed through the back arm shell halves 1630 may also snap onto front prong features 1654 formed on the central base piece 1650. The arm sliding grooves 1634 may be formed such that the front prong features 1654 formed on the central base piece 1650 may slide within during opening/closing of the arm elements 1526 (FIG. 15). The front arm shell halves 1640 may each secure to their respective back arm shell halves 1630 via screws 1694 enclosing arm components of the magnetic core assembly 1540 within. In use, movement of the central base piece 1650 due to rotations of the top knob piece 1660 and/or bottom knob piece 1670 may cause opening/closing of the connected arm elements 1526 (FIG. 15) components such as the back arm shell halves 1630, front arm shell halves 1640, and enclosed arm components of the magnetic core assembly 1540 to open and close.

Figure 16:
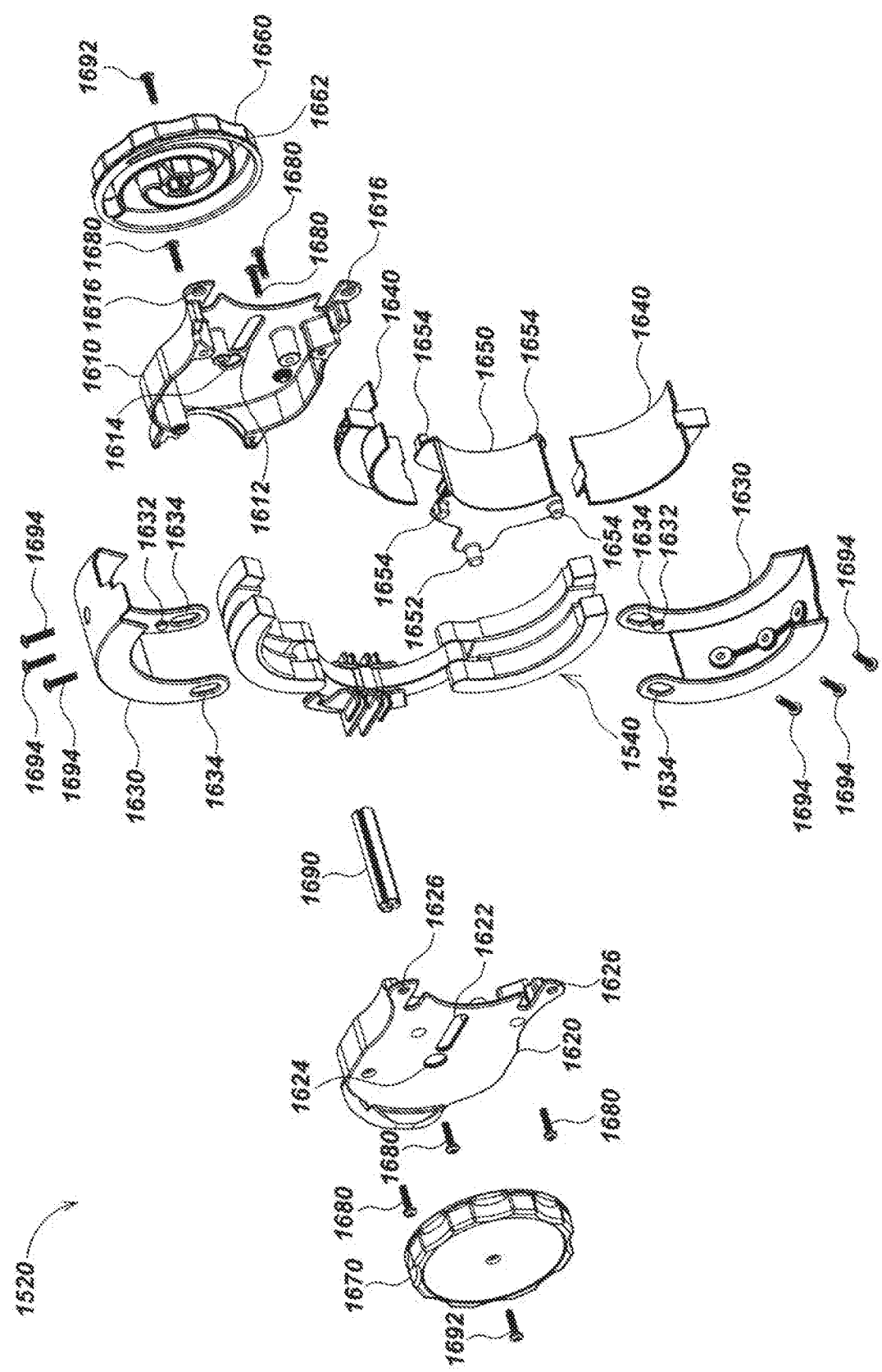
FIG. 16 is an exploded view of the head assembly of the inductive clamp device embodiment of FIG. 15.
Figure 17A:
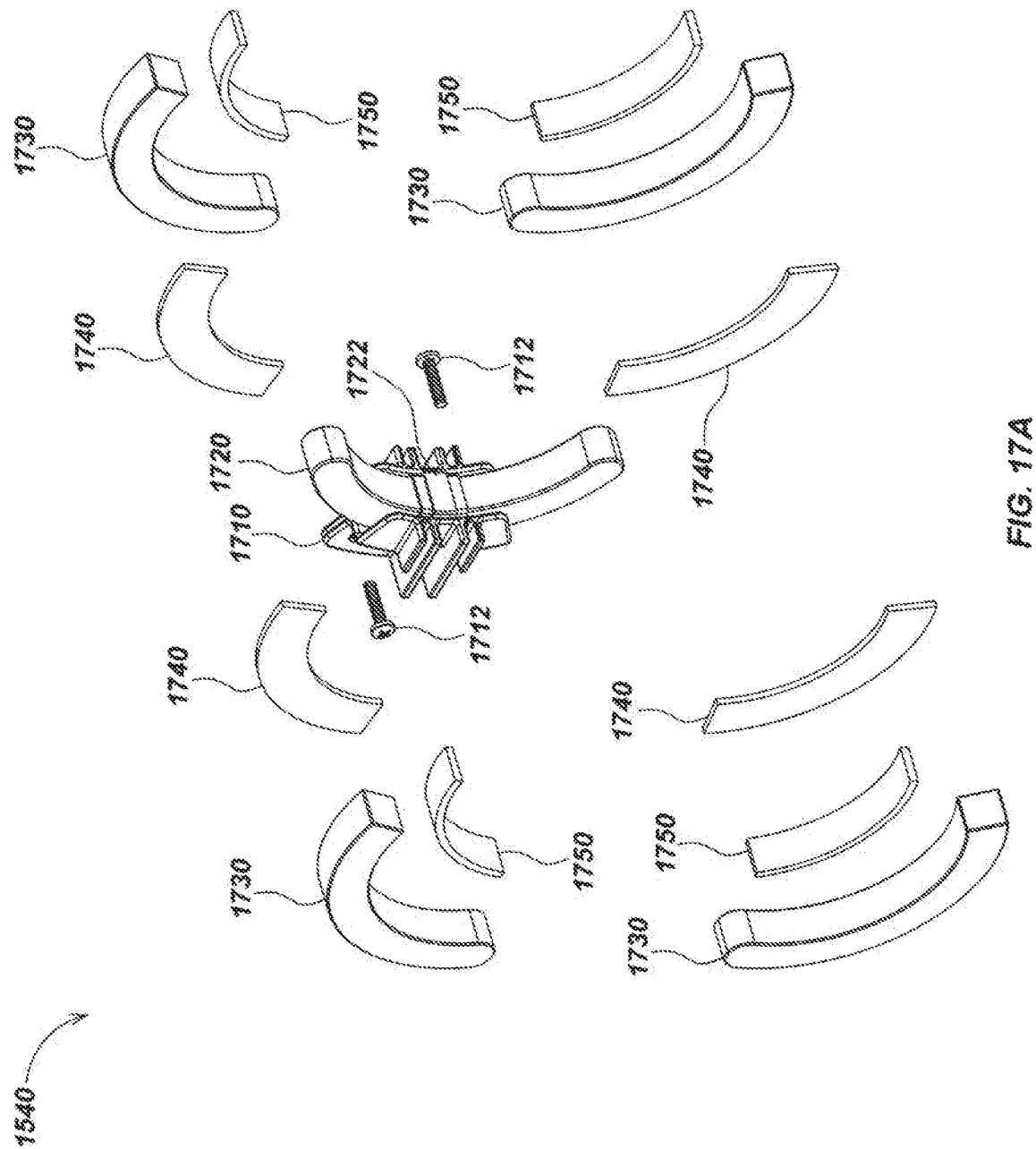
FIG. 17A is an exploded view of the magnetic core subassembly embodiment of FIG. 16.

Turning to FIG. 17A, the magnetic core subassembly 1540 may be comprised of a central support piece/element 1710 with a central ferrite piece/component 1720 secured thereto. The central support piece 1710 and connected central ferrite piece 1720 may further secure to the central base piece/element 1650 (as shown in FIG. 16) via screws 1712. Wire windings 1722 may be located about the central ferrite piece 1720 which may be Litz wire to reduce high frequency losses in use. A series of arm ferrite pieces 1730 may stack in a geometry on either side of the central ferrite piece 1720 such that gaps between the various magnetic core pieces may be effectively eliminated to the extent possible regardless of the degree to which the arm elements 1526 (as shown in FIG. 15) may be open or closed.

Tape segments, such as the tape segments 1740 or 1750, may be positioned about the central ferrite piece 1720 and various arm ferrite pieces 1730 so as to provide cushioning as well as hold the central ferrite piece 1720 and various arm ferrite pieces 1730 in place. In other embodiments, other magnetic core piece geometries may be used. Furthermore, wire windings may be located on the various magnetic core pieces contained within the arms instead of or in addition to wire windings located on centrally positioned magnetic core pieces.

Figure 17B:
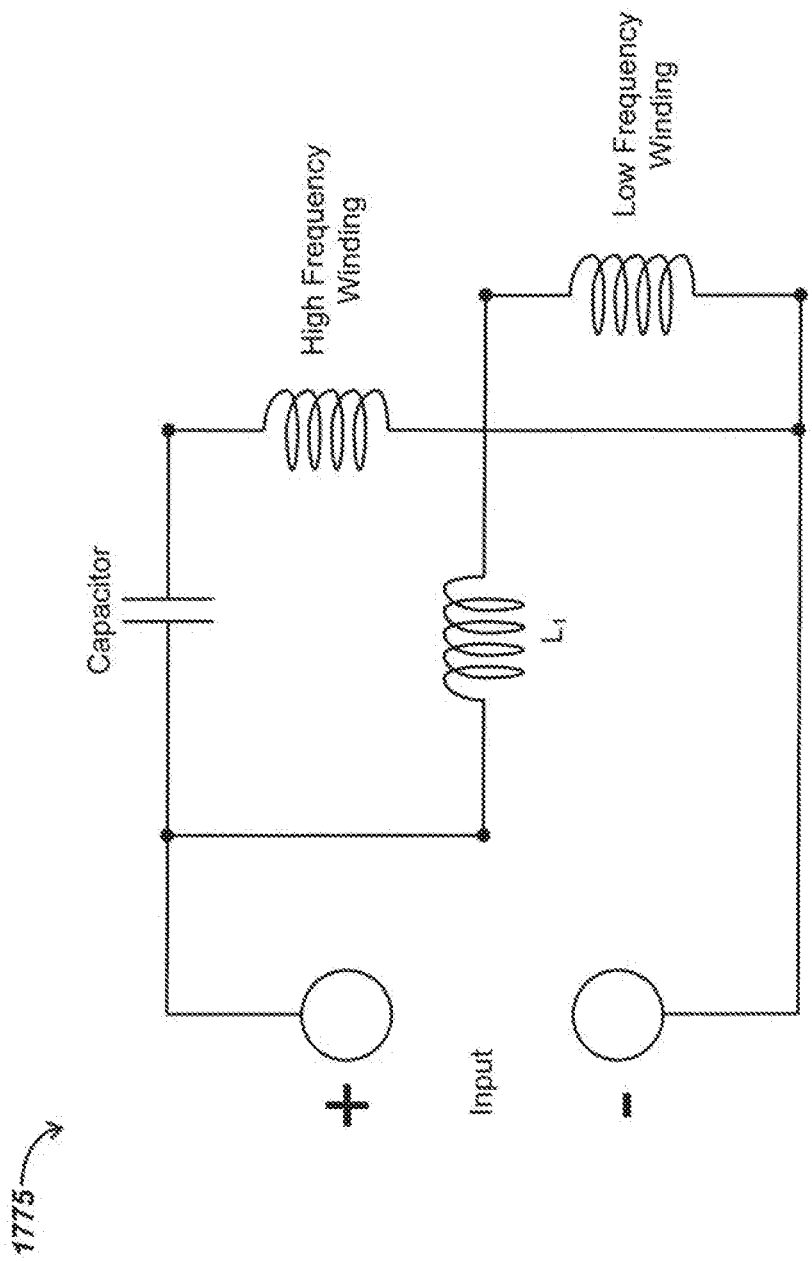
FIG. 17B is a diagram demonstrating a divider or passive parallel crossover network circuit embodiment.

Turning to FIG. 17B, in the various inductive clamp device embodiments, wire windings, such as the wire windings 1722 of FIG. 17A, may be part of circuitry for inducing one or more signals onto a target utility by electrically coupling current through the inductive clamp device. Such circuitry may include, but is not limited to, the use of a passive parallel crossover or simple divider network 1775 illustrated in FIG. 17B. In further embodiments, such circuitry may be a circuit that uses separate inductors to produce one or more high Q resonant circuits. Other configurations of circuitry may further be used in various inductive clamp device embodiments to generate current signals, such as at one or more resonant frequencies, to correspondingly produce magnetic fields for coupling to the targeted utilities.

Figure 18:
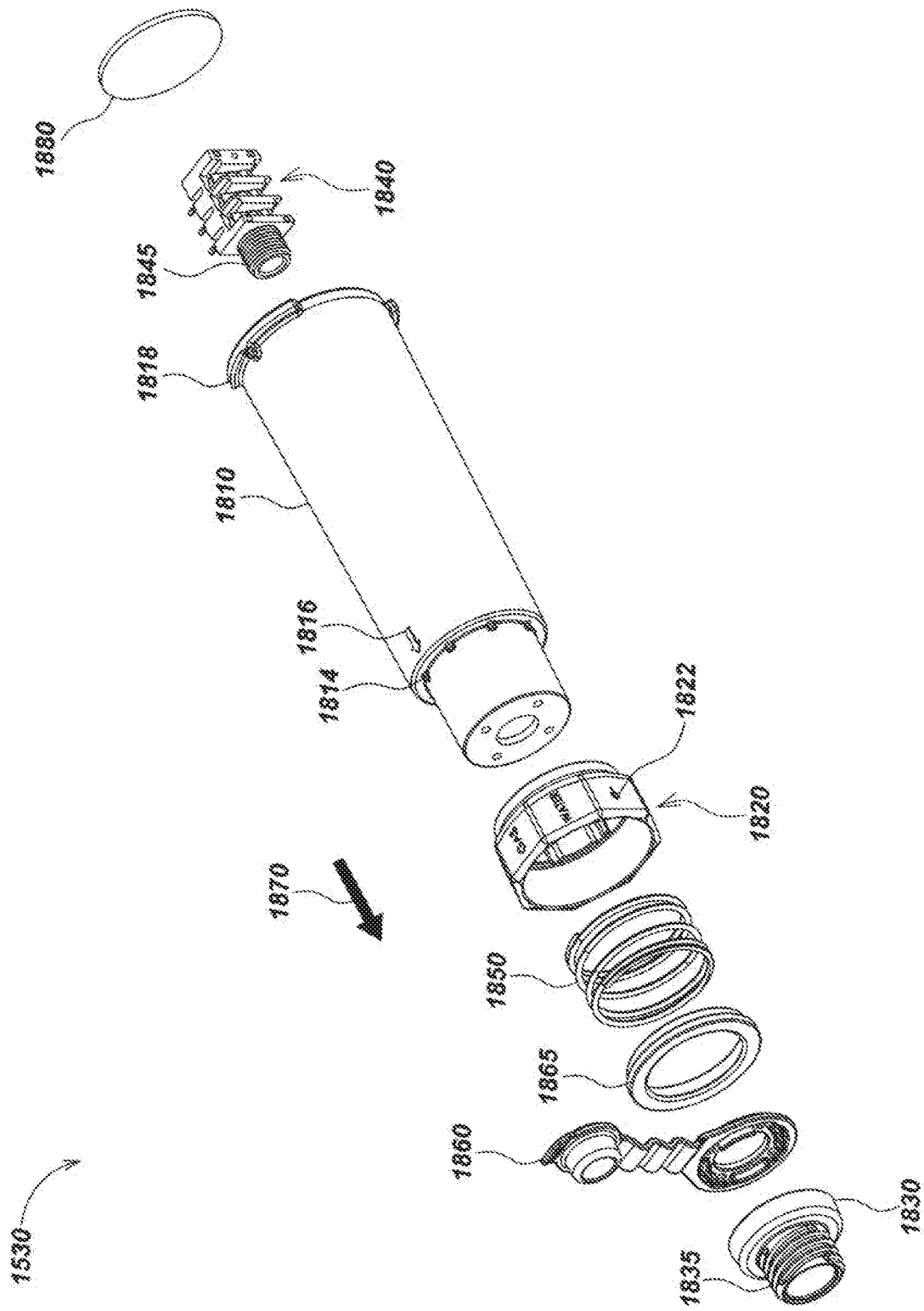
FIG. 18 is an exploded view of the handle assembly embodiment of the inductive clamp device embodiment of FIG. 15.

Turning to FIG. 18, the handle assembly embodiment 1530 may be comprised of a largely substantially cylindrical core handle piece or element 1810, a utility selector element 1820, and a locking sleeve 1830. A cable jack 1840 may be seated within a narrow back section of the core handle piece 1810 and secure thereto by threads 1845 on the cable jack 1840 mating to threads (not illustrated) within the locking sleeve 1830. The locking sleeve 1830 may also be formed with external threads 1835 configured to mate with threads on any connecting cable and secure said cable thereto.

A spring 1850, a locking sleeve plug piece 1860, a grommet 1865, and the locking sleeve 1830 may be seated and mount snugly within the end of the utility selector piece 1820. A series of core handle piece keying features 1814 formed on the core handle piece 1810 may key to grooves (not illustrated) within the inner forward-facing section of the utility selector element 1820 in assembly so as to prevent unwanted rotations of the utility selector element 1820. In assembly, tension may be provided to the utility selector element 1820 by the spring 1850 so as to hold the utility selector element 1820 to the core handle piece 1810. Desired rotations of the utility selector element 1820 (e.g., through user interaction with the device) may occur when a force along the backwards direction 1870 is applied to the utility selector element 1820 sufficient to overcome tension provided by the spring 1850 and allow the utility selector piece 1820 to clear the core handle piece keying features 1814.

When rotations of the utility selector element 1820 occur, one or more magnets (not illustrated) secured within the utility selector element 1820 may also be made to rotate with the utility selector piece 1820. Magnetic sensors, which may be disposed on the PCB 1880, may be used to detect the position and subsequent changes of position due to rotations of the utility selector element 1820 and attached magnets. The detected position of the magnets may be used to select a utility type, device mode, or other selection and may be used to generate corresponding data or output signals from the utility selector element or associated electronic circuitry.

In handle assembly 1530, utility types 1822 may be indicated upon the utility selector element 1820. An arrow indicator 1816 on the core handle piece 1810 may align utility types 1822 to allow a user to designate utility, frequency selection, and/or selection or other system mode. In some embodiments, colors and iconography commonly used in the industry used to notate the various utility types may be used. In some embodiments, an off mode may be selected through the utility selector to power off the inductive clamp device. A keying lip feature 1818 formed on the clamp facing end of the core handle piece 1810 may function, in assembly, to key and hold in place the handle assembly 1530 to the head assembly 1520 (best illustrated in FIG. 19).

Figure 19:
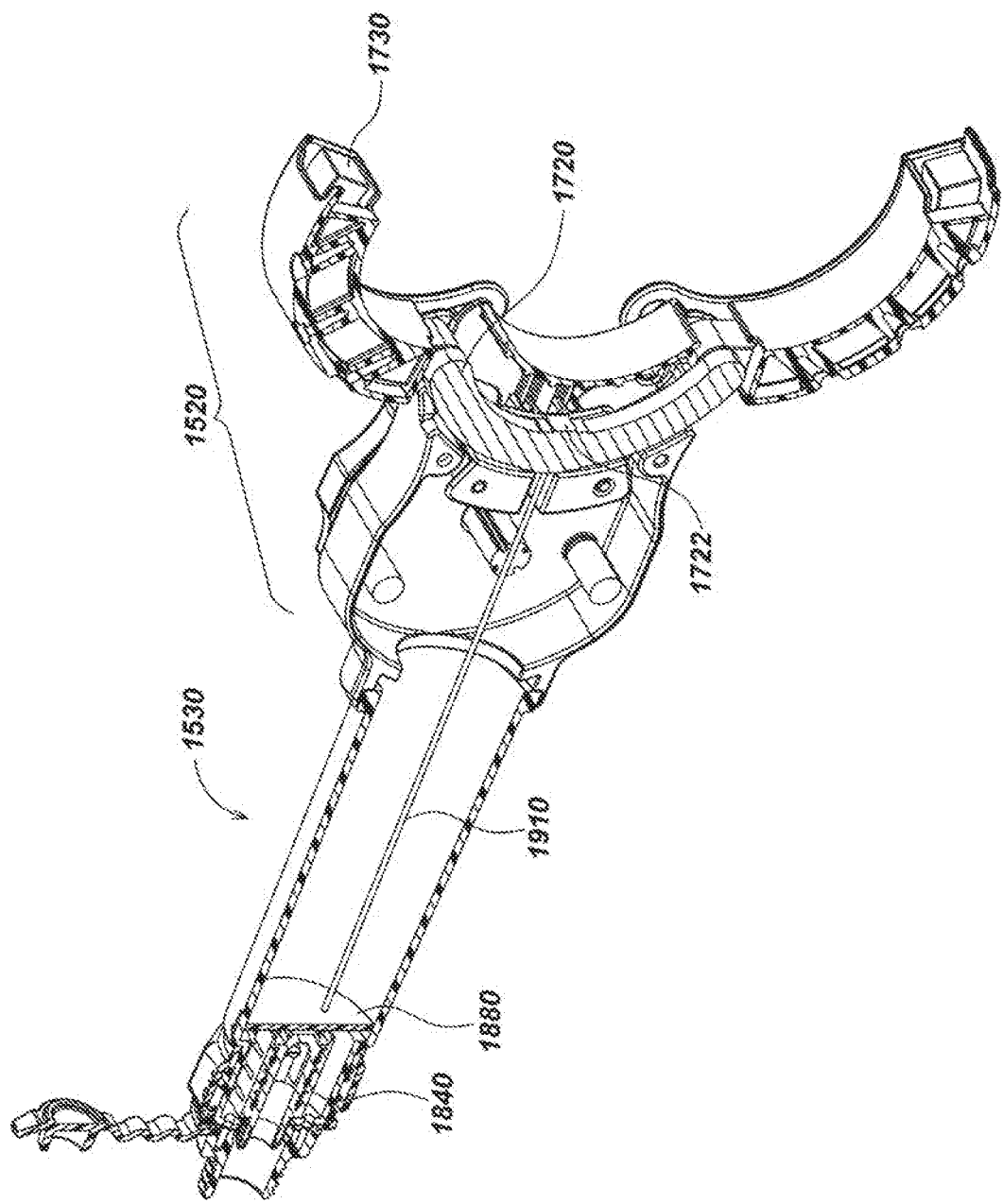
FIG. 19 is a sectional view of the embodiment of FIG. 15.

Turning to FIG. 19, wiring 1910 is shown connecting the cable jack 1840, PCB 1880, and wire windings 1722. The PCB 1880 may include or be coupled to a variety of sensors and other elements. These sensors and/or other elements may include, but are not limited to, global navigation systems (GNS) sensors such as global position system (GPS) sensors, accelerometers, compass sensors, gyroscopic sensors, other inertial/position sensors, geophones, magnetic sensors, gas sensors, and/or sondes. Other sensors and/or apparatuses within the various embodiments of an inductive clamp device may include cameras, IR sensors, and/or other visual sensors and/or acoustic sensors such as a microphone.

In use, the GNS or GPS sensors and/or other inertial sensors and/or sonde may be used, for instance, to determine inductive clamp device position and orientation in relation to a locator and/or other system devices. Gas sensors may be used for detecting potentially hazardous gas leaks and subsequently alert a user if such a leak is detected. Acoustic sensors may, for instance, be for acoustic leak detection or detecting vibration. The camera and/or other imaging sensors may be used to document how an inductive clamp device is connected to a utility line. The microphone may be used for detecting voice commands from a user and subsequently controlling various aspects of the inductive clamp device. Magnetic sensor(s) may, for instance, be utilized to measure magnetic output fields produced by the inductive clamp device in use.

A measured power output of the inductive clamp may further be used to feedback the specific output power of the inductive clamp device and/or determine if the clamp is fully closed or not. Output power, frequency, phase, voltage, current, and the like may be stored in a memory of the inductive clamp and/or may be transmitted to other locate system devices. In some embodiments, magnetic shielding may partially or fully be incorporated into the core handle piece 1810 to prevent internal circuitry/sensors from potentially generating signals that may interfere with inductive clamp device signals.

Some sensors, circuitry, and/or other elements previously described herein may reside outside any magnetic shielding and/or external to the inductive clamp device itself. For example, some such sensors, circuitry, and/or other elements may be configured within an external battery terminal or other attached accessory device, or other locate system device. In some embodiments, a series of additional O-rings and/or other seals may be used to allow various embodiments of an inductive clamp device to be fully or partially submersible without damaging internal components that may otherwise be damaged by moisture.

Various multiplexing schemes, such as the multiplexing processes and methods described subsequently with respect to FIGS. 20A to 20F, may be used in various embodiments and applications of an inductive clamp device system. The illustrated multiplexing methods correspond to output signal time slots and/or frequencies across one or more inductive clamp embodiments. For example, the signals represented in FIGS. 20A-20F may originate from a transmitter device through which an inductive clamp device may be connected or through an inductive clamp device embodiment configured to function as a stand-alone signal generation and coupling device/integrated inductive clamp.

A locator device that is time synchronized with such an inductive clamp device coupled to and multiplexing different frequencies through multiple utility lines simultaneously and/or at varied time intervals may be configured to identify and determine the positions and/or other information of each utility line either in an absolute sense or with respect to the corresponding clamp device. Various time synchronization methods may be used including, but not limited to, the use of GPS or other GNS sensors with precise timing and/or other ways to synchronize timing of all system devices, or through use of other timing systems, such as dedicated time synchronization systems or systems providing time information as one output type. Description of example apparatus and methods that may be used in various embodiments for providing time synchronization between locators, transmitters, inductive clamp devices, and/or other system devices are described in the incorporated applications, including, for example, co-assigned U.S. patent application Ser. No. 13/570,211, entitled PHASE-SYNCHRONIZED BURIED OBJECT LOCATOR APPARATUS, SYSTEM, AND METHODS, filed Aug. 8, 2012, which is incorporated by reference herein.

Figure 20A:
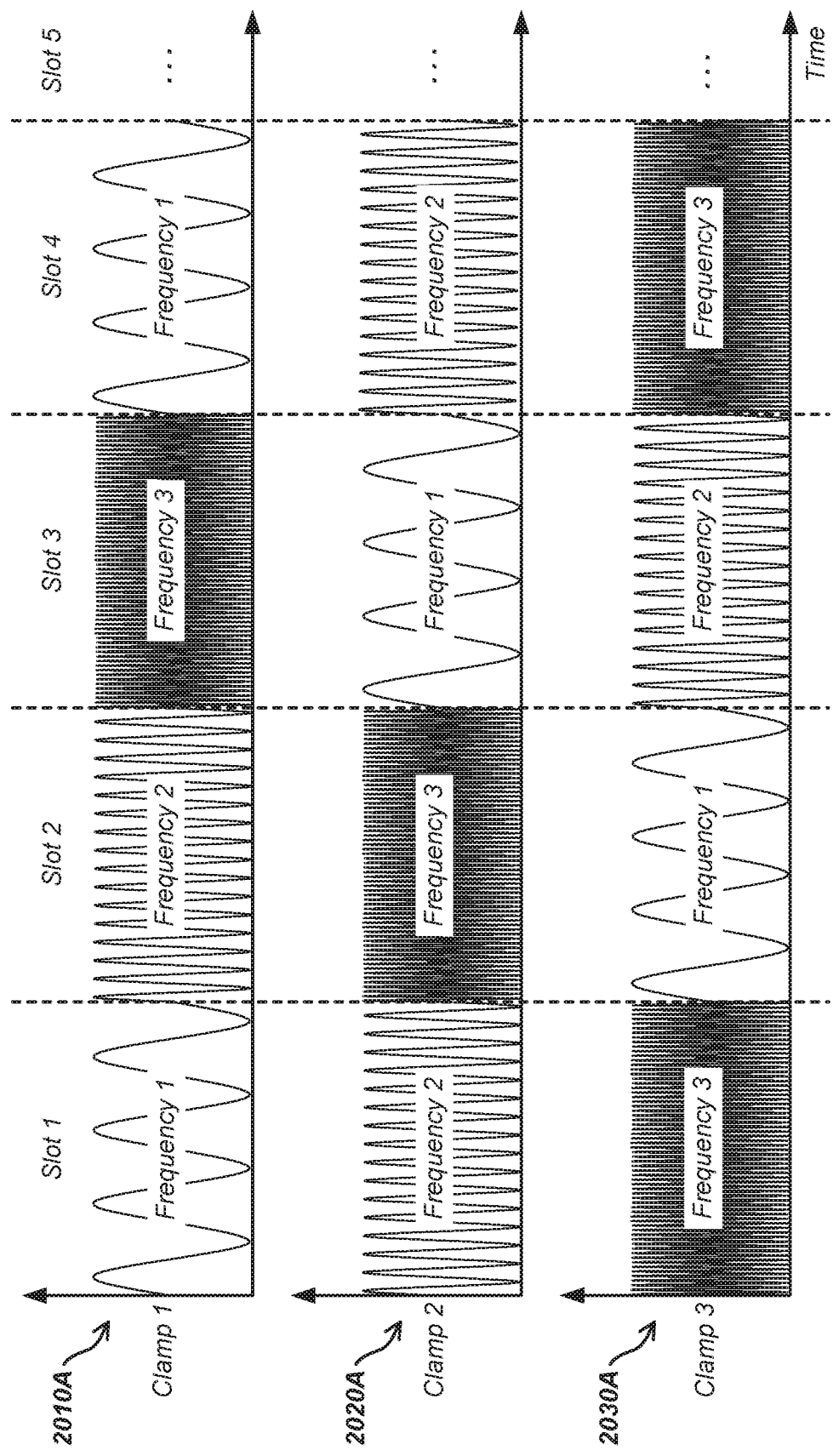
FIG. 20A is a diagram of an embodiment of a process for time multiplexing of frequencies.

FIGS. 20A to 20F illustrate various example transmitted signal embodiments. It is noted that the signals shown in FIGS. 20A to 20F are provided for purposes of explanation, not limitation, and that various other signal sequences and timing may be used in various embodiments. FIG. 20A illustrates exemplary signal sequences where inductive clamp devices in accordance with aspects of the present disclosure may, at three utilities or other conductors, simultaneously send output current signals, which may result in generation of corresponding magnetic fields, at three frequencies. The signals in FIGS. 20A-20F may originate from a transmitter device through which an inductive clamp device may be connected, or through one or more inductive clamp device embodiments configured to function as a stand-alone signal generation and coupling device/integrated inductive coupling device. In FIG. 20A, as well as FIGS. 20B-20F, output signals are divided into slots of equal time duration, although the slots need not be equal in time in some embodiments. In an exemplary embodiment the time slots are at least partially non-overlapping, however, in other embodiments two or more slots may overlap.

In some embodiments, the duration of this time slot may allow for a complete phase of each used frequency. A clamp 1, for instance, connected to a first utility line may be used to induce a frequency 1 in slot 1 of sequence 2010A, a clamp 2 connected to a second utility line may be used to induce a frequency 2 in slot 1 of sequence 2020A, and a clamp 3 connected to a third utility line may be used to induce a frequency 3 in slot 1 of sequence 2030A. In FIG. 20A, a switching of frequencies 1, 2, and 3 may occur in successive time slots whereby each frequency is used in each sequence for each clamp as shown.

In an exemplary embodiment, the various frequencies may include, but are not limited to, 810 kHz, 8,910 kHz, 80,190 kHz, 400,950 kHz, and 481,140 kHz. In some embodiments it may be desirable to maintain complete phase of each signal at the different frequencies in successive slots. This may be advantageous for a locator operation with respect to input filtering or other signal processing. For example, the time frame of each transmitted signal may include, but is not limited to, 1/60 of a second, 1/50 of a second, 1/25 of a second, or 1/30 of a second to maintain a complete power line frequency phase of the aforementioned exemplary frequencies. Other switching time frames which may allow for a complete phase of each used frequency may be dependent upon the selected frequencies. Furthermore, the number of frequencies used may not be dependent upon the number of clamps and/or other attached signal inducing devices coupled to utility lines. In various embodiments, one or more frequencies may be cycled through one or more clamps and/or other attached signal inducing devices.

Figure 20B:
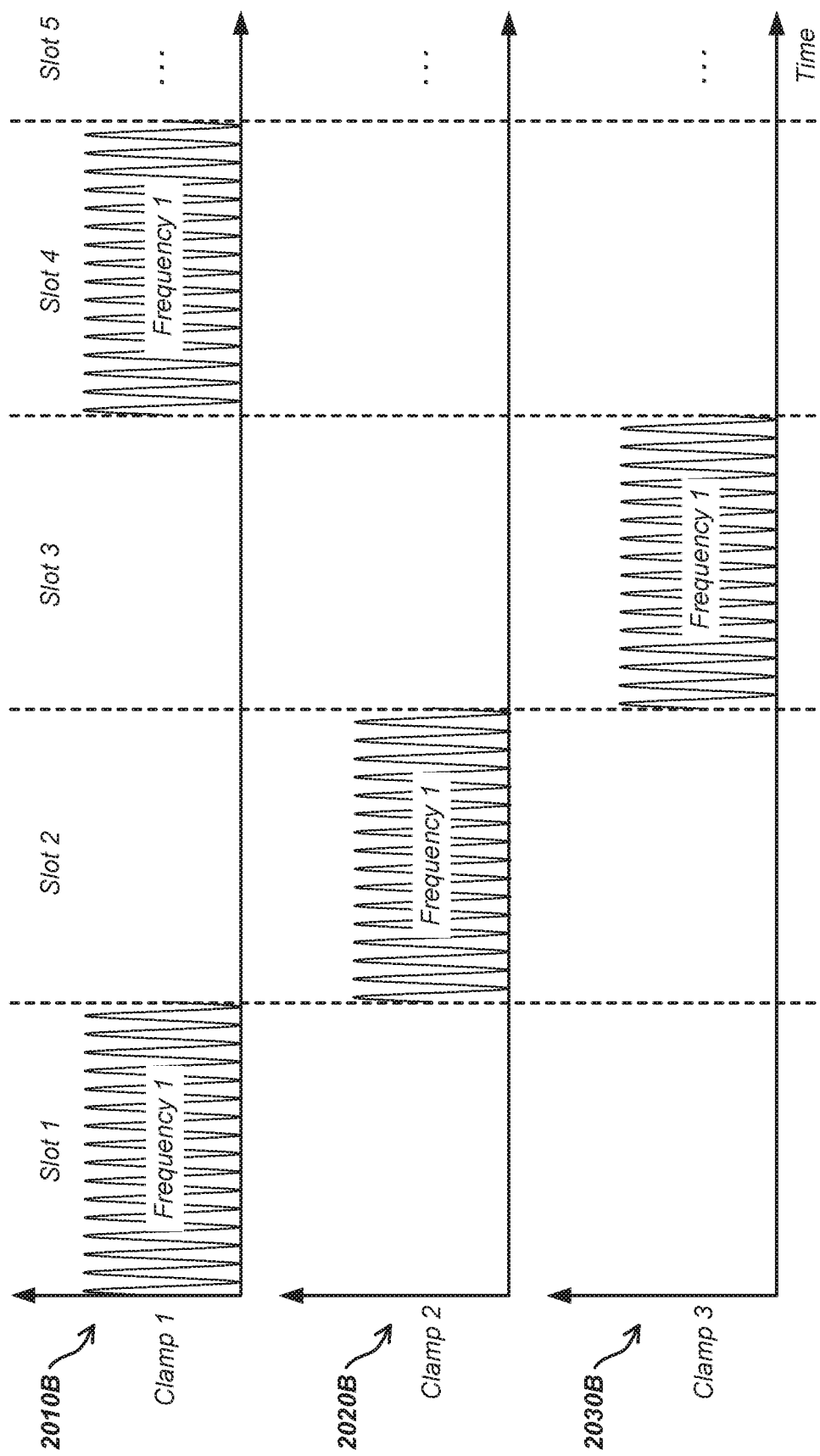
FIG. 20B is a diagram of another embodiment of a process for time multiplexing of frequencies.
Figure 20C:
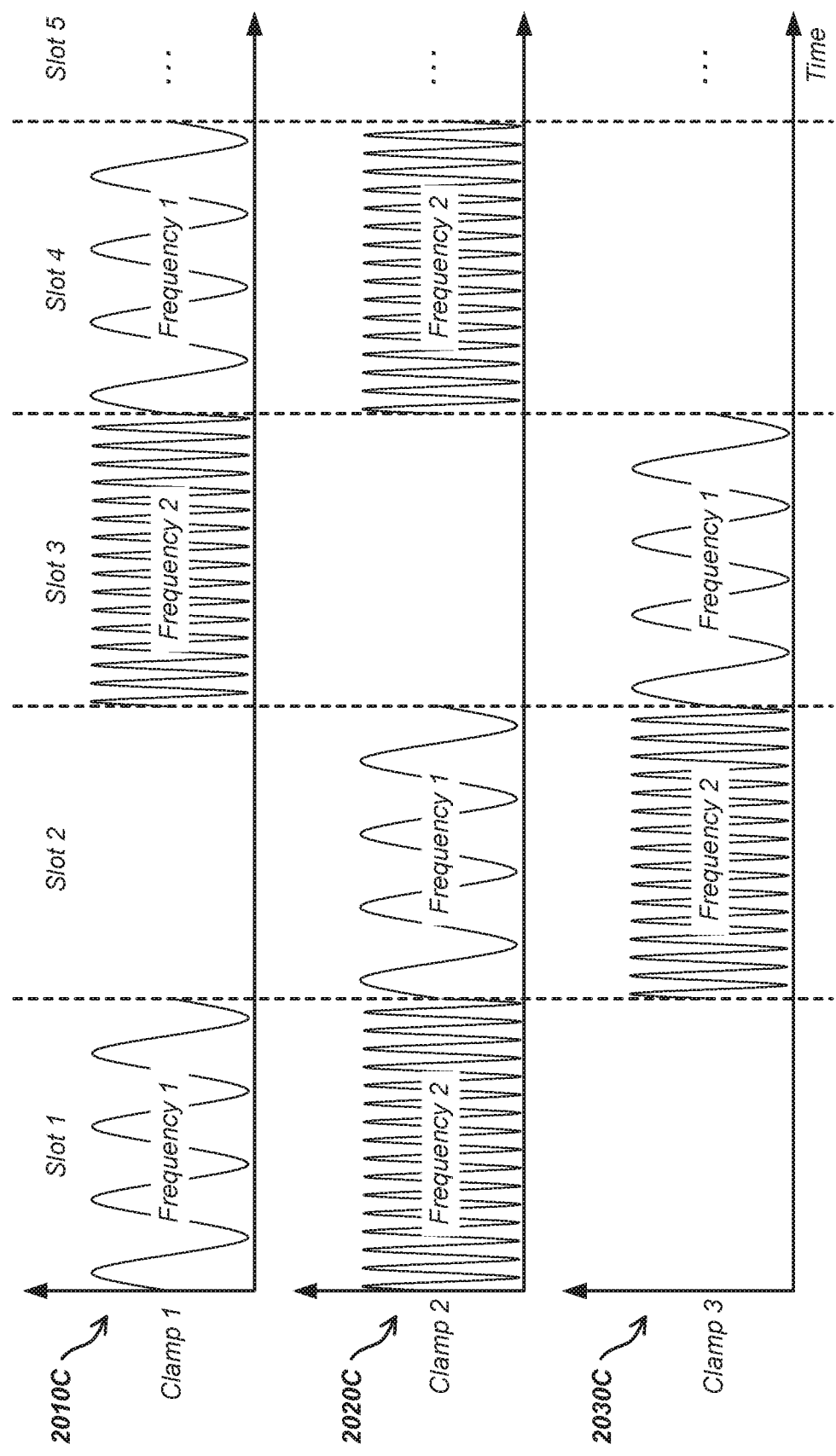
FIG. 20C is a diagram of another embodiment of a process for time multiplexing of frequencies.

FIG. 20B illustrates details of another embodiment of a signaling sequence using a single frequency. Signals may be sent at different frequencies simultaneously (as shown in FIG. 20A) and/or signals may be turned off in all but one utility during a given time slot. For example, 2010B illustrates a sequence of transmission of frequency 1 from clamp 1 in slot 1, with output then off for the next two slots and then repeated in slot 4. The transmission of frequency 1 may occur in time slot 2 in sequence 2020B and time slot 3 in sequence 2030B. FIG. 20C illustrates another embodiment similar to that shown in FIG. 20B, but using two frequencies, rather than one. In this case, sequences 2010C, 2020C, and 2030C each send frequency 1 and frequency 2, with off slots in between as shown.

Figure 20D:
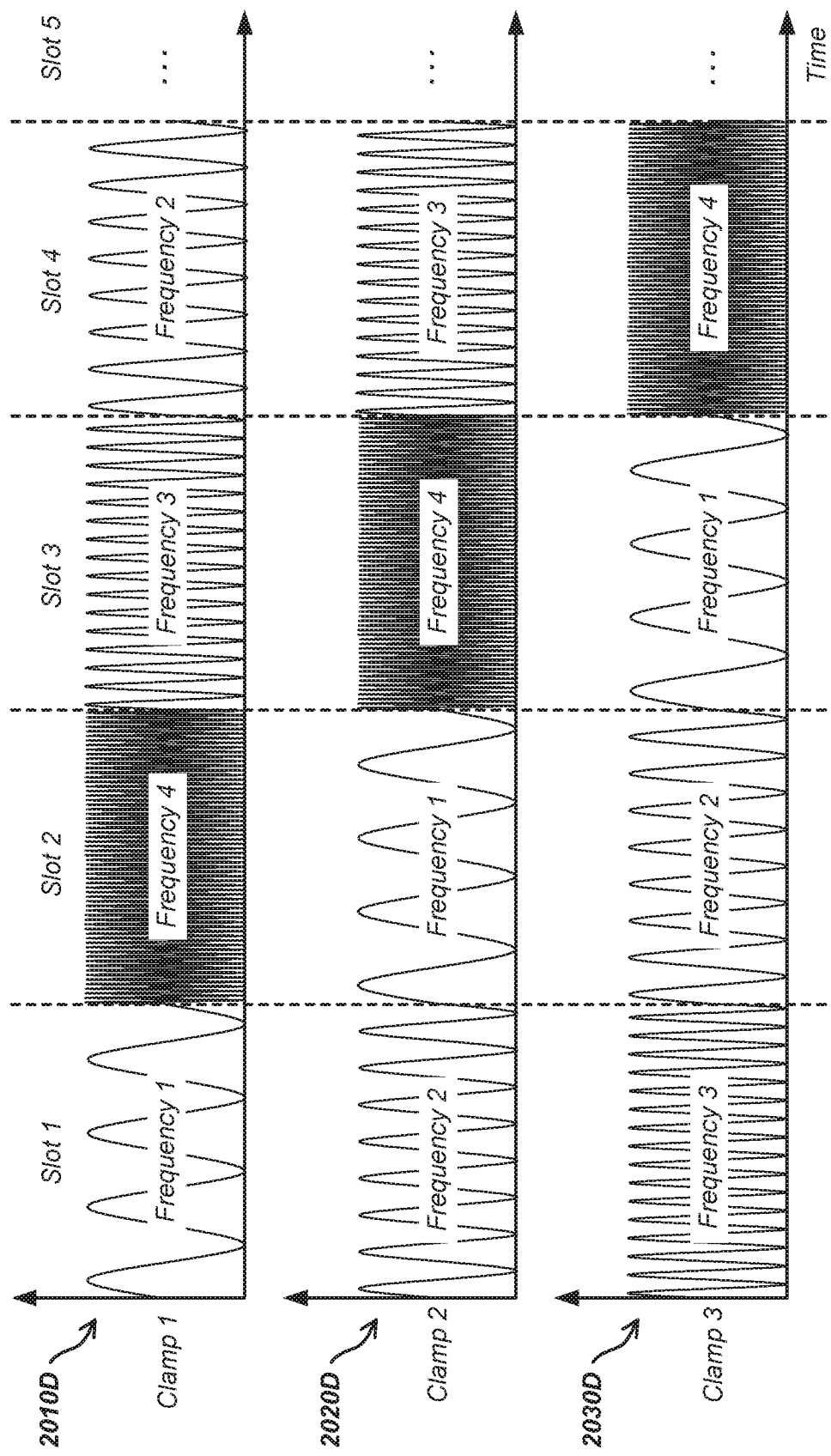
FIG. 20D is a diagram of another embodiment of a process for time multiplexing of frequencies.
Figure 20E:
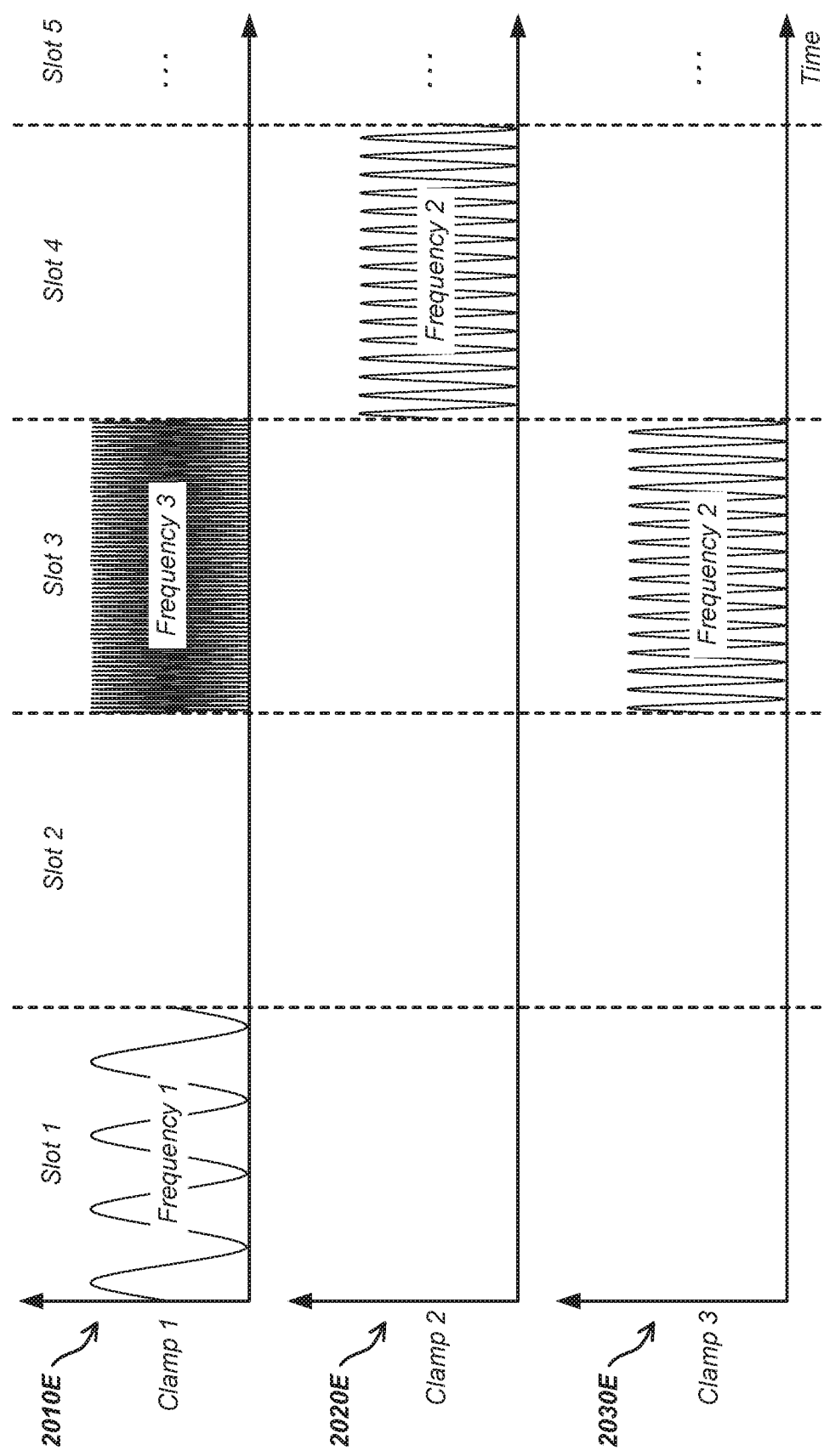
FIG. 20E is a diagram of another embodiment of a process for time multiplexing of frequencies.

Turning to FIG. 20D, four frequencies are shown used in sequences 2010D, 2020D, and 2030D. It is further noted that, while the sequences shown herein are illustrated as being periodic, they need not be. For example, a predefined pseudo-random sequence may be used, in which case, the sequence is preferable known or communicated to a corresponding locator or other communicatively coupled device. An example of such a sequence is shown in FIG. 20E, where each of sequences 2010E, 2020E, and 2030E may be selected, in time and/or frequency, based on some periodic or non-periodic sequence, such as a pseudo-random sequence. Other sequences, such as sequences using more slots of a particular frequency, dynamically determined frequencies, or other variations may also be used in some embodiments.

Figure 20F:
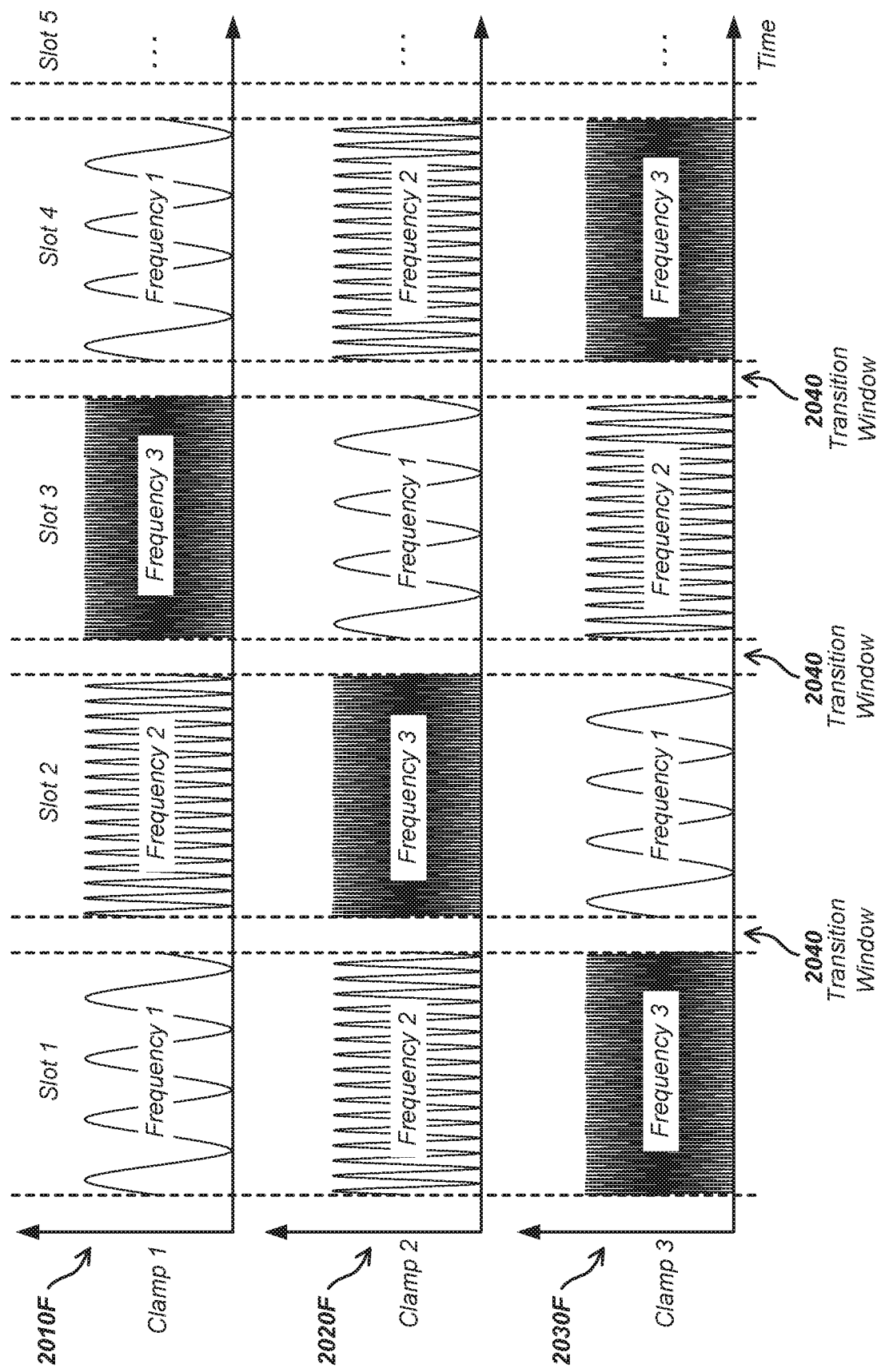
FIG. 20F is a diagram of another embodiment of a process for time multiplexing of frequencies.

Turning to FIG. 20F, a transition window, such as transition window 2040, may be used between time slots, such as between slots in sequences 2010F, 2020F, and 2030F as shown. The transition window 2040 may be used to allow for the ramping up of and/or down of current within the transmitter device in preparation of switching frequencies in each sequence.

Figure 20G:
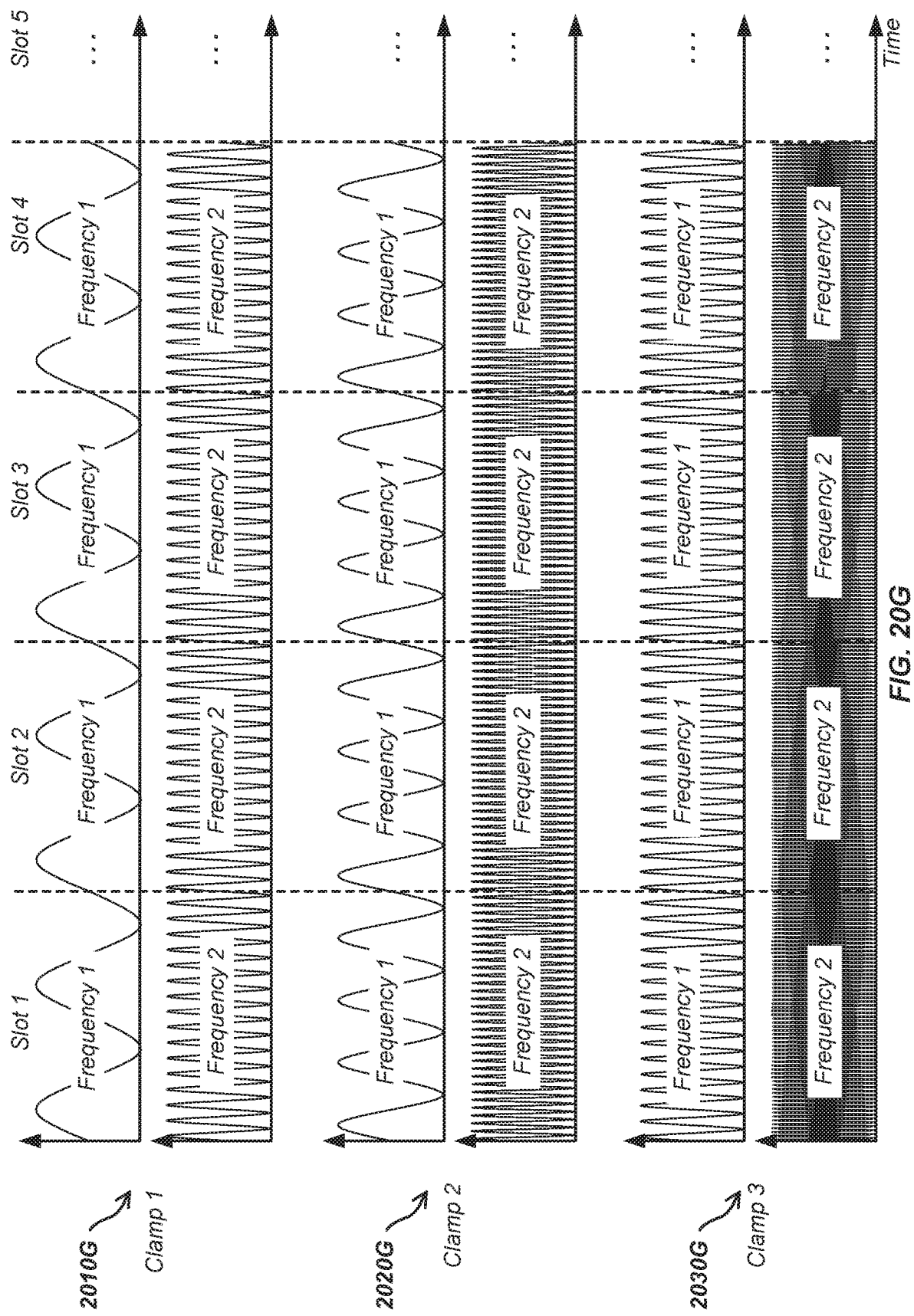
FIG. 20G is a diagram illustrating inductive clamps device embodiments each inducing multiple frequencies simultaneously.

Turning to FIG. 20G, the various inductive clamp devices, such as the inductive clamp device 2010G, inductive clamp device 2020G, and inductive clamp device 2030G may be configured to generate and/or couple multiple frequencies simultaneously. The frequencies illustrated in FIG. 20G may further be multiplexed in time and/or frequency in some embodiments. Circuitry such as the simple divider network 1775 illustrated in FIG. 17B may be used to generate multiple simultaneous frequencies at each inductive clamp device.

Figure 21:
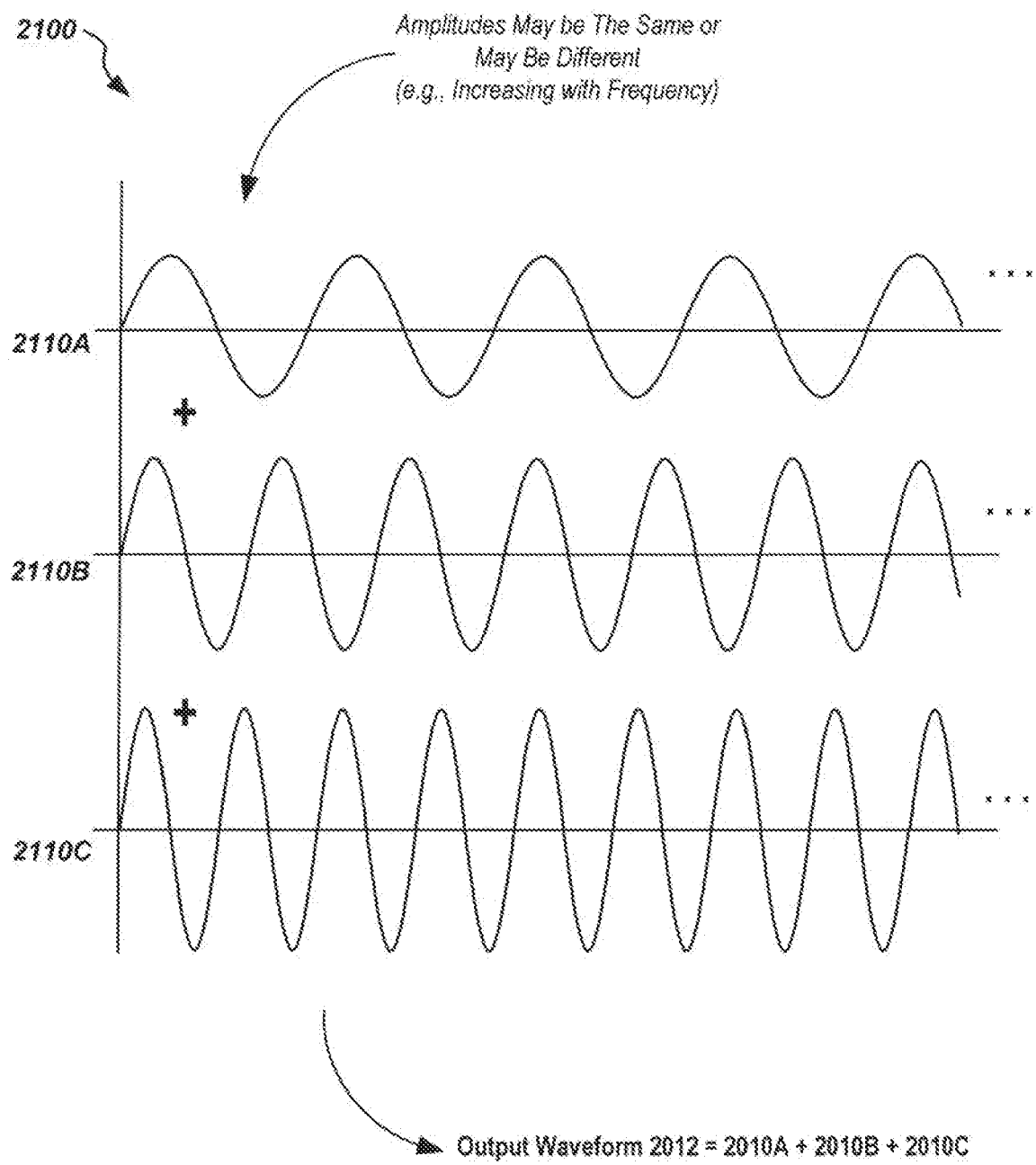
FIG. 21 illustrates details of one embodiment of a multi-frequency waveform generation process.

FIG. 21 illustrates details 2100 of one embodiment of multi-frequency output signal waveform generation. In this example embodiment, signals at three frequencies, denoted as 2110A, 2110B, and 2110C are generated, such as in a processing element in the form of a digital signal processor (DSP) or other processing device and converted from digital to analog form in an analog-to-digital converter (A/D). Two or more of the resulting signals at different frequencies may then be added together to form combined signal 2012, and may then be further processed, such as via amplification, filtering, and the like, before being provided to an output current clamp which may be an inductive clamp device in keeping with the present disclosure, a direct connect clip, and/or other signal coupling apparatus(es).

In some embodiments, multiple output current signals may be provided. Generation of output current signals as shown in FIG. 21, with multiple frequency signals combined to generate a single output current signal, may be used. Further, in embodiments of transmitter elements with multiple outputs, different combinations of output frequency signals may be provided on different outputs. For example, a first output may include the set of three frequencies as shown in FIG. 21, wherein as a second output may include a set of three different frequencies.

Figure 22:
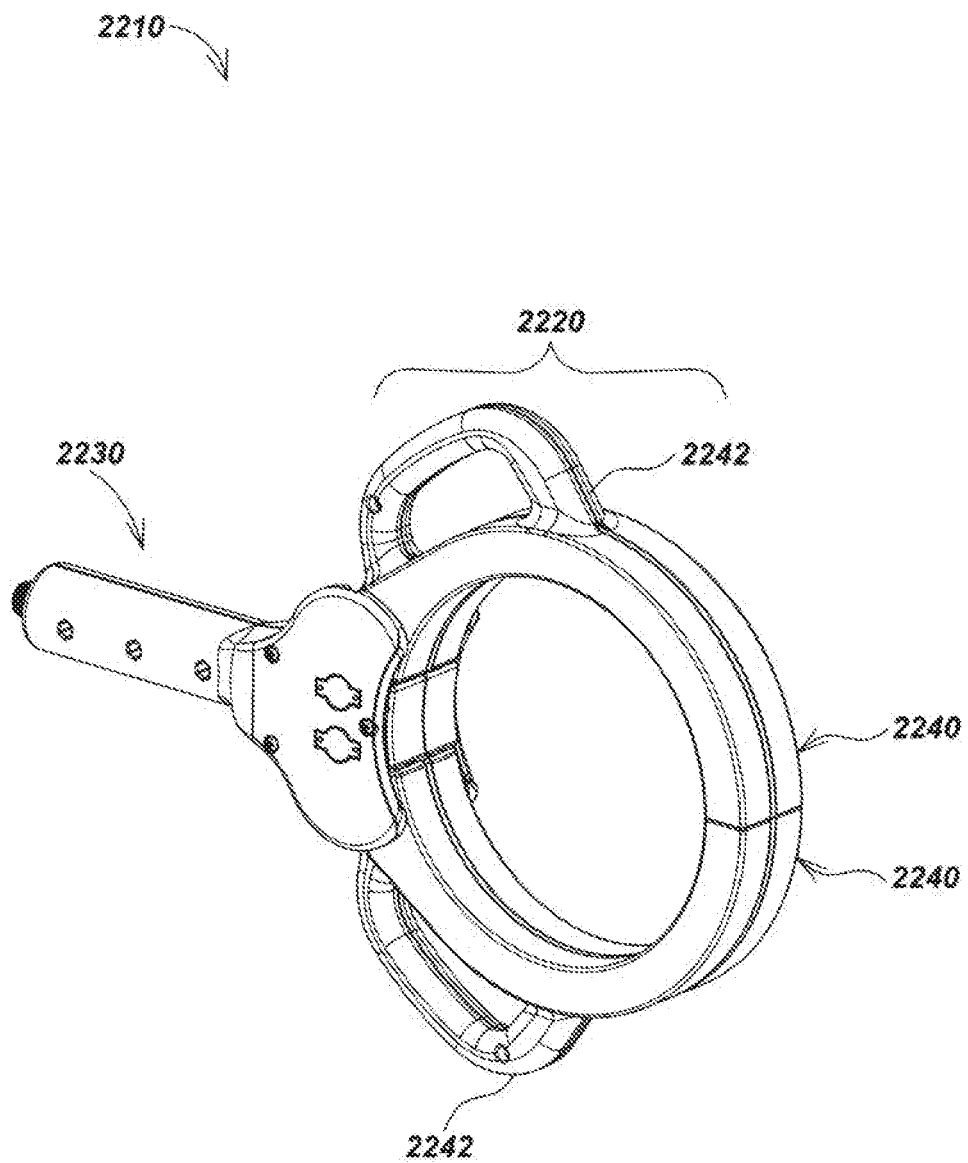
FIG. 22 is an isometric view of an inductive clamp device embodiment.
Figure 23:
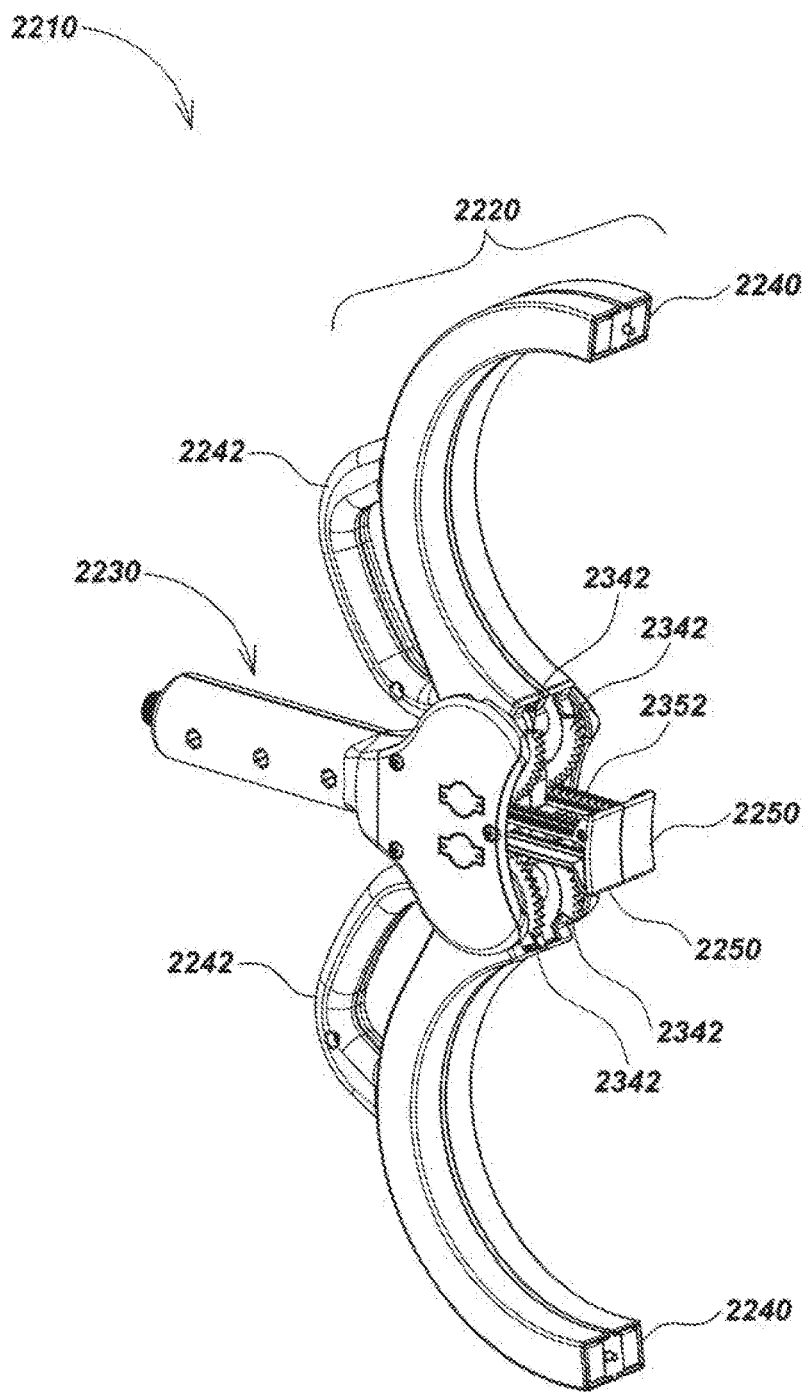
FIG. 23 is an isometric view of an inductive clamp device embodiment with arm elements open.

Turning to FIGS. 22 and 23, details of another embodiment of an inductive clamp device 2210 are illustrated. Embodiment 2210 may include an arm and base assembly embodiment 2220 secured about one end of a handle assembly embodiment 2230. The arm and base assembly 2220 may include a pair of arm elements 2240 that may seat within the end of the handle assembly 2230 and further be configured to open and close so as to circumscribe objects such as a pipe or other conduit in use. Each arm element 2240 may also include a grip feature 2242. In use, each arm element 2240 may be held at its grip feature 2242 so as to open and/or close the inductive clamp device 2210. The arm and base assembly 2220 may further include of a set of center rack pieces or components 2250 located centrally between each arm element 2240.

As illustrated in FIG. 23, each arm element 2240 may be formed with a pair of pinion gear features 2342 configured to mate with a series of inner rack gear features 2352 (best illustrated in FIG. 24B) on the center rack pieces 2250. When the arm elements 2240 are opened, the rotation of the pinion gear features 2342 against the inner rack gear features 2352 forces the center base pieces 2250 forward to provide contact actuation. Likewise, when applied to a pipe or other object, the center rack pieces 2250 may be forced backwards, causing the arm elements 2240 to both close. The pinion gear features 2342 and inner rack gear features 2352 may ensure that the arm elements 2240 open and/or close substantially simultaneously.

Figure 24A:
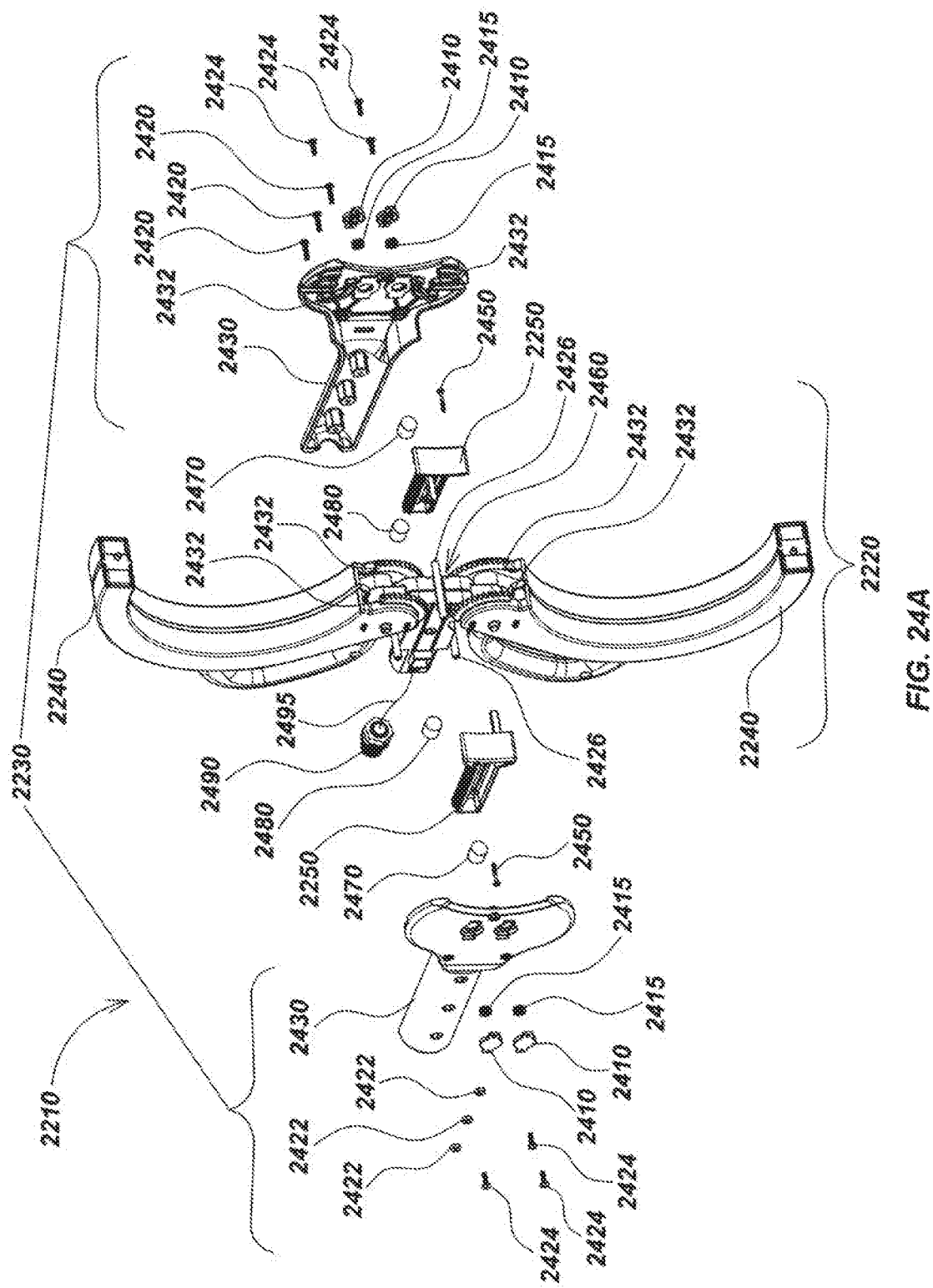
FIG. 24A is an exploded view of an inductive clamp device embodiment.
Figure 24B:
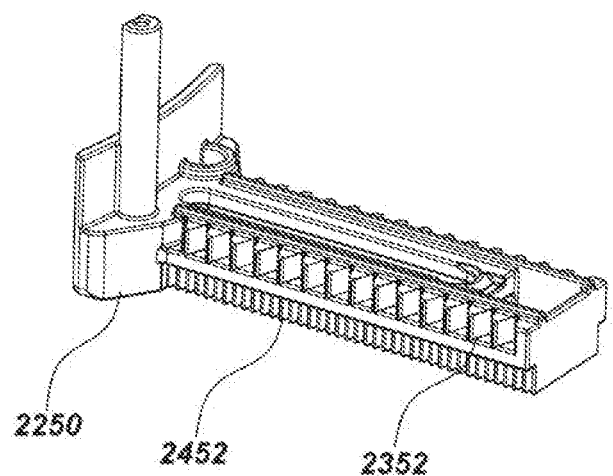
FIG. 24B is a detailed isometric view of an embodiment of center rack components.

Turning to FIG. 24A, the handle assembly embodiment 2230 may include two handle shell halves 2430. A pair of dampening gear retainers 2410 may seat within the front section of each handle shell half 2430, onto which a dampening gear 2415 may further be seated. The dampening gear 2415 may mate with an outer rack gear feature 2452 (as shown in FIG. 24B) formed on the center rack pieces 2250 and dampen movement of the center rack pieces 2250 during opening and/or closing actuation of the inductive clamp device 2210.

In assembly, the handle shell halves 2430 may secure together via rear screws 2420 and nuts 2422 as well as a series of front screws 2424 that may further secure to three posts 2426 positioned between the shell halves 2430. The front most post 2426 of the three may pass through a horizontal opening centrally located on each center rack piece 2250 so as to permit the center rack pieces 2250 while also securing the center rack pieces 2250 within the inductive clamp device 2210. The individual center rack pieces 2250 may further secure together via screws 2450 such that in assembly one center rack piece 2250 may be positioned on either side of a base piece assembly 2460.

A magnet 2470 may seat within each of the center rack pieces 2250. A magnet 2480 with oppositely oriented polarity to that of magnet 2470 may also seated within either side of the back of the base piece assembly 2460 such that when the arm elements 2240 are closed, magnets 2470 and 2480 may attract and hold the arm elements 2240 closed. A wiring connector 2490 may secure to the back of the handle assembly 2230. Wiring 2495 may provide electrical connection from the wiring connector 2490 to windings 2515 (as shown in FIG. 25) about a magnetic core base piece 2510 (as shown in FIG. 25).

Figure 25:
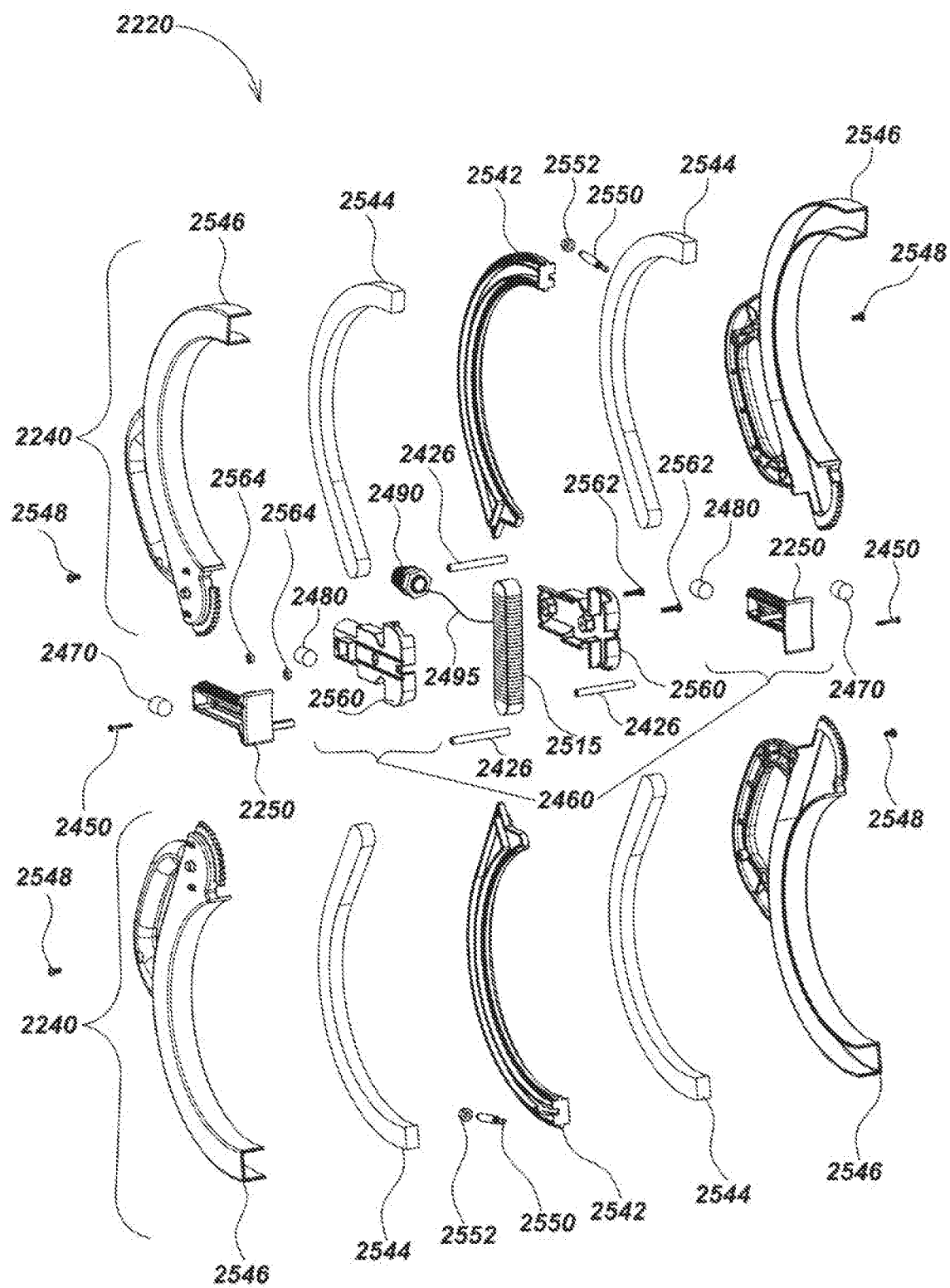
FIG. 25 is an exploded view of an arm and base assembly embodiment.

As illustrated in FIG. 25, the base piece assembly 2460 may comprise two base piece shell halves 2560 that may secure together via screws 2562 and nuts 2564. When assembled, the base piece assembly 2460 may secure the magnetic core base piece/component 2510 and windings 2515 within. Within each arm element 2240, a magnetic core retainer piece 2542 may be situated with a pair of magnetic core arm pieces 2454 seated on either side of magnetic core retainer piece 2542. Windings 2515 may be Litz wire to reduce high frequency losses in use. The magnetic arm pieces 2454 may stack in a geometric configuration on either side of the magnetic core base piece 2510 such that gaps between the various magnetic core pieces may be substantially eliminated to the extent possible, regardless of the degree to which the arm elements 2240 are opened or closed.

Each arm element 2240 may further include a pair of arm shell halves 2546 that, when assembled, may contain the magnetic core retainer piece 2542 and magnetic core arm pieces 2454 within and secure together via screws 2548. Each magnetic core arm piece 2454 in each arm element 2240 may partially overlap a portion of the magnetic core base piece 2510. The magnetic core base piece 2510 and magnetic core arm pieces 2454 may comprise ferrite or other conductive material. A linear dampening mechanism 2550 may be seated partially within the end of each magnetic core retainer piece 2510 and secure thereto with nut 2552. In use, the linear dampening mechanisms 2550 may dampen impact between the arm elements 2240 when closing.

Returning to FIG. 24, each handle shell half 2430 may be formed with two handle keying features 2432 configured to mate with arm keying features 2442 formed on the arm elements 2240, thus securing the arm elements 2240 to the handle assembly 2230 in assembly. The arm elements 2240 may further be configured to rotate open and closed at a pivot point where the arm keying features 2442 and handle keying features 2432 mate. The keying features 2432 and 2442 may further limit the range of rotations of the arm elements 2240. In some embodiments, such as with the inductive clamp device embodiment 2210, the keying features 2432 and 2442 may further be configured to allow the arm elements 2240 to be removed and replaced by the same or a variety of differently configured arms.

Figure 26A:
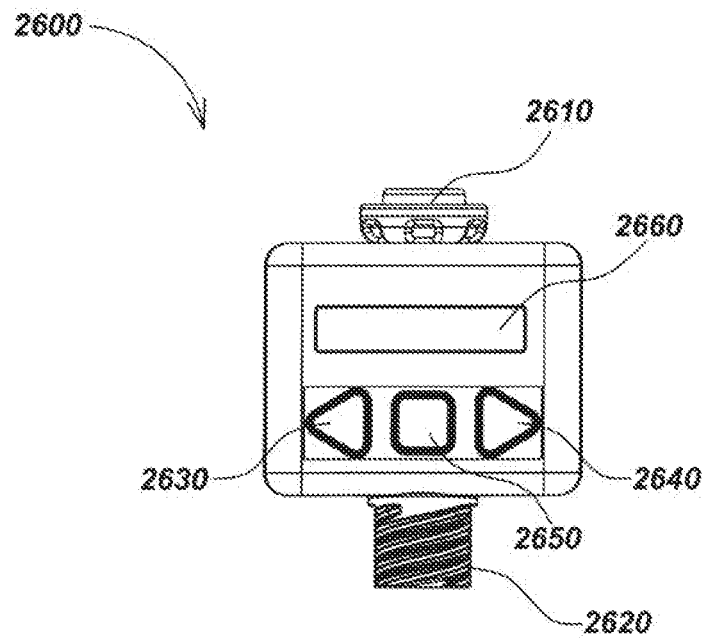
FIG. 26A is a front view of a utility designator device embodiment.
Figure 26B:
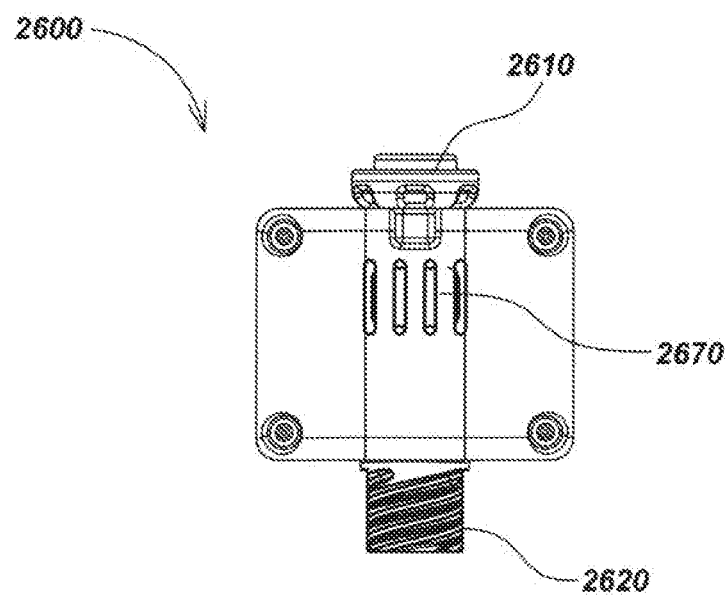
FIG. 26B is a rear view of a utility designator device embodiment.

In some inductive clamp embodiments, electronic circuitry and/or other mechanisms, such as mechanical or electromechanical components, for designating and selecting utility type may be disposed within a device separate from the clamp embodiments described herein. One example such device embodiment is illustrated in FIGS. 26A and 26B as utility designator device embodiment 2600. The utility designator device embodiment 2600 may connect to an attachment tool, such as the various inductive clamp device embodiments disclosed herein, through a connector 2610 on one end and a transmitter or other system tool through connector 2620 on the other. The utility designator device 2600 may include a left button 2630 (FIG. 26A), right button 2640 (FIG. 26A), and a select/attention button 2650 configured for user input that may further be used to select a utility type and indicate associated data/information to a transmitter and/or other system tools. An LCD display 2660 (as shown in FIG. 26A) may be included on or within utility designator device 2600 to provide user feedback and/or display information. For example, utility type may be displayed upon LCD display 2660, allowing a user to scroll through available utility type selections using left button 2630 and right button 2640 and select utility type with the select/attention button 2650. Further feedback may be provided to the user through a speaker 2670 positioned on the back of utility designator device 2600. Audible indicators of utility types, warnings of incorrect attachment tool type, and or other information may be used with utility designator device 2600. Electronic signals or data corresponding to the selected utility type or other parameter may be generated by one or more processing elements in or coupled to the utility designator device 2600 and may be stored in memory, used by other circuit elements, such as to generate display information, and/or transmitted to other locate system devices or other electronic computing devices or systems.

When a utility type is selected, pressing of the select/attention button 2650 may indicate to a transmitter and/or other system devices that a utility designator device, such as the utility designator device 2600 of FIGS. 26A and 26B, is present. Data regarding utility type and/or attachment tool type, for instance inductive clamp, clip, and/or inductive stick device described subsequently herein, may be exchanged between the transmitter device and/or other system devices. The functioning of the transmitter/system may thereby be changed/customized based on information of a known utility type and/or attachment tool type. The various clamp devices, transmitter, and/or system may be configured to function both with or without the presence of a utility designator device in some embodiments.

Figure 27A:
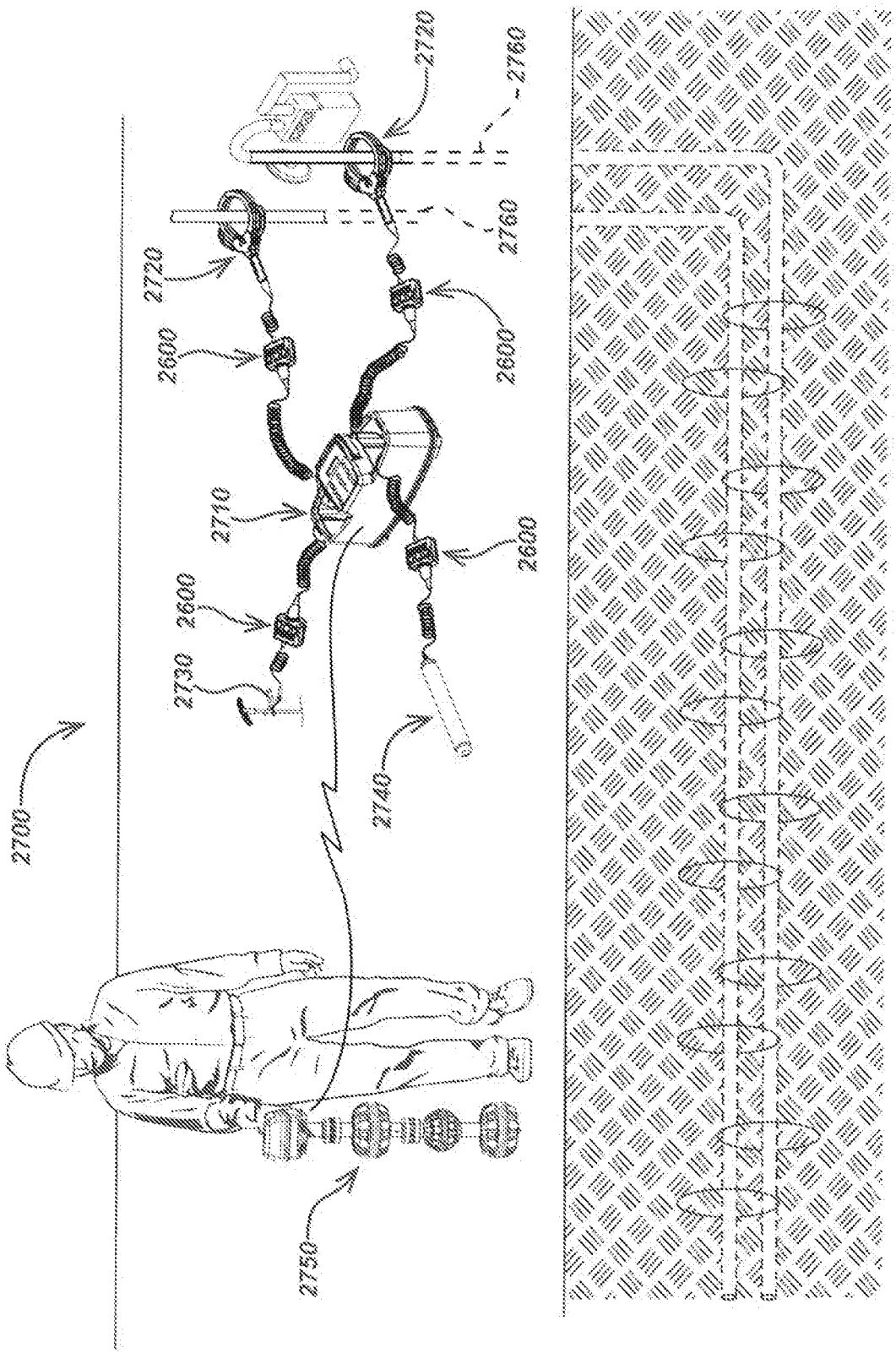
FIG. 27A is an illustration of a utility locating system using utility designator device embodiments.
Figure 27B:
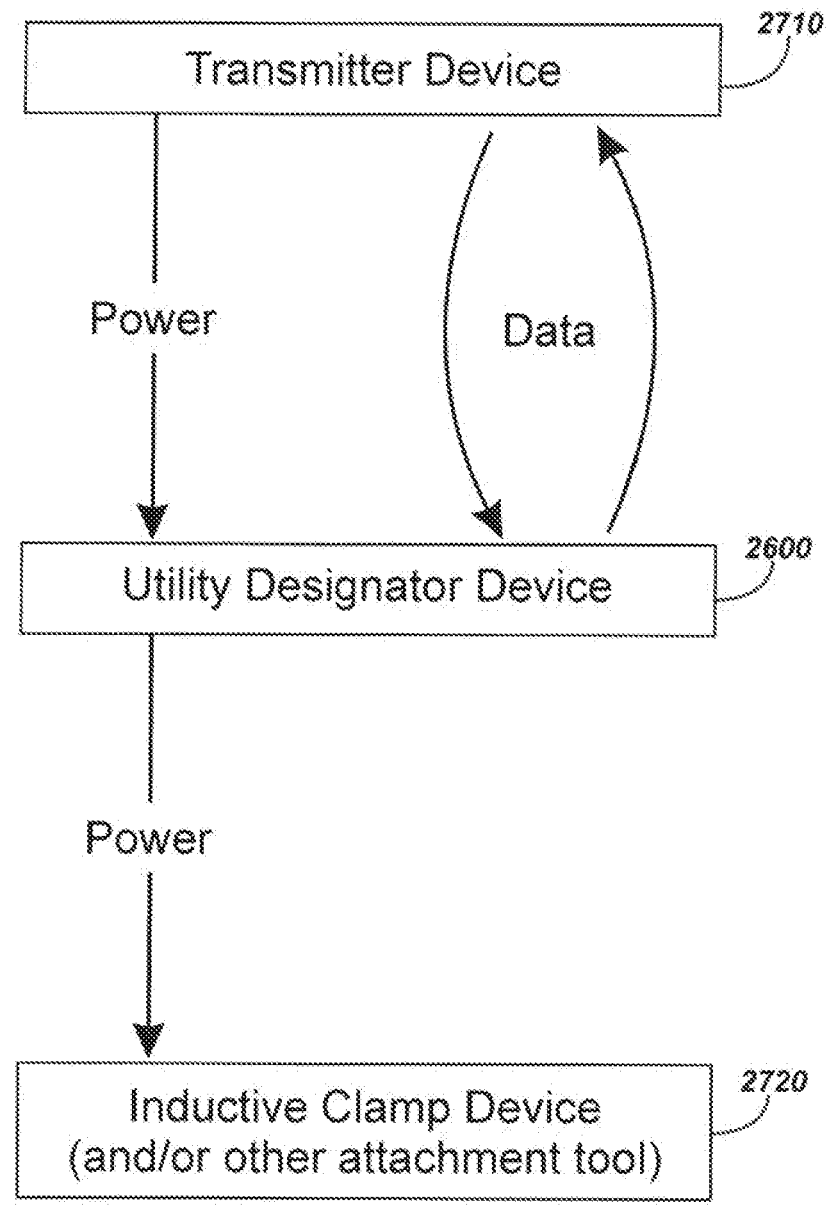
FIG. 27B is a flow chart of an embodiment of a process for powering and data communication with a utility designator device embodiment.

As illustrated in FIGS. 27A and 27B, utility designator devices. such as the utility designator devices 2600, may be connected in a utility locating system such as utility locating system 2700 (as shown in FIG. 27A) located between a transmitter device 2710 and various attachment tools. For instance, inductive clamps devices 2720 which may be any of the inductive clamp devices disclosed herein, clips 2730, inductive stick devices 2740 (as shown in FIG. 27A and further discussed with FIGS. 28-31), and/or other attachment tools may be connected to utility designator devices 2600 further connected to transmitter device 2710.

Utility locating system 2700 may further include a utility locator device 2750 configured to detect current signal provided to hidden or buried utilities to induce electromagnetic signals onto a conductor(s), such as the utility lines 2760, which is typically buried underground or otherwise at least partially hidden from direct access for purposes of locating the buried utility line(s) and/or other conductors. The utility locator device 2750 and/or transmitter device 2710 and/or other system devices/tools. The utility locator device 2750 may be similar in aspects to the locator 150 of FIG. 1. The transmitter device 2710 may be similar in aspects to the transmitter module 120 of FIG. 1.

Turning again to FIG. 27A, a data communications link may be established between the utility locator device 2750 and/or transmitter device 2710 and/or other system devices/ tools via one or more wired or wireless communication modules. The link may be wireless and be established using a wireless data communications module in, or a wired datalink to the various attachment tools and/or the transmitter device 2710 and/or utility designator devices 2600. The link may be used to receive data and information from the utility locator device 2750, and/or send data and information to the utility locator device 2750, such as data received from a corresponding locator or other electronic computing device, or data sent to a corresponding locator or other electronic computing device. The utility locator device 2750 and transmitter device 2710 as shown may include a corresponding wireless data communications module or modules such as described herein.

As illustrated in FIG. 27B, the transmitter device 2710 may be used to power both a utility designator device 2600 and connected attachment tool such as an inductive clamp device in keeping with the present disclosure. In various utility locating system embodiments, power provided to the utility designator device and/or other connected attachment tool may be direct or alternating current. Data may be exchanged between the utility designator device 2600 and transmitter device 2710.

Figure 28:
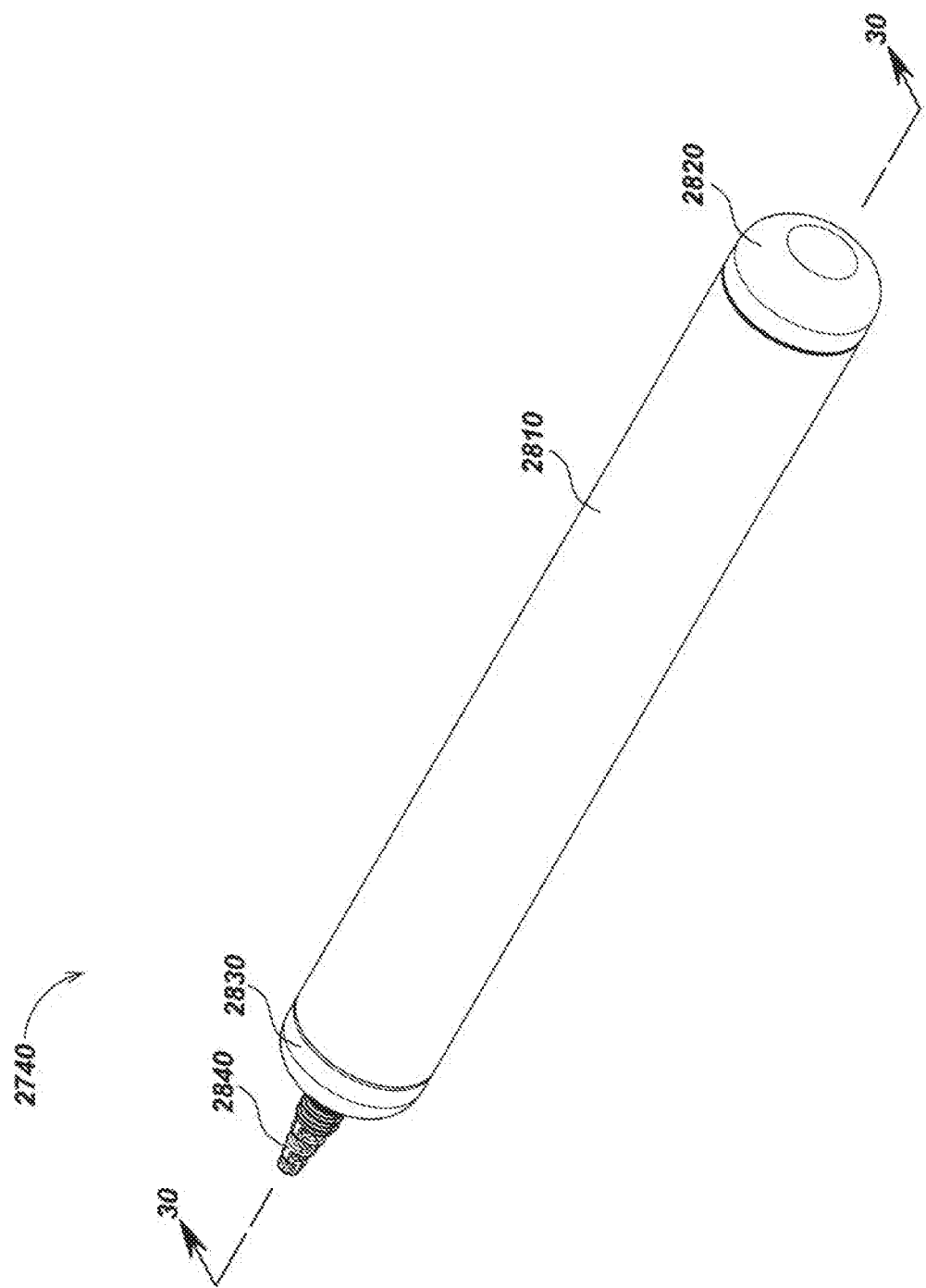
FIG. 28 is an isometric view of an induction stick device embodiment.

Turning to FIG. 28, details of an embodiment 2740 of an induction stick device are illustrated. Induction stick device 2740 may externally include a cylindrical outer shell piece or element 2810 with a front cap 2820 and rear cap 2830 seated on either end of the outer shell piece 2810, and electronics and other elements may be disposed within the outer shell. A wiring connector assembly 2840 may pass centrally through the rear cap 2830 allowing a cord (not illustrated) used to connect the induction stick device 2740 to a transmitter, utility designator device, battery, and/or other device.

Figure 29:
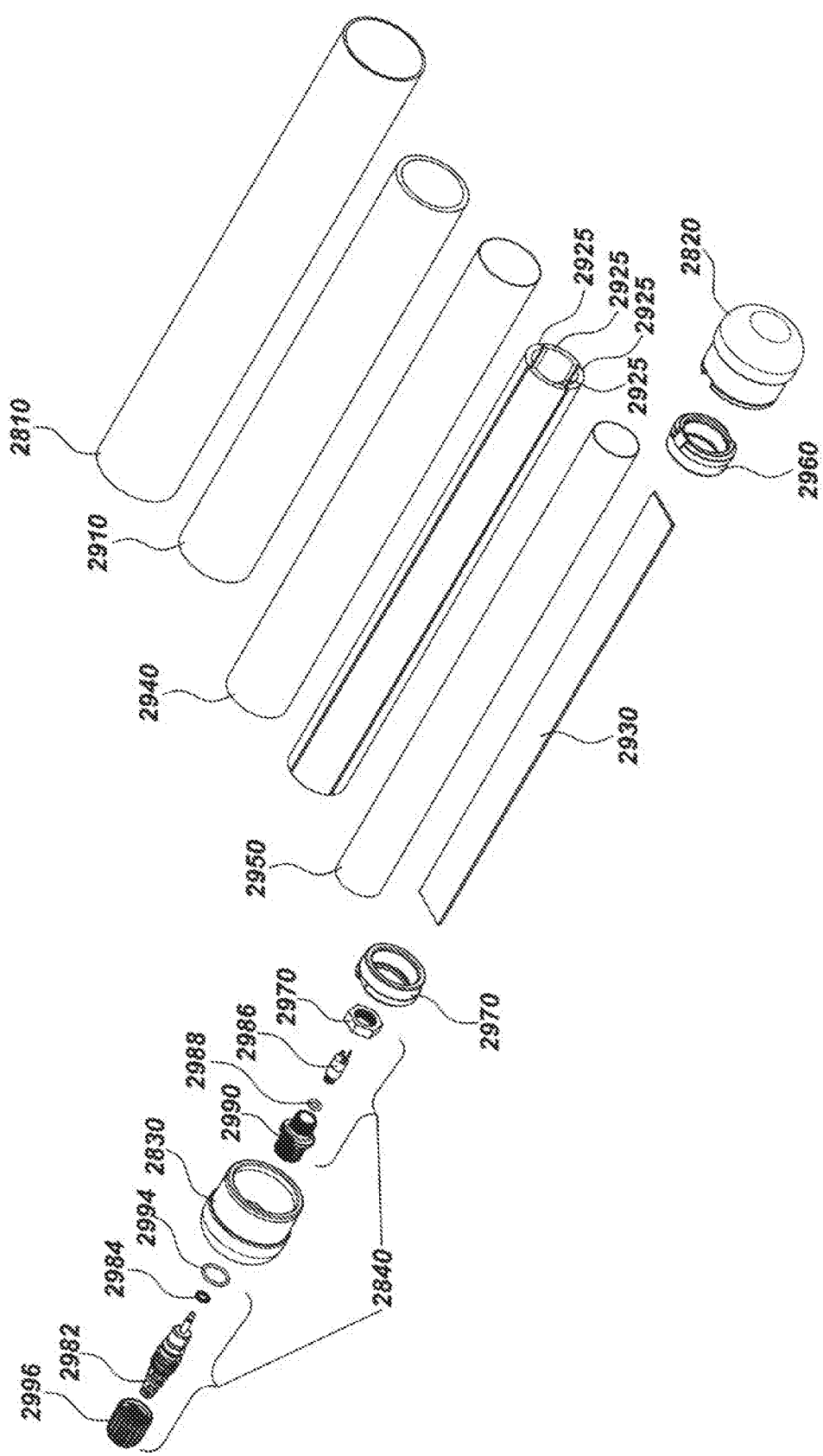
FIG. 29 is an exploded view of an induction stick device embodiment.
Figure 30:
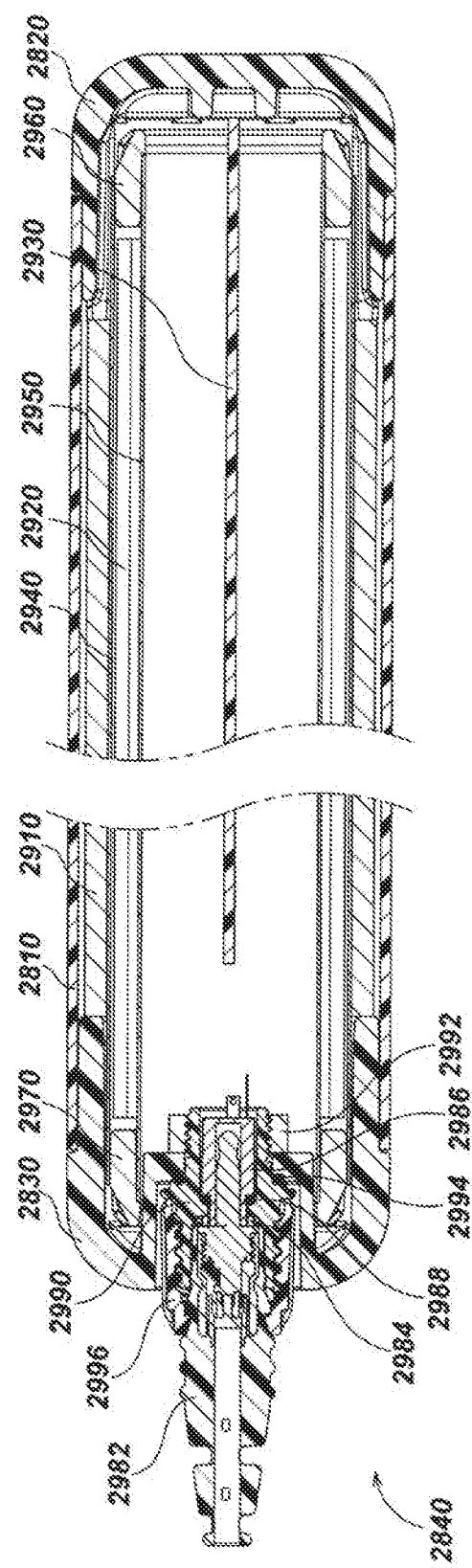
FIG. 30 is a section view of the induction stick device embodiment from FIG. 28 along line 30-30.

Turning to FIGS. 29 and 30, the induction stick device 2740 may further include a cylindrical wire wrap 2910, which may be dimensioned and positioned within the outer shell piece 2810. The wire wrap 2910 may be comprised of turns of wire which may be litz wire to reduce high frequency losses or other wire types or conductive elements. The wire wrap 2910 may circumscribe a magnetic core assembly 2920. The magnetic core assembly may comprise one or more sectional core pieces 2925. The sectional core pieces 2925 may be comprised of ferrite or other conductive materials. Details regarding sectional ferrite pieces that may be used in various embodiments are described in U.S. patent application Ser. No. 14/027,027, entitled SONDE DEVICES INCLUDING A SECTIONAL FERRITE CORE STRUCTURE, filed Sep. 13, 2013 and U.S. patent application Ser. No. 14/215,290, entitled SONDE DEVICES INCLUDING A SECTIONAL FERRITE CORE, filed Mar. 17, 2014, which are incorporated by reference herein.

The wire wrap 2910, circumscribing the magnetic core assembly 2920, may further be connected to electronic circuitry, which may in part situated on a PCB 2930 or other circuit elements, allowing for one or more signals to be induced onto the utility line or other conductor by the induction stick device 2740. An outer core retainer 2940 may be positioned along the outer length of the magnetic core assembly 2920, while an inner core retainer 2950 may be position within the magnetic core assembly 2920 aiding the magnetic core assembly 2920 in keeping a cylindrical form. A front core retainer piece 2960 and a back core retained piece 2970 may further be seated on either end of the magnetic core assembly 2920 to aid to holding the sectional core pieces 2925 in a cylindrical form.

The PCB 2930 may seat snugly within the magnetic core assembly 2920 and inner core retainer 2950 and partially within the front cap 2820 and front core retainer piece 2960. Wiring (not illustrated) may electrically connect the wire wrap 2910 to PCB 2930 and PCB 2930 to wiring connector assembly 2840 for purposes of communicating data and/or transferring power.

The wiring connector assembly 2840 may further be comprised of a cord connector 2982 which may include a cord (not illustrated) used to connect the induction stick device 2740 to a transmitter, utility designator device, battery, and/or other device. A nut 2984 may seat on the end of the cord connector 2982 which may further plug into connector jack 2986 with o-ring 2988 positioned within connector jack 2986 between the connector jack 2986 and cord connector 2982. Wiring (not illustrated) may connect the connector jack 2986 and PCB 2930.

A cylindrical connector sleeve 2990 may be positioned such that the connector jack 2986 may be seated within one end and the end of the cord connector 2982 partially within the other. Externally positioned threads on the end of the connector sleeve 2990, seating the connector jack 2986, may mate with a nut 2992 and be used to secure the connector sleeve 2990 and overall wiring connector assembly 2840 to the rear cap 2830. An O-ring 2994 may seat between the connector sleeve 2990 and rear cap 2830 in assembly. A locking sleeve 2996 may screw onto externally positioned threads on the end of the connector sleeve 2990 seating the end of the cord connector 2982 and further secure to the cord connector 2982 to hold the cord connector 2982 securely to the locking sleeve 2996.

Figure 31:
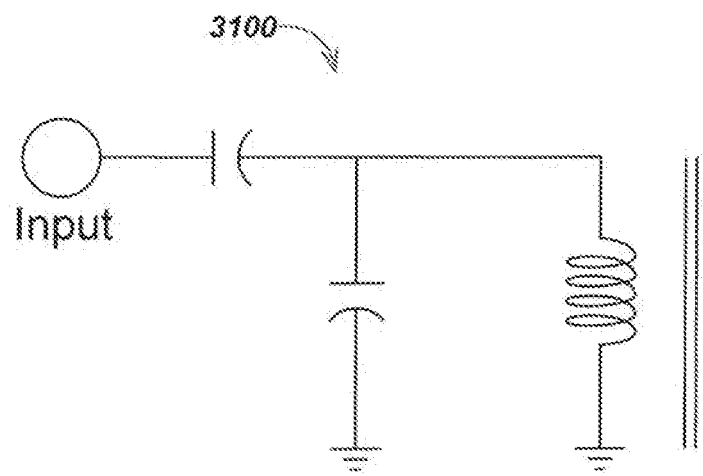
FIG. 31 is an embodiment of a circuit diagram for use in an induction stick device embodiment.

Some inductive stick embodiments may include circuitry such as the enhanced Hi-Q circuit 3100 embodiment as illustrated in FIG. 31. As illustrated, Hi-Q circuit 3100, in comparison to a standard Hi-Q tank circuit, eliminates the need for a second set of coil windings, improves efficiency by eliminating one set of capacitances, and allows for the input signal to be a square waveform. The use of circuitry such as the Hi-Q circuit 3100 may further automatically isolate direct current from the signal, making balance and/or balanced supplies unnecessary.

Figure 32:
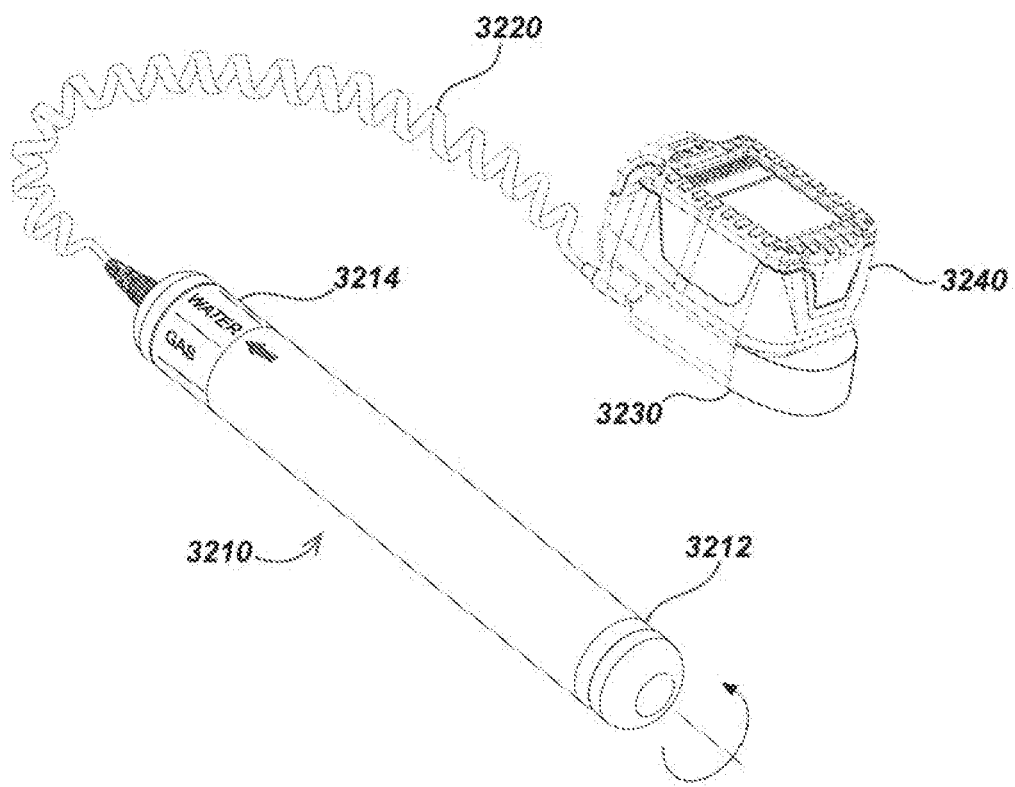
FIG. 32 is an illustration of a stand-alone induction stick device embodiment.

Turning to FIG. 32, some inductive stick device embodiments, such as inductive stick embodiment 3210 as shown, may be configured to operate as a stand-alone device. The inductive stick device embodiment 3210 may further have a cord 3220 connecting a battery terminal 3230 seating a battery 3240. The battery 3240 may be used to power the inductive stick 3210.

Still referring to FIG. 32, the induction stick embodiment 3210 may include a tuning dial 3212 configured to allow the user to select frequencies. A utility designator dial 3214 may also be included in the induction stick 3210 configured to allow a user to select a utility type. Inputs from these dials/selectors may be provided to a processing element within the induction stick to generate corresponding electronic signals and/or data corresponding with the selected parameters. These signals or data may be stored in a memory of the induction stick and/or transmitted via wired or wireless communication modules to other locate system devices. In alternative embodiments a switch, dial, and/or other mechanism for selecting utility type may be included on the inductive stick device 3210, cord 3220, battery terminal 3230, battery 3240, and/or on another system device or devices that may be located remotely. The inductive stick 3210 and/or associated components/devices may be configured with a communications module (not illustrated) to exchange data using one or more wireless and/or wired communication methods. For instance, the utility type and/or frequency selected may be communicated to a transmitter and/or utility locator device.

In one or more exemplary embodiments, the functions, methods and processes described herein may be implemented in whole or in part in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

As used herein, an electronic computing device or system may be any of a variety of electronic devices including computing/processing functionality, memory, and associated peripherals. Examples includes notebook computer systems, tablet devices, smart phones, server systems, database systems, as well as other devices with computer processing, memory, I/O and associated elements for receiving, sending, storing, processing, displaying, archiving, and otherwise processing electronic data and information.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media The various illustrative functions and circuits described in connection with the embodiments disclosed herein with respect to the various described functions may be implemented or performed in one or more processing elements with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The presently claimed invention is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the presently claimed invention. Various modifications to these aspects will be readily apparent to those skilled in the art, and the generic principles defined herein may be applied to other aspects without departing from the spirit or scope of the disclosure and presently claimed invention. Thus, the invention is not intended to be limited to the aspects shown herein but is to be accorded the widest scope consistent with the appended Claims and their equivalents.

The invention claimed is:

1. An inductive clamp for use in utility locate operations to couple current signals to a hidden or buried conductor, comprising:
   a head assembly including a base element and a plurality of arm elements coupled to the base element, wherein at least one of the plurality of arm elements are retained in an open or closed configuration by a plurality of magnets disposed in an orientation to provide an attractive force therebetween;
   a handle assembly operatively coupled to the head assembly; and
   a magnetic core subassembly for generating a magnetic field for coupling to a targeted utility, the magnetic core subassembly including a plurality of ferrite elements and wire winding wrapped about one or more of the ferrite elements.

2. An apparatus for generating and coupling current signals to a hidden or buried conductor, comprising:
a transmitter; and
an inductive clamp operatively coupled to the transmitter, including:
a head assembly including a base element and a plurality of arm elements coupled to the base element, wherein at least one of the plurality of arm elements are retained in an open or closed configuration by a plurality of magnets disposed in an orientation to provide an attractive force therebetween; and
a magnetic core subassembly for generating a magnetic field for coupling to a targeted utility, the magnetic core subassembly including a plurality of ferrite elements and wire winding wrapped about one or more of the ferrite elements.

3. The inductive clamp of claim 1, wherein at least one of the plurality of arm elements are movably opened and closed upon user actuation.

4. The inductive clamp of claim 1, wherein the arm elements are movably closable in response to contact with a utility line.

5. The inductive clamp of claim 1, further including a tensioning element for holding the arm elements in a selected position.

6. The inductive clamp of claim 1, further comprising an integrated GPS receiver module and a data transmitter to send positional data provided from the GPS receiver module to an associated utility locator or transmitter.

7. The inductive clamp of claim 1, further comprising a utility selector element including a sensor assembly and electronics to sense a position or orientation of the utility selector element and provide an output signal corresponding to the selected position or orientation.

8. The inductive clamp of claim 1, further comprising a communications module, wherein the output signal is provided as a wired or wireless output signal from the communications module.

9. The inductive clamp of claim 8, wherein the position or orientation of the utility selector element is stored in a non-transitory memory in the inductive clamp.

10. The inductive clamp of claim 1, further comprising a sonde for generating a dipole magnetic field signal for sensing by a utility locator or transmitter.

11. The inductive clamp of claim 7, wherein the utility selector element is mounted to or disposed on the handle assembly.

12. The inductive clamp of claim 1, further comprising an integrated transmitter module.

13. The inductive clamp of claim 7, wherein the utility selector element includes a turning dial.

14. The inductive clamp of claim 7, wherein the utility selector element includes an off mode switch to power off the inductive clamp from transmitting data to the remotely coupled utility locator or transmitter.

15. The apparatus of claim 2, wherein at least one of the plurality of arm elements are movably opened and closed upon user actuation.

16. The apparatus of claim 2, wherein the arm elements are movably closable in response to contact with a utility line.

17. The apparatus of claim 2, further including a tensioning element for holding the arm elements in a selected position.

18. The apparatus of claim 2, further comprising an integrated GPS receiver module and a data transmitter to send positional data provided from the GPS receiver module to an associated utility locator or transmitter.

* * * * *